US008463666B2

(12) United States Patent
Dorais et al.

(10) Patent No.: US 8,463,666 B2
(45) **Date of Patent: *Jun. 11, 2013**

(54) MANAGING CONSISTENT INTERFACES FOR MERCHANDISE AND ASSORTMENT PLANNING BUSINESS OBJECTS ACROSS HETEROGENEOUS SYSTEMS

(75) Inventors: Marc Dorais, Laval (CA); Bernhard Bittermann, Heidelberg (DE); Jean Corbeil, St. Constant (CA); Maryam Mohammadian, Dollard des Ormeaux (CA)

(73) Assignee: SAP AG, Walldorf (DE)

(*) Notice: Subject to any disclaimer, the term of this patent is extended or adjusted under 35 U.S.C. 154(b) by 528 days.

This patent is subject to a terminal disclaimer.

(21) Appl. No.: 12/323,139

(22) Filed: Nov. 25, 2008

(65) Prior Publication Data

US 2010/0131379 A1 May 27, 2010

(51) Int. Cl.
*G06Q 30/00* (2012.01)

(52) U.S. Cl.
USPC ........................ 705/29; 705/7; 705/8; 705/28

(58) Field of Classification Search
USPC ................ 705/10, 34, 29, 8, 28, 37; 707/107, 707/99
See application file for complete search history.

(56) References Cited

U.S. PATENT DOCUMENTS 3,223,321 A 12/1965 Baumgartner
5,126,936 A 6/1992 Champion et al.
5,210,686 A * 5/1993 Jernigan ........................ 705/29
5,247,575 A 9/1993 Sprague et al.
5,255,181 A * 10/1993 Chapman et al. ................ 705/8
5,321,605 A * 6/1994 Chapman et al. ................ 705/7
5,463,555 A 10/1995 Ward et al.
5,787,237 A 7/1998 Reilly
5,812,987 A 9/1998 Luskin et al.
5,966,695 A 10/1999 Melchione et al.
5,970,465 A * 10/1999 Dietrich et al. .................. 705/7
5,970,475 A 10/1999 Barnes et al.

(Continued)

FOREIGN PATENT DOCUMENTS

CN 1501296 6/2004
CN 1609866 4/2005

(Continued)

OTHER PUBLICATIONS

Stacy Baker. "Assortment planning for apparel retailers—2005 Management briefing: Benefits of assortment planning." Just—Style : Assortment planning for apparel retailers—2005 Management Jun. 1, 2005.*

(Continued)

*Primary Examiner* — Olusegun Goyea
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to an assortment plan, a merchandise and assortment planning assortment, a merchandise and assortment planning material, a merchandise and assortment planning product procurement arrangement, a merchandise and assortment planning sales price specification calculation, and/or a merchandise and assortment planning store layout element business object.

3 Claims, 136 Drawing Sheets

U.S. PATENT DOCUMENTS

| | | | | |
|---|---|---|---|---|
| 5,983,284 | A | 11/1999 | Argade | |
| 6,047,264 | A | 4/2000 | Fisher et al. | |
| 6,073,137 | A | 6/2000 | Brown et al. | |
| 6,092,196 | A | 7/2000 | Reiche | |
| 6,104,393 | A | 8/2000 | Santos-Gomez | |
| 6,115,690 | A | 9/2000 | Wong | |
| 6,125,391 | A | 9/2000 | Meltzer et al. | |
| 6,138,118 | A | 10/2000 | Koppstein et al. | |
| 6,154,732 | A | 11/2000 | Tarbox | |
| 6,222,533 | B1 | 4/2001 | Notani et al. | |
| 6,226,675 | B1 | 5/2001 | Meltzer et al. | |
| 6,229,551 | B1 | 5/2001 | Huang | |
| 6,311,165 | B1 | 10/2001 | Coutts et al. | |
| 6,327,700 | B1 | 12/2001 | Chen et al. | |
| 6,331,972 | B1 * | 12/2001 | Harris et al. | 370/313 |
| 6,332,163 | B1 | 12/2001 | Bowman-Amuah | |
| 6,424,979 | B1 | 7/2002 | Livingston et al. | |
| 6,434,159 | B1 * | 8/2002 | Woodward et al. | 370/401 |
| 6,438,594 | B1 | 8/2002 | Bowman-Amuah | |
| 6,542,912 | B2 | 4/2003 | Meltzer et al. | |
| 6,591,260 | B1 | 7/2003 | Schwarzhoff et al. | |
| 6,725,122 | B2 | 4/2004 | Mori et al. | |
| 6,738,747 | B1 | 5/2004 | Tanaka et al. | |
| 6,745,229 | B1 | 6/2004 | Gobin et al. | |
| 6,763,353 | B2 | 7/2004 | Li et al. | |
| 6,775,647 | B1 | 8/2004 | Evans et al. | |
| 6,868,370 | B1 | 3/2005 | Burbridge et al. | |
| 6,937,992 | B1 | 8/2005 | Benda et al. | |
| 6,970,844 | B1 | 11/2005 | Bierenbaum | |
| 7,020,594 | B1 | 3/2006 | Chacon | |
| 7,039,606 | B2 | 5/2006 | Hoffman et al. | |
| 7,076,449 | B2 | 7/2006 | Tsunenari et al. | |
| 7,131,069 | B1 | 10/2006 | Rush et al. | |
| 7,206,768 | B1 | 4/2007 | deGroeve et al. | |
| 7,249,157 | B2 | 7/2007 | Stewart et al. | |
| 7,269,569 | B2 | 9/2007 | Spira et al. | |
| 7,292,965 | B1 | 11/2007 | Mehta et al. | |
| 7,321,864 | B1 | 1/2008 | Gendler | |
| 7,363,271 | B2 | 4/2008 | Morimoto | |
| 7,379,931 | B2 | 5/2008 | Morinville | |
| 7,383,990 | B2 | 6/2008 | Veit | |
| 7,406,358 | B2 | 7/2008 | Preiss | |
| 7,481,367 | B2 | 1/2009 | Fees et al. | |
| 7,509,278 | B2 | 3/2009 | Jones | |
| 7,515,697 | B2 | 4/2009 | Eng et al. | |
| 7,516,088 | B2 | 4/2009 | Johnson et al. | |
| 7,536,697 | B2 | 5/2009 | Wiseman et al. | |
| 7,574,383 | B1 | 8/2009 | Parasnis et al. | |
| 7,617,328 | B2 | 11/2009 | Lewis et al. | |
| 7,627,504 | B2 | 12/2009 | Brady et al. | |
| 7,634,482 | B2 * | 12/2009 | Mukherjee et al. | 1/1 |
| 7,788,319 | B2 | 8/2010 | Schmidt et al. | |
| 7,805,383 | B2 * | 9/2010 | Veit et al. | 705/400 |
| 7,865,426 | B2 | 1/2011 | Volpert | |
| 7,873,965 | B2 | 1/2011 | Hayton et al. | |
| 7,895,209 | B2 | 2/2011 | Spence et al. | |
| 7,941,236 | B2 | 5/2011 | Spearman | |
| 2001/0042032 | A1 | 11/2001 | Crawshaw et al. | |
| 2002/0013721 | A1 | 1/2002 | Dabbiere et al. | |
| 2002/0026394 | A1 | 2/2002 | Savage et al. | |
| 2002/0046053 | A1 | 4/2002 | Hare et al. | |
| 2002/0052754 | A1 | 5/2002 | Joyce et al. | |
| 2002/0072988 | A1 | 6/2002 | Aram | |
| 2002/0087481 | A1 | 7/2002 | Harif | |
| 2002/0087483 | A1 | 7/2002 | Harif | |
| 2002/0099634 | A1 | 7/2002 | Coutts et al. | |
| 2002/0107765 | A1 | 8/2002 | Walker | |
| 2002/0112171 | A1 | 8/2002 | Ginter et al. | |
| 2002/0138318 | A1 | 9/2002 | Ellis et al. | |
| 2002/0147668 | A1 | 10/2002 | Smith et al. | |
| 2002/0152104 | A1 | 10/2002 | Ojha et al. | |
| 2002/0152145 | A1 | 10/2002 | Wanta et al. | |
| 2002/0156693 | A1 | 10/2002 | Stewart et al. | |
| 2002/0156930 | A1 | 10/2002 | Velasquez | |
| 2002/0157017 | A1 | 10/2002 | Mi et al. | |
| 2002/0169657 | A1 | 11/2002 | Singh et al. | |
| 2002/0184070 | A1 | 12/2002 | Chen et al. | |
| 2002/0186876 | A1 | 12/2002 | Jones et al. | |
| 2002/0194045 | A1 | 12/2002 | Shay et al. | |
| 2003/0004799 | A1 | 1/2003 | Kish | |
| 2003/0069648 | A1 | 4/2003 | Douglas et al. | |
| 2003/0086594 | A1 | 5/2003 | Gross | |
| 2003/0120502 | A1 * | 6/2003 | Robb et al. | 705/1 |
| 2003/0120665 | A1 | 6/2003 | Fox et al. | |
| 2003/0126077 | A1 | 7/2003 | Kantor et al. | |
| 2003/0167193 | A1 | 9/2003 | Jones et al. | |
| 2003/0171962 | A1 | 9/2003 | Hirth et al. | |
| 2003/0172007 | A1 | 9/2003 | Helmolt et al. | |
| 2003/0172135 | A1 | 9/2003 | Bobick et al. | |
| 2003/0195815 | A1 | 10/2003 | Li et al. | |
| 2003/0204452 | A1 | 10/2003 | Wheeler | |
| 2003/0208389 | A1 | 11/2003 | Kurihara et al. | |
| 2003/0212614 | A1 | 11/2003 | Chu et al. | |
| 2003/0216978 | A1 | 11/2003 | Sweeney et al. | |
| 2003/0220875 | A1 | 11/2003 | Lam et al. | |
| 2003/0229522 | A1 | 12/2003 | Thompson et al. | |
| 2003/0229550 | A1 | 12/2003 | DiPrima et al. | |
| 2003/0233295 | A1 | 12/2003 | Tozawa et al. | |
| 2003/0236748 | A1 | 12/2003 | Gressel et al. | |
| 2004/0015366 | A1 | 1/2004 | Wiseman et al. | |
| 2004/0024662 | A1 | 2/2004 | Gray et al. | |
| 2004/0034577 | A1 | 2/2004 | Van Hoose et al. | |
| 2004/0039665 | A1 | 2/2004 | Ouchi | |
| 2004/0073510 | A1 | 4/2004 | Logan | |
| 2004/0083201 | A1 | 4/2004 | Sholl et al. | |
| 2004/0083233 | A1 | 4/2004 | Willoughby | |
| 2004/0133445 | A1 | 7/2004 | Rajan et al. | |
| 2004/0138942 | A1 | 7/2004 | Pearson et al. | |
| 2004/0148227 | A1 | 7/2004 | Tabuchi et al. | |
| 2004/0172360 | A1 | 9/2004 | Mabrey et al. | |
| 2004/0187140 | A1 | 9/2004 | Aigner et al. | |
| 2004/0220910 | A1 | 11/2004 | Zang et al. | |
| 2004/0254945 | A1 | 12/2004 | Schmidt et al. | |
| 2004/0267714 | A1 | 12/2004 | Frid et al. | |
| 2005/0015273 | A1 | 1/2005 | Iyer | |
| 2005/0021366 | A1 | 1/2005 | Pool et al. | |
| 2005/0033588 | A1 | 2/2005 | Ruiz et al. | |
| 2005/0038744 | A1 | 2/2005 | Viijoen | |
| 2005/0049903 | A1 | 3/2005 | Raja | |
| 2005/0071262 | A1 | 3/2005 | Kobeh et al. | |
| 2005/0080640 | A1 | 4/2005 | Bhaskaran et al. | |
| 2005/0108085 | A1 | 5/2005 | Dakar et al. | |
| 2005/0131947 | A1 | 6/2005 | Laub et al. | |
| 2005/0159997 | A1 | 7/2005 | John | |
| 2005/0171833 | A1 | 8/2005 | Jost et al. | |
| 2005/0182639 | A1 | 8/2005 | Dale | |
| 2005/0187797 | A1 | 8/2005 | Johnson | |
| 2005/0187866 | A1 | 8/2005 | Lee | |
| 2005/0194431 | A1 | 9/2005 | Fees et al. | |
| 2005/0194439 | A1 | 9/2005 | Zuerl et al. | |
| 2005/0197849 | A1 * | 9/2005 | Fotteler et al. | 705/1 |
| 2005/0197851 | A1 | 9/2005 | Veit | |
| 2005/0197878 | A1 * | 9/2005 | Fotteler et al. | 705/8 |
| 2005/0197881 | A1 * | 9/2005 | Fotteler et al. | 705/9 |
| 2005/0197882 | A1 * | 9/2005 | Fotteler et al. | 705/9 |
| 2005/0197886 | A1 | 9/2005 | Veit | |
| 2005/0197887 | A1 | 9/2005 | Zuerl et al. | |
| 2005/0197896 | A1 | 9/2005 | Veit et al. | |
| 2005/0197897 | A1 | 9/2005 | Veit et al. | |
| 2005/0197898 | A1 | 9/2005 | Veit et al. | |
| 2005/0197899 | A1 | 9/2005 | Veit et al. | |
| 2005/0197900 | A1 | 9/2005 | Veit | |
| 2005/0197901 | A1 | 9/2005 | Veit et al. | |
| 2005/0197902 | A1 | 9/2005 | Veit | |
| 2005/0197928 | A1 * | 9/2005 | Fotteler et al. | 705/28 |
| 2005/0197941 | A1 | 9/2005 | Veit | |
| 2005/0209732 | A1 | 9/2005 | Audimoolam et al. | |
| 2005/0210406 | A1 | 9/2005 | Biwer et al. | |
| 2005/0216321 | A1 | 9/2005 | Veit | |
| 2005/0216371 | A1 * | 9/2005 | Fotteler et al. | 705/28 |
| 2005/0216421 | A1 | 9/2005 | Barry et al. | |
| 2005/0222888 | A1 | 10/2005 | Hosoda et al. | |
| 2005/0222896 | A1 | 10/2005 | Rhyne et al. | |
| 2005/0222945 | A1 | 10/2005 | Pannicke et al. | |
| 2005/0228821 | A1 | 10/2005 | Gold | |
| 2005/0234754 | A1 | 10/2005 | Veit | |
| 2005/0246240 | A1 | 11/2005 | Padilla | |

2005/0256753 A1 11/2005 Veit et al.
2006/0004934 A1 1/2006 Guldner et al.
2006/0005098 A1 1/2006 Lotz et al.
2006/0020515 A1 1/2006 Lee et al.
2006/0026586 A1 2/2006 Remmel et al.
2006/0036941 A1 2/2006 Neil
2006/0047574 A1 3/2006 Sundaram et al.
2006/0047598 A1 3/2006 Hansen
2006/0059005 A1 3/2006 Horn et al.
2006/0059059 A1 3/2006 Horn et al.
2006/0059060 A1 3/2006 Horn et al.
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1 4/2006 Seubert et al.
2006/0085412 A1 4/2006 Johnson et al.
2006/0085450 A1 4/2006 Seubert et al.
2006/0089885 A1 4/2006 Finke et al.
2006/0095373 A1 5/2006 Venkatasubramanian et al.
2006/0184435 A1 8/2006 Mostowfi
2006/0212376 A1 9/2006 Snyder et al.
2006/0280302 A1 12/2006 Baumann et al.
2006/0282360 A1 12/2006 Kahn et al.
2007/0027742 A1 2/2007 Emuchay et al.
2007/0043583 A1 2/2007 Davulcu et al.
2007/0055688 A1 3/2007 Blattner
2007/0078799 A1 4/2007 Huber-Buschbeck et al.
2007/0112574 A1 5/2007 Greene
2007/0124227 A1 5/2007 Dembo et al.
2007/0129978 A1 6/2007 Shirasu et al.
2007/0132585 A1 6/2007 Llorca et al.
2007/0150387 A1 6/2007 Seubert et al.
2007/0150836 A1 6/2007 Deggelmann et al.
2007/0156428 A1 7/2007 Brecht-Tillinger et al.
2007/0156545 A1 7/2007 Lin
2007/0156552 A1 7/2007 Manganiello
2007/0156690 A1 7/2007 Moser et al.
2007/0165622 A1 7/2007 O'Rourke et al.
2007/0214065 A1 9/2007 Kahlon et al.
2007/0225949 A1 9/2007 Sundararajan et al.
2007/0226090 A1 9/2007 Stratton
2007/0255639 A1 11/2007 Seifert
2007/0265860 A1 11/2007 Herrmann et al.
2007/0265862 A1 11/2007 Freund et al.
2007/0294159 A1 12/2007 Cottle
2008/0005012 A1* 1/2008 Deneef .......................... 705/37
2008/0021754 A1 1/2008 Horn et al.
2008/0040243 A1 2/2008 Chang et al.
2008/0046104 A1 2/2008 Van Camp et al.
2008/0046421 A1 2/2008 Bhatia et al.
2008/0120129 A1 5/2008 Seubert et al.
2008/0120190 A1 5/2008 Joao et al.
2008/0120204 A1 5/2008 Conner et al.
2008/0133303 A1 6/2008 Singh et al.
2008/0154969 A1 6/2008 DeBie
2008/0162266 A1 7/2008 Griessmann et al.
2008/0184265 A1 7/2008 Kasi et al.
2008/0196108 A1 8/2008 Dent et al.
2008/0215354 A1 9/2008 Halverson et al.
2008/0243578 A1 10/2008 Veit
2008/0288317 A1 11/2008 Kakar
2009/0006203 A1 1/2009 Fordyce et al.
2009/0063287 A1* 3/2009 Tribout et al. .................. 705/26
2009/0077074 A1 3/2009 Hosokawa
2009/0089198 A1 4/2009 Kroutik
2009/0164497 A1 6/2009 Steinmaier et al.
2009/0192926 A1 7/2009 Tarapata
2009/0193432 A1 7/2009 McKegney et al.
2009/0222360 A1* 9/2009 Schmitt et al. .................. 705/29
2009/0248431 A1 10/2009 Schoknecht et al.
2009/0248547 A1* 10/2009 Doenig et al. .................. 705/28
2009/0271245 A1* 10/2009 Joshi et al. ..................... 705/10
2009/0300578 A1 12/2009 Neil
2009/0326988 A1 12/2009 Barth et al.
2010/0014510 A1 1/2010 Boreli et al.
2010/0070391 A1 3/2010 Storr et al.
2010/0070395 A1 3/2010 Elkeles et al.
2010/0106555 A1* 4/2010 Mneimneh et al. ............. 705/10
2010/0161425 A1 6/2010 Sideman
2011/0046775 A1 2/2011 Bailey et al.

FOREIGN PATENT DOCUMENTS

CN 1632806 6/2005
CN 1767537 5/2006
CN 101174957 5/2008

OTHER PUBLICATIONS

"Visual and Quantitative Assortment Planning Applications Drive Partnership and Profits." PR Newswire Jan. 12, 2006.*
"DOTS Inc. Selects Compass Software's smartmerchandising for Merchandise Planning and Assortment Planning." PR Newswire Dec. 11, 2002.*
"Header", Newton's Telecom Dictionary; 12th Edition, 2004; pp. 389-390).
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Appl. No. 11/864,871 on Apr. 21, 2010; 20 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
He, Ning et al.; "B2B Contract Implementation Using Windows DNS"; 2001; pp. 71-79.
FSML-Financial Services Markup Language (Jul. 14, 1999) http://xml.coverpages.org/FSML-v1500a.pdf; pp. 1-159.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.

Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
SAP Structured Entity Relationship Model (SAP-SERM) for R/3 System Release 4.0 Introduction and Index; Dec. 1998; 26 pages.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.
"UML in the .com Enterprise. Modeling CORBA, Components, XML/XMI and Metadata Workshop"; http://www.omg.org/news/meetings/workshops/uml_presentations.htm.
Medjahed, Brahim et al; "Business-to-Business Interactions: Issues and Enabling Technologies"; The VLDB Journal; vol. 12, No. 1; Apr. 3, 2003; pp. 59-89.
Medjahed, Brahim et al.; "Composing Web Services on the Semantic Web"; The VLDB Journal; vol. 12, No. 4, Sep. 23, 2003; pp. 333-351.
Born, Marc et al.; "Customizing UML for Component Design"; www.dot-profile.de; UML Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.

Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
Newton's Telecom Dictionary; 18th Edition; 2002; pp. 347, 454.
Notice of Allowance issued in related U.S. Appl. No. 12/147,395 on Oct. 26, 2010; 10 pages.
Office Action issued in related U.S. Appl. No. 12/147,399 on Jan. 26, 2011; 16 pages.
Notice of Allowance issued in related U.S. Appl. No. 11/775,821 on Oct. 22, 2010; 4 pages.
Notice of Allowance issued in related U.S. Appl. No. 11/364,538 on Dec. 13, 2010; 5 pages.
Notice of Allowance issued in related U.S. Appl. No. 11/731,857 on Nov. 29, 2010; 4 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Office Action issued in related U.S. Appl. No. 11/864,871 on Oct. 1, 2010; 30 pages.
Office Action issued in related U.S. Appl. No. 12/059,971 on Nov. 4, 2010; 20 pages.
Office Action issued in related U.S. Appl. No. 12/060,149 on Aug. 26, 2010; 15 pages.
Notice of Allowance issued in related U.S. Appl. No. 12/060,178 on Dec. 6, 2010; 4 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in U.S. Appl. No. 11/155,368 on Oct. 7, 2010; 4 pages.
Notice of Allowance issued in related U.S. Appl. No. 11/166,065 on Sep. 20, 2010; 6 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Notice of Allowance issued in related U.S. Appl. No. 12/147,449 on Apr. 28, 2011; 9 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Office Action issued in related U.S. Appl. No. 12/059,804 on Apr. 28, 2011; 14 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Office Action issued in related U.S. Appl. No. 12/060,155 on May 10, 2011; 8 pages.
Notice of Allowance issued in related U.S. Appl. No. 11/145,464 on Feb. 23, 2011; 7 pages.
Notice of Allowance issued in U.S. Appl. No. 11/155,368 on Mar. 14, 2011; 7 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/775,821 on Feb. 4, 2011; 4 pages.
Office Action issued in U.S. Appl. No. 11/864,811 on Mar. 18, 2011; 10 pages.
Definition of "header" and "message header"; Newton's Telecom Dictionary; 18th Edition; 2002; pp. 347, 464.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.

Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Altintas et al.; "Aurora Software Product Line"; Cybersoft Information Technologies Co.; 2005; pp. 1-8.
Himoff et al.; "Magenta Technology: Multi-Agent Systems for Industrial Logistics"; AAMAS'05; Jul. 25-29, 2005; 2005 ACM; pp. 60-66:1-7).
Gable, Julie; "Enterprise Application Integration"; Information Management Journal; Mar./Apr. 2002; pp. 48-52.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML-Message Queuing Markup Language"; Proceedings of the 4th IEEE International Workshop on Advanced Issues of E-Commerce and Web-Based Information Systems (WECWIS 2002); 2002; 8 pages.
Communication Pursuant to Article 94(3) issued in European Application No. 05757432.9 on Apr. 12, 2011; 5 pages.
Communication Pursuant to Article 94(3) issued in European Application No. 05766672.9 on Jul. 14, 2011; 4 pages.
Notice of Allowance issued in U.S. Appl. No. 12/147,395 on May 4, 2011; 10 pages.
Office Action issued in related U.S. Appl. No. 12/334,175 on May 27, 2011; 12 pages.
Notice of Allowance issued in related U.S. Appl. No. 11/731,857 on Dec. 14, 2011; 7 pages.
Office Action issued in U.S. Appl. No. 12/147,414 on Oct. 26, 2011; 27 pages.
Office Action issued in U.S. Appl. No. 12/147,378 on Jun. 17, 2011; 10 pages.
Notice of Allowance issued in U.S. Appl. No. 12/147,378 on Nov. 9, 2011; 16 pages.
Office Action issued in U.S. Appl. No. 12/323,116 on Sep. 6, 2011; 8 pages.
Office Action issued in U.S. Appl. No. 12/323,116 on Jan. 27, 2012; 7 pages.
Office Action issued in U.S. Appl. No. 12/571,140 on Sep. 26, 2011; 14 pages.
Notice of Allowance issued in U.S. Appl. No. 12/571,140 on Mar. 20, 2012; 16 pages.
Office Action issued in U.S. Appl. No. 12/571,154 on Apr. 2, 2012; 13 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in related U.S. Appl. No. 12/060,054 on Dec. 7, 2011; 15 pages.
Office Action issued in U.S. Appl. No. 12/060,144 on Jun. 23, 2011; 16 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Office Action issued in related U.S. Appl. No. 12/059,860 on Aug. 3, 2011; 15 pages.
Office Action issued in related U.S. Appl. No. 12/059,860 on Jan. 23, 2012; 16 pages.
Office Action issued in related U.S. Appl. No. 12/060,192 on Sep. 6, 2011; 18 pages.
Notice of Allowance issued in U.S. Appl. No. 12/060,192 on Mar. 2, 2012; 18 pages.
Notice of Allowance issued in related U.S. Appl. No. 12/060,178 on Sep. 2, 2011; 9 pages.
Office Action issued in related U.S. Appl. No. 12/060,062 on Jul. 13, 2011; 16 pages.
Notice of Allowance issued in U.S. Appl. No. 12/060,062 on Mar. 20, 2012; 16 pages.
Office Action issued in related U.S. Appl. No. 12/060,155 on Oct. 31, 2011; 15 pages.
Notice of Allowance issued in U.S. Appl. No. 12/060,155 on Apr. 24, 2012; 15 pages.
Office Action issued in related U.S. Appl. No. 12/060,171 on Mar. 1, 2012; 19 pages.
Notice of Allowance issued in related U.S. Appl. No. 11/145,464 on Feb. 6, 2012; 7 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Office Action issued in U.S. Appl. No. 12/815,698 on Jan. 20, 2012; 10 pages.
Office Action issued in U.S. Appl. No. 12/815,618 on Dec. 22, 2011; 8 pages.
Office Action issued in U.S. Appl. No. 12/816,293 on Apr. 25, 2012; 10 pages.
Notice of Allowance issued in related U.S. Appl. No. 11/864,866 on Jul. 22, 2011; 6 pages.
Notice of Allowance issued in related U.S. Appl. No. 11/864,866 on Mar. 13, 2012; 7 pages.
Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in related U.S. Appl. No. 11/364,538 on Jul. 26, 2011; 6 pages.
Office Action issued in U.S. Appl. No. 11/864,811 on Jul. 26, 2011; 7 pages.
Notice of Allowance issued in U.S. Appl. No. 11/864,811 on Nov. 14, 2011; 8 pages.
Notice of Allowance issued in U.S. Appl. No. 11/864,811 on Mar. 2, 2012; 8 pages.
Office Action issued in U.S. Appl. No. 11/864,786 on Mar. 30, 2012; 12 pages.
Notice of Allowance issued in related U.S. Appl. No. 11/864,832 on Jul. 7, 2011;11 pages.
Notice of Allowance issued in related U.S. Appl. No. 11/864,832 on Jan. 9, 2012;12 pages.
Office Action issued in related U.S. Appl. No. 11/864,863 on Jul. 21, 2011; 29 pages.
Office Action issued in related U.S. Appl. No. 11/864,863 on Dec. 22, 2011; 20 pages.
Notice of Allowance issued in related U.S. Appl. No. 11/803,178 on May 17, 2011; 13 pages.
Notice of Allowance issued in U.S. Appl. No. 11/640,422 on Sep. 29, 2011; 7 pages.

* cited by examiner

FIG. 33-1

| Package | level1 | level2 | level3 | level4 | level5 | level6 | level7 | level8 | level9 | Data Type Name |
|---|---|---|---|---|---|---|---|---|---|---|
| AssortmentPlanMessage 33000 | AssortmentPlanMessage 33002 | | | | | | | | | |
| MessageHeader 33004 | | MessageHeader 33006 | | | | | | | | BusinessDocumentMessageHeader 33008 |
| | | | ID 33010 | | | | | | | BusinessDocumentMessageID 33012 |

FIG. 33-2

| Package | level1 | level2 | level3 | level4 | level5 | level6 | level7 | level8 | level9 | Data Type Name |
|---|---|---|---|---|---|---|---|---|---|---|
| | | | Creation-DateTime 33014 | | | | | | | DateTime 33016 |
| | | | … | | | | | | | … |
| AssortmentPlan 33018 | | Assort-ment-Plan 33020 | | | | | | | | <MT>AsstmtPln 33022 |
| | | | @actionCode 33024 | | | | | | | ActionCode 33026 |
| | | | ID 33028 | | | | | | | RetailPurchas-ingPlanID 33030 |

FIG. 33-3

| Package | level1 | level2 | level3 | level4 | level5 | level6 | level7 | level8 | level9 | Data Type Name |
|---|---|---|---|---|---|---|---|---|---|---|
| | | | AssortmentTypeCode 33032 | | | | | | | Assortment-TypeCode 33034 |
| | | | Ordinal-Number-Value 33036 | | | | | | | OrdinalNumer-Value 33038 |
| | | | Description 33040 | | | | | | | <MT>Desc 33042 |
| | | | | Description 33044 | | | | | | SHORT_Description 33046 |
| | | | Pro-ductCate-gory 33048 | | | | | | | <MT>ProdCat 33050 |

FIG. 33-4

| Package | level1 | level2 | level3 | level4 | level5 | level6 | level7 | level8 | level9 | Data Type Name |
|---|---|---|---|---|---|---|---|---|---|---|
| | | | | InternalID 33052 | | | | | | ProductCategoryInternalID 33054 |
| | | | | ProductCategoryHierarchyID 33056 | | | | | | ProductCategoryHierarchyID 33058 |
| | | | | ProductCategoryHierarchyTypeCode 33060 | | | | | | ProductCategoryHierarchyTypeCode 33062 |
| | | | Season 33064 | | | | | | | <MT>Seasn 33066 |
| | | | | YearID 33068 | | | | | | SeasonYearID 33070 |

FIG. 33-5

| Package | level1 | level2 | level3 | level4 | level5 | level6 | level7 | level8 | level9 | Data Type Name |
|---|---|---|---|---|---|---|---|---|---|---|
| | | | | CategoryCode 33072 | | | | | | SeasonCategoryCode 33074 |
| | | | | PeriodTypeCode 33076 | | | | | | SeasonPeriodTypeCode 33078 |
| | | | SalesOrganisationID 33080 | | | | | | | OrganisationalCentreID 33082 |
| | | | DistributionChannelCode 33084 | | | | | | | DistributionChannelCode 33086 |

FIG. 33-6

| Package | | | level1 | level2 | level3 | level4 | level5 | level6 | level7 | level8 | level9 | Data Type Name |
|---|---|---|---|---|---|---|---|---|---|---|---|---|
| | | | | | PurchasingOrganisationID 33088 | | | | | | | OrganisationalCentreID 33090 |
| | | | | | PurchasingGroupID 33092 | | | | | | | PurchachingGroupID 33094 |
| Item 33096 | | | | | Item 33098 | | | | | | | <MT>Itm 33100 |
| | | | | | | CompleteIndicator 33102 | | | | | | Indicator 33104 |
| | | | | | | Date 33106 | | | | | | Date 33108 |

FIG. 33-7

| Package | level1 | level2 | level3 | level4 | level5 | level6 | level7 | level8 | level9 | Data Type Name |
|---|---|---|---|---|---|---|---|---|---|---|
| | | | | FiscalYearVari-antCode 33110 | | | | | | FiscalYearVari-antCode 33112 |
| | | | | FiscalYear 33114 | | | | | | FiscalYearID 33116 |
| | | | | PostingPeriod 33118 | | | | | | Period 33120 |
| | | | | MaterialInter-nalID 33122 | | | | | | ProductInter-nalID 33124 |
| | | | | MaterialType-Code 33126 | | | | | | MaterialType-Code 33128 |

FIG. 33-8

| Package | level1 | level2 | level3 | level4 | level5 | level6 | level7 | level8 | level9 | Data Type Name |
|---|---|---|---|---|---|---|---|---|---|---|
| | | | | MaterialMer-chandiseType-Code 33130 | | | | | | Material-MechandiseTypeCode 33132 |
| | | | | ProductProper-tyListID 33134 | | | | | | ProductProper-tyListID 33136 |
| | | | | ReferenceMate-rial 33138 | | | | | | ProductInter-nalID 33140 |
| | | | | BaseUnitof-Measure 33142 | | | | | | MeasureUnit-Code 33144 |
| | | | | SupplierID 33146 | | | | | | PartyID 33148 |

FIG. 33-9

| Package | level1 | level2 | level3 | level4 | level5 | level6 | level7 | level8 | level9 | Data Type Name |
|---|---|---|---|---|---|---|---|---|---|---|
| | | | | SupplierName 33150 | | | | | | LANGUAGEINDEPENDENT_MEDIUM_Name 33152 |
| | | | | DirectDelivery-Indicator 33154 | | | | | | Indicator 33156 |
| | | | | StoreConsign-mentIndicator 33158 | | | | | | Indicator 33160 |
| | | | | DistributionCen-terConsign-mentIndicator 33162 | | | | | | Indicator 33164 |
| | | | | Description 33166 | | | | | | <MT>Desc 33168 |

FIG. 33-10

| Package | level1 | level2 | level3 | level4 | level5 | level6 | level7 | level8 | level9 | Data Type Name |
|---|---|---|---|---|---|---|---|---|---|---|
| | | | | | Description 33170 | | | | | SHORT_Description 33172 |
| SalesPriceSpecification-Calculation 33174 | | | | SalesPriceSpecificationCalculation 33176 | | | | | | <MT>SlsPrSpecCalc 33178 |
| | | | | | SalesOrganisationID 33180 | | | | | Organisational-CentreID 33182 |
| | | | | | Distribution-ChannelCode 33184 | | | | | Distribution-ChannelCode 33186 |
| | | | | | SalesPrice 33188 | | | | | Price 33190 |

FIG. 33-11

| Package | level1 | level2 | level3 | level4 | level5 | level6 | level7 | level8 | level9 | Data Type Name |
|---|---|---|---|---|---|---|---|---|---|---|
| ProductProcurementArrangement 33192 | | | | ProductProcurementArrangement 33194 | | | | | | <MT>ProdProcmtArrgmt 33196 |
| | | | | | PurchasingOrganisationID 33198 | | | | | Organisational-CentreID 33200 |
| | | | | | Purchasing-GroupID 33202 | | | | | Purchasing-GroupID 33204 |
| | | | | | Purchasing-Price 33206 | | | | | Price 33208 |
| | | | | | SupplierID 33210 | | | | | PartyID 33212 |

FIG. 33-12

| Package | level1 | level2 | level3 | level4 | level5 | level6 | level7 | level8 | level9 | Data Type Name |
|---|---|---|---|---|---|---|---|---|---|---|
| ProductCategory 33214 | | | | ProductCategory 33216 | | | | | | <MT>ItmProdCat 33218 |
| | | | | | InternalID 33220 | | | | | ProductCategoryInternalID 33222 |
| | | | | | ProductCategoryHierarchyID 33224 | | | | | ProductCategoryHierarchyID 33226 |
| | | | | | ProductCategoryHierarchyTypeCode 33228 | | | | | ProductCategoryHierarchyTypeCode 33230 |
| PrePackInformation 33232 | | | | Prepack 33234 | | | | | | <MT>Prepack 33236 |

FIG. 33-13

| Package | level1 | level2 | level3 | level4 | level5 | level6 | level7 | level8 | level9 | Data Type Name |
|---|---|---|---|---|---|---|---|---|---|---|
| | | | | | TotalQuantity 33238 | | | | | Quantity 33240 |
| | | | | | AssortmentID 33242 | | | | | AssortmentID 33244 |
| | | | | | Property-Valuation 33246 | | | | | PropertyValua-tion 33248 |
| | | | | | | Proper-tyRefer-ence 33250 | | | | PropertyRefer-ence 33252 |
| | | | | | | | ID 33254 | | | PropertyID 33256 |

FIG. 33-14

| Package | level1 | level2 | level3 | level4 | level5 | level6 | level7 | level8 | level9 | Data Type Name |
|---|---|---|---|---|---|---|---|---|---|---|
| | | | | | | Value-Group 33258 | | | | PropertyValuationValueGroup 33260 |
| | | | | | | | Proper-tyValue 33262 | | | PropertyValue 33264 |
| | | | | | | | | CodeSpecification 33266 | | PropertyValue-CodeSpecification 33268 |
| | | | | | ProductSpecificationSplitID 33270 | | | | | ProductSpecificationSplitID 33272 |
| | | | | | Ratio 33274 | | | | | <MT>Ratio 33276 |

FIG. 33-15

| Package | level1 | level2 | level3 | level4 | level5 | level6 | level7 | level8 | level9 | Data Type Name |
|---|---|---|---|---|---|---|---|---|---|---|
| | | | | | | Quota-Value 33278 | | | | QuotaValue 33280 |
| | | | | | | Property-Valuation 33282 | | | | PropertyValua-tion 33284 |
| | | | | | | | Proper-tyRefer ence 33286 | | | PropertyRefer-ence 33288 |
| | | | | | | | | ID 33290 | | PropertyID 33292 |
| | | | | | | | Value-Group 33294 | | | PropertyValua-tionValueGroup 33296 |

FIG. 33-16

| Package | level1 | level2 | level3 | level4 | level5 | level6 | level7 | level8 | level9 | Data Type Name |
|---|---|---|---|---|---|---|---|---|---|---|
| | | | | | | | | Prop-erty-Value 33298 | | PropertyValue 33300 |
| | | | | | | | | | CodeSpecifi-cation 33302 | PropertyValue-CodeSpecifica-tion 33304 |
| Quantity 33306 | | | | Quantity 33308 | | | | | | <MT>Qty 33310 |
| | | | | | ID 33312 | | | | | RetailPurchas-ingPlanItem-QuantityID 33314 |

FIG. 33-17

| Package | level1 | level2 | level3 | level4 | level5 | level6 | level7 | level8 | level9 | Data Type Name |
|---|---|---|---|---|---|---|---|---|---|---|
| | | | | | ParentID 33316 | | | | | RetailPurchasingPlanItem-QuantityID 33318 |
| | | | | | AssortmentID 33320 | | | | | AssortmentID 33322 |
| | | | | | Reallocation-RequiredIndicator 33324 | | | | | Indicator 33326 |
| | | | | | Property-Valuation 33328 | | | | | PropertyValuation 33330 |

FIG. 33-18

| Package | level1 | level2 | level3 | level4 | level5 | level6 | level7 | level8 | level9 | Data Type Name |
|---|---|---|---|---|---|---|---|---|---|---|
| | | | | | | Proper-tyRefer-ence 33332 | | | | PropertyRefer-ence 33334 |
| | | | | | | | ID 33336 | | | PropertyID 33338 |
| | | | | | | Value-Group 33340 | | | | PropertyValua-tionValueGroup 33342 |
| | | | | | | | Proper-tyValue 33344 | | | PropertyValue 33346 |
| | | | | | | | | CodeS pecifi-cation 33348 | | PropertyValue-CodeSpecifica-tion 33350 |

FIG. 33-19

| Package | level1 | level2 | level3 | level4 | level5 | level6 | level7 | level8 | level9 | Data Type Name |
|---|---|---|---|---|---|---|---|---|---|---|
| | | | | | Quantity 33352 | | | | | Quantity 33354 |
| Target-Sales 33356 | | | Target-Sales 33358 | | | | | | | <MT>TgtSls 33360 |
| | | | | AssortmentID 33362 | | | | | | AssortmentID 33364 |
| | | | | ReallocationRequiredIndicator 33366 | | | | | | Indicator 33368 |
| | | | | Procurement-CostAmount 33370 | | | | | | Amount 33372 |

FIG. 33-20

| Package | level1 | level2 | level3 | level4 | level5 | level6 | level7 | level8 | level9 | Data Type Name |
|---|---|---|---|---|---|---|---|---|---|---|
| | | | | Procurement-NetCostAmount 33374 | | | | | | Amount 33376 |
| | | | | RetailNetSales-VolumeAmount 33378 | | | | | | Amount 33380 |
| | | | | RetailSales-VolumeAmount 33382 | | | | | | Amount 33384 |
| | | | | Quantity 33386 | | | | | | Quantity 33388 |

FIG. 39-1

| Package | level1 | level2 | level3 | level4 | level5 | level6 | level7 | Data Type Name |
|---|---|---|---|---|---|---|---|---|
| MerchandiseAndAssortmentPlanningAssortmentMessage 39000 | MerchandiseAndAssortmentPlanningAssortmentMessage 39002 | | | | | | | |
| MessageHeader 39004 | | MessageHeader 39006 | | | | | | BusinessDocumentMessageHeader 39008 |
| | | | ID 39010 | | | | | BusinessDocumentMessageID 39012 |

FIG. 39-2

| Package | level1 | level2 | level3 | level4 | level5 | level6 | level7 | Data Type Name |
|---|---|---|---|---|---|---|---|---|
| | | | Creation-DateTime 39014 | | | | | DateTime 39016 |
| | | | … | | | | | … |
| MerchandiseAn-dAssortment-PlanningAssort-ment 39018 | | Merchan-diseAn-dAssort-mentPlan-ningAs-sortment 39020 | | | | | | <MT>MrchdsAn-dAsstmtPlngAsstmt 39022 |
| | | | @actionCode 39024 | | | | | ActionCode 39026 |
| | | | ID 39028 | | | | | AssortmentID 39030 |
| | | | TypeCode 39032 | | | | | AssortmentType-Code 39034 |

FIG. 39-3

| Package | level1 | level2 | level3 | level4 | level5 | level6 | level7 | Data Type Name |
|---|---|---|---|---|---|---|---|---|
| | | | UsedSpaceQuantity 39036 | | | | | Quantity 39038 |
| | | | Description 39040 | | | | | <MT>Desc 39042 |
| | | | | Description 39044 | | | | SHORT_Description 39046 |
| Dimension 39048 | | | Dimension 39050 | | | | | <MT>Dimn 39052 |
| | | | | OrdinalNumberValue 39054 | | | | OrdinalNumberValue 39056 |

FIG. 39-4

| Package | level1 | level2 | level3 | level4 | level5 | level6 | level7 | Data Type Name |
|---|---|---|---|---|---|---|---|---|
| | | | | MerchandiseAndAssortmentPlanningAssortmentPropertyValue 39058 | | | | PropertyValue 39060 |
| | | | | | CodeSpecification 39062 | | | PropertyValueCodeSpecification 39064 |
| | | | | Description 39066 | | | | SHORT_Description 39068 |
| ProductCategory 39070 | | | ProductCategory 39072 | | | | | <MT>ProdCat 39074 |
| | | | | InternalID 39076 | | | | ProductCategoryInternalID 39078 |

FIG. 39-5

| Package | level1 | level2 | level3 | level4 | level5 | level6 | level7 | Data Type Name |
|---|---|---|---|---|---|---|---|---|
| | | | | ProductCategoryHierarchyID 39080 | | | | ProductCategoryHierarchyID 39082 |
| | | | | ProductCategoryHierarchyTypeCode 39084 | | | | ProductCategoryHierarchyTypeCode 39086 |
| ReceivingStore 39088 | | | ReceivingStore 39090 | | | | | <MT>RcvgStore 39092 |
| | | | | @actionCode 39094 | | | | ActionCode 39096 |
| | | | | StoreInternalID 39098 | | | | StoreInternalID 39100 |

FIG. 39-6

| Package | level1 | level2 | level3 | level4 | level5 | level6 | level7 | Data Type Name |
|---|---|---|---|---|---|---|---|---|
| | | | | ValidityPeriod 39102 | | | | DatePeriod 39104 |
| ReceivingParty 39106 | | | Receiving-Party 39108 | | | | | <MT>RcvgPty 39110 |
| | | | | @actionCode 39112 | | | | ActionCode 39114 |
| | | | | CustomerID 39116 | | | | CustomerID 39118 |
| | | | | ValidityPeriod 39120 | | | | DatePeriod 39122 |
| StoreLayoutEle-ment 39124 | | | StoreLay-outElement 39126 | | | | | <MT>StoreLaytElmnt 39128 |

FIG. 39-7

| Package | level1 | level2 | level3 | level4 | level5 | level6 | level7 | Data Type Name |
|---|---|---|---|---|---|---|---|---|
| | | | | ID 39130 | | | | StoreLayoutElementID 39132 |
| Version 39134 | | | | Version 39136 | | | | <MT>Vers 39138 |
| | | | | | ID 39140 | | | VersionID 39142 |
| | | | | | ValidityPeriod 39144 | | | DatePeriod 39146 |
| Material 39148 | | | | | Material 39150 | | | <MT>Matl 39152 |
| | | | | | | InternalID 39154 | | ProductInternalID 39156 |

FIG. 39-8

| Package | level1 | level2 | level3 | level4 | level5 | level6 | level7 | Data Type Name |
|---|---|---|---|---|---|---|---|---|
| | | | | | | OrdinalNumberValue 39158 | | OrdinalNumberValue 39160 |
| | | | | | | StandardID 39162 | | ProductStandardID 39164 |
| | | | | | | MerchandiseTypeCode 39166 | | MaterialMerchandiseTypeCode 39168 |
| | | | | | | ShelfOptimizationIndexValue 39170 | | MaterialShelfOptimizationIndexValue 39172 |
| | | | | | | StoreFixtureOrdinalNumberValue 39174 | | OrdinalNumberValue 39176 |

FIG. 39-9

| Package | level1 | level2 | level3 | level4 | level5 | level6 | level7 | Data Type Name |
|---|---|---|---|---|---|---|---|---|
| | | | | | | SalesPrice 39178 | | Price 39180 |
| | | | | | | Purchasing-Price 39182 | | Price 39184 |
| | | | | | | Description 39186 | | <MT>MatlDesc 39188 |
| | | | | | | | Description 39190 | SHORT_Description 39192 |
| Measure 39194 | | | | | | Measure 39196 | | <MT>Msr 39198 |
| | | | | | | | MeasureUnit-Code 39200 | MeasureUnitCode 39202 |

FIG. 39-10

| Package | level1 | level2 | level3 | level4 | level5 | level6 | level7 | Data Type Name |
|---|---|---|---|---|---|---|---|---|
| | | | | | | | Quantity 39204 | Quantity 39206 |
| | | | | | | | Quanti-tyTypeCode 39208 | QuantityTypeCode 39210 |
| ProductCate-gory 39212 | | | | | | ProductCate-gory 39214 | | <MT>MatlProdCat 39216 |
| | | | | | | | InternalID 39218 | ProductCategory-InternalID 39220 |
| | | | | | | | ProductCate-goryHierar-chyID 39222 | ProductCategory-HierarchyID 39224 |

FIG. 39-11

| Package | level1 | level2 | level3 | level4 | level5 | level6 | level7 | Data Type Name |
|---|---|---|---|---|---|---|---|---|
| | | | | | | | ProductCategoryHierarchyTypeCode 39226 | ProductCategoryHierarchyTypeCode 39228 |
| Quantity 39230 | | | | | | Quantity 39232 | | <MT>MatlQty 39234 |
| | | | | | | | StoreFixtureFacingQuantity 39236 | Quantity 39238 |

FIG. 40-1

| Package | level1 | level2 | level3 | level4 | level5 | Cardinality |
|---|---|---|---|---|---|---|
| MerchandiseAndAssortmentPlanningAssortmentERPRequestMessage 40000 | MerchandiseAndAssortmentPlanningAssortmentERPRequestMessage 40002 | | | | | |
| MessageHeader 40004 | | MessageHeader 40006 | | | | 1 40008 |
| | | | ID 40010 | | | 1 40012 |
| | | | CreationDateTime 40014 | | | 1 40016 |
| | | | … | | | 0..1 40018 |

FIG. 40-2

| Package | level1 | level2 | level3 | level4 | level5 | Cardinality |
|---|---|---|---|---|---|---|
| MerchandiseAndAssortmentPlanningAssortment 40020 | | MerchandiseAndAssortmentPlanningAssortment 40022 | | | | 1 40024 |
| | | | @actionCode 40026 | | | 1 40028 |
| | | | ID 40030 | | | 1 40032 |
| | | | TypeCode 40034 | | | 0..1 40036 |
| | | | UsedSpaceQuantity 40038 | | | 0..1 40040 |
| | | | Description 40042 | | | 0..n 40044 |

FIG. 40-3

| Package | level1 | level2 | level3 | level4 | level5 | Cardinality |
|---|---|---|---|---|---|---|
| | | | | Description 40046 | | 1 40048 |
| Dimension 40050 | | | Dimension 40052 | | | 0..n 40054 |
| | | | | OrdinalNumberValue 40056 | | 1 40058 |
| | | | | MerchandiseAndAssortmentPlanningAssortmentPropertyValue 40060 | | 1 40062 |
| | | | | | CodeSpecification 40064 | 0..1 40066 |
| | | | | Description 40068 | | 1 40070 |

FIG. 40-4

| Package | level1 | level2 | level3 | level4 | level5 | Cardinality |
|---|---|---|---|---|---|---|
| ProductCategory 40072 | | | ProductCategory 40074 | | | 0..1 40076 |
| | | | | InternalID 40078 | | 1 40080 |
| | | | | ProductCategoryHierarchyID 40082 | | 1 40084 |
| | | | | ProductCategoryHierar-chyTypeCode 40086 | | 1 40088 |
| ReceivingStore 40090 | | | ReceivingStore 40092 | | | 0..n 40094 |
| | | | | @actionCode 40096 | | 1 40098 |

FIG. 40-5

| Package | level1 | level2 | level3 | level4 | level5 | Cardinality |
|---|---|---|---|---|---|---|
| | | | | StoreInternalID 40100 | | 0..1 40102 |
| | | | | ValidityPeriod 40104 | | 1 40106 |
| ReceivingParty 40108 | | | ReceivingParty 40110 | | | 0..n 40112 |
| | | | | @actionCode 40114 | | 1 40116 |
| | | | | CustomerID 40118 | | 0..1 40120 |
| | | | | ValidityPeriod 40122 | | 1 40124 |

FIG. 41-1

| Package | level1 | level2 | level3 | level4 | level5 | level6 | level7 | Cardinality |
|---|---|---|---|---|---|---|---|---|
| MerchandiseAndAssortmentPlanningAssortmentERPStoreLayoutElementRequestMessage 41000 | MerchandiseAndAssortmentPlanningAssortmentERPStoreLayoutElementRequestMessage 41002 | | | | | | | |
| MessageHeader 41004 | | MessageHeader 41006 | | | | | | 1 41008 |
| | | | ID 41010 | | | | | 1 41012 |
| | | | CreationDateTime 41014 | | | | | 1 41016 |

FIG. 41-2

| Package | level1 | level2 | level3 | level4 | level5 | level6 | level7 | Cardinality |
|---|---|---|---|---|---|---|---|---|
| | | | … | | | | | 0..1 41018 |
| MerchandiseAndAssortmentPlanningAssortment 41020 | | MerchandiseAndAssortment-PlanningAssortment 41022 | | | | | | 1 41024 |
| | | | ID 41026 | | | | | 1 41028 |
| | | | Description 41030 | | | | | 0..n 41032 |
| | | | | Description 41034 | | | | 1 41036 |

FIG. 41-3

| Package | level1 | level2 | level3 | level4 | level5 | level6 | level7 | Cardi-nality |
|---|---|---|---|---|---|---|---|---|
| Dimen-sion 41038 | | | Dimension 41040 | | | | | 0..n 41042 |
| | | | | OrdinalNum-berValue 41044 | | | | 1 41046 |
| | | | | Merchandise-AndAssort-mentPlannin-gAssortment-PropertyValue 41048 | | | | 1 41050 |
| | | | | | CodeSpec ification 41052 | | | 0..1 41054 |
| | | | | Description 41056 | | | | 1 41058 |

FIG. 41-4

| Package | level1 | level2 | level3 | level4 | level5 | level6 | level7 | Cardi-nality |
|---|---|---|---|---|---|---|---|---|
| StoreLayoutElement 41060 | | | StoreLayoutElement 41062 | | | | | 0..1 41064 |
| | | | | ID 41066 | | | | 1 41068 |
| Version 41070 | | | | Version 41072 | | | | 1..n 41074 |
| | | | | | ID 41076 | | | 1 41078 |
| | | | | | ValidityPeriod 41080 | | | 1 41082 |
| Material 41084 | | | | | Material 41086 | | | 0..n 41088 |

FIG. 41-5

| Package | level1 | level2 | level3 | level4 | level5 | level6 | level7 | Cardi-nality |
|---|---|---|---|---|---|---|---|---|
| | | | | | | InternalID 41090 | | 1 41092 |
| | | | | | | OrdinalNumber-Value 41094 | | 1 41096 |
| | | | | | | StandardID 41098 | | 1 41100 |
| | | | | | | Merchan-diseTypeCode 41102 | | 1 41104 |
| | | | | | | ShelfOptimiza-tionIndexValue 41106 | | 0..1 41108 |

FIG. 41-6

| Package | level1 | level2 | level3 | level4 | level5 | level6 | level7 | Cardinality |
|---|---|---|---|---|---|---|---|---|
| | | | | | | StoreFixtureOrdinalNumberValue 41110 | | 0..1 41112 |
| | | | | | | SalesPrice 41114 | | 0..1 41116 |
| | | | | | | PurchasingPrice 41118 | | 0..1 41120 |
| | | | | | | Description 41122 | | 0..n 41124 |
| | | | | | | | Description 41126 | 1 41128 |
| Measure 41130 | | | | | | Measure 41132 | | 0..n 41134 |

FIG. 41-7

| Package | level1 | level2 | level3 | level4 | level5 | level6 | level7 | Cardi-nality |
|---|---|---|---|---|---|---|---|---|
| | | | | | | | MeasureUnitCode 41136 | 1 41138 |
| | | | | | | | Quantity 41140 | 1 41142 |
| | | | | | | | QuantityTypeCode 41144 | 1 41146 |
| Pro-ductCat egory 41148 | | | | | | ProductCategory 41150 | | 0..n 41152 |
| | | | | | | | InternalID 41154 | 1 41156 |
| | | | | | | | ProductCategory-HierarchyID 41158 | 1 41160 |

FIG. 41-8

| Package | level1 | level2 | level3 | level4 | level5 | level6 | level7 | Cardi-nality |
|---|---|---|---|---|---|---|---|---|
| | | | | | | | ProductCategory-HierarchyType-Code 41162 | 1 41164 |
| Quantity 41166 | | | | | | Quantity 41168 | | 0..n 41170 |
| | | | | | | | StoreFixtureFac-ingQuantity 41172 | 1 41174 |

FIG. 42-1

| Package | level1 | level2 | level3 | Cardinality |
|---|---|---|---|---|
| MerchandiseAndAssortmentPlanningAssortmentERPStoreLayoutElementByIDQueryMessage_sync 42000 | MerchandiseAndAssortmentPlanningAssortmentERPStoreLayoutElementByIDQueryMessage_sync 42002 | | | |
| MessageHeader 42004 | | MessageHeader 42006 | | 0..1 42008 |
| | | | ID 42010 | 1 42012 |
| | | | CreationDateTime 42014 | 1 42016 |
| | | | … | 0..1 42018 |

FIG. 42-2

| Package | level1 | level2 | level3 | Cardinality |
|---|---|---|---|---|
| Selection 42020 | | MerchandiseAndAssortmentPlanningAssortmentStoreLayoutElementSelectionByID 42022 | | 1 42024 |
| | | | MerchandiseAndAssortmentPlanningAssortmentID 42026 | 1 42028 |
| | | | VersionID 42030 | 0..1 42032 |
| | | | ValidityPeriod 42034 | 0..1 42036 |

FIG. 43-1

| Package | level1 | level2 | level3 | level4 | level5 | level6 | level7 | Cardinality |
|---|---|---|---|---|---|---|---|---|
| MerchandiseAndAssortmentPlanningAssortmentERPStoreLayoutElementByIDResponseMessage_sync 43000 | MerchandiseAndAssortmentPlanningAssortmentERPStoreLayoutElementByIDResponseMessage_sync 43002 | | | | | | | |
| MessageHeader 43004 | | MessageHeader 43006 | | | | | | 0..1 43008 |
| | | | ID 43010 | | | | | 1 43012 |
| | | | CreationDateTime 43014 | | | | | 1 43016 |
| | | | … | | | | | 0..1 43018 |

FIG. 43-2

| Package | level1 | level2 | level3 | level4 | level5 | level6 | level7 | Cardinality |
|---|---|---|---|---|---|---|---|---|
| MerchandiseAndAssortmentPlanningAssortment 43020 | | MerchandiseAndAssortmentPlanningAssortment 43022 | | | | | | 0..1 43024 |
| | | | ID 43026 | | | | | 1 43028 |
| | | | Description 43030 | | | | | 0..n 43032 |
| | | | | Description 43034 | | | | 1 43036 |
| Dimension 43038 | | | Dimension 43040 | | | | | 0..n 43042 |

FIG. 43-3

| Package | level1 | level2 | level3 | level4 | level5 | level6 | level7 | Cardi-nality |
|---|---|---|---|---|---|---|---|---|
| | | | | OrdinalNum-berValue 43044 | | | | 1 43046 |
| | | | | Merchandise-AndAssort-mentPlannin-gAssortment-PropertyValue 43048 | | | | 1 43050 |
| | | | | | CodeSpe cification 43052 | | | 0..1 43054 |
| | | | | Description 43056 | | | | 1 43058 |
| StoreLayoutElement 43060 | | | StoreLay-outEle-ment 43062 | | | | | 0..1 43064 |

FIG. 43-4

| Package | level1 | level2 | level3 | level4 | level5 | level6 | level7 | Cardi-nality |
|---|---|---|---|---|---|---|---|---|
| | | | | ID 43066 | | | | 1 43068 |
| Version 43070 | | | | Version 43072 | | | | 1..n 43074 |
| | | | | | ID 43076 | | | 1 43078 |
| | | | | | Valid-ityPeriod 43080 | | | 1 43082 |
| Material 43084 | | | | | Material 43086 | | | 0..n 43088 |
| | | | | | | InternalID 43090 | | 1 43092 |

FIG. 43-5

| Package | level1 | level2 | level3 | level4 | level5 | level6 | level7 | Cardi-nality |
|---|---|---|---|---|---|---|---|---|
| | | | | | | OrdinalNum-berValue 43094 | | 1 43096 |
| | | | | | | StandardID 43098 | | 1 43100 |
| | | | | | | Merchan-diseTypeCode 43102 | | 1 43104 |
| | | | | | | ShelfOptimi-zationIndex-Value 43106 | | 0..1 43108 |
| | | | | | | StoreFixture-OrdinalNum-berValue 43110 | | 0..1 43112 |

FIG. 43-6

| Package | level1 | level2 | level3 | level4 | level5 | level6 | level7 | Cardinality |
|---|---|---|---|---|---|---|---|---|
| | | | | | | SalesPrice 43114 | | 0..1 43116 |
| | | | | | | Purchasing-Price 43118 | | 0..1 43120 |
| | | | | | | Description 43122 | | 0..n 43124 |
| | | | | | | | Description 43126 | 1 43128 |
| Measure 43130 | | | | | | Measure 43132 | | 0..n 43134 |
| | | | | | | | MeasureUnitCode 43136 | 1 43138 |

FIG. 43-7

| Package | level1 | level2 | level3 | level4 | level5 | level6 | level7 | Cardinality |
|---|---|---|---|---|---|---|---|---|
| | | | | | | | Quantity 43140 | 1 43142 |
| | | | | | | | QuantityTypeCode 43144 | 1 43146 |
| ProductCategory 43148 | | | | | | ProductCategory 43150 | | 0..n 43152 |
| | | | | | | | InternalID 43154 | 1 43156 |
| | | | | | | | ProductCategoryHierarchyID 43158 | 1 43160 |

FIG. 43-8

| Package | level1 | level2 | level3 | level4 | level5 | level6 | level7 | Cardi-nality |
|---|---|---|---|---|---|---|---|---|
| | | | | | | | ProductCategory-HierarchyType-Code 43162 | 1 43164 |
| Quantity 43166 | | | | | | Quantity 43168 | | 0..n 43170 |
| | | | | | | | StoreFixtureFac-ingQuantity 43172 | 1 43174 |
| Log 43176 | | Log 43178 | | | | | | 1 43180 |

FIG. 45-1

| Package | level1 | level2 | level3 | level4 | Data Type Name |
|---|---|---|---|---|---|
| MerchandiseandAssortmentPlanningMaterialMessage 45000 | MerchandiseandAssortmentPlanningMaterialMessage 45002 | | | | |
| MessageHeader 45004 | | MessageHeader 45006 | | | BusinessDocumentMessageHeader 45008 |
| MerchandiseandAssortmentPlanningMaterial 45010 | | MerchandiseandAssortmentPlanningMaterial 45012 | | | <MT>MrchdsAndAsstmtPlngMatl 45014 |
| | | | InternalID 45016 | | ProductInternalID 45018 |
| | | | TypeCode 45020 | | MaterialTypeCode 45022 |

FIG. 45-2

| Package | level1 | level2 | level3 | level4 | Data Type Name |
|---|---|---|---|---|---|
| | | | IndustrialSectorCode 45024 | | IndustrialSectorCode 45026 |
| | | | PreviousName 45028 | | LANGUAGEINDEPENDENT_MEDIUM_Name 45030 |
| | | | DeletedIndicator 45032 | | Indicator 45034 |
| | | | DivisionCode 45036 | | DivisionCode 45038 |
| | | | ReferenceMaterialInternalID 45040 | | ProductInternalID 45042 |
| | | | MerchandiseTypeCode 45044 | | MaterialMerchandiseTypeCode 45046 |

FIG. 45-3

| Package | level1 | level2 | level3 | level4 | Data Type Name |
|---|---|---|---|---|---|
| Description 45048 | | | Description 45050 | | <MT>Desc 45052 |
| | | | | Description 45054 | SHORT_Description 45056 |
| ProductCategory 45058 | | | ProductCategory 45060 | | <MT>ProdCat 45062 |
| | | | | InternalID 45064 | ProductCategoryID 45066 |
| | | | | HierarchyID 45068 | ProductCategoryHierarchyID 45070 |
| | | | | HierarchyTypeCode 45072 | ProductCategoryHierarchyTypeCode 45074 |

FIG. 45-4

| Package | level1 | level2 | level3 | level4 | Data Type Name |
|---|---|---|---|---|---|
| GlobalTradeItem-Number 45076 | | | GlobalTradeItemNum-ber 45078 | | <MT>GlobalTrdItmNo 45080 |
| | | | | ProductStandardID 45082 | ProductStandardID 45084 |
| | | | | MeasureUnitCode 45086 | MeasureUnitCode 45088 |
| QuantityUnit 45090 | | | QuantityUnit 45092 | | <MT>QtyUnit 45094 |
| | | | | MeasureUnitCode 45096 | MeasureUnitCode 45098 |
| | | | | BaseQuantityUnitIndicator 45100 | Indicator 45102 |

FIG. 45-5

| Package | level1 | level2 | level3 | level4 | Data Type Name |
|---|---|---|---|---|---|
| QuantityConversion 45104 | | | QuantityConversion 45106 | | <MT>QtyCnvrsn 45108 |
| | | | | Quantity 45110 | Quantity 45112 |
| | | | | CorrespondingQuantity 45114 | Quantity 45116 |
| Measure 45118 | | | Measure 45120 | | <MT>Measure 45122 |
| | | | | MeasureUnitCode 45124 | MeasureUnitCode 45126 |
| | | | | Quantity 45128 | Quantity 45130 |
| | | | | QuantityTypeCode 45132 | QuantityTypeCode 45134 |

FIG. 47-1

| Package | level1 | level2 | level3 | Data Type Name |
|---|---|---|---|---|
| MerchandiseandAssortmentPlanningProductProcurementArrangementMessage 47000 | MerchandiseandAssortmentPlanningProductProcurementArrangementMessage 47002 | | | |
| MessageHeader 47004 | | MessageHeader 47006 | | BusinessDocumentMessageHeader 47008 |
| MerchandiseandAssortmentPlanningProductProcurementArrangement 47010 | | MerchandiseandAssortmentPlanningProductProcurementArrangement 47012 | | <MT>MrchdsAndAsstmtPlngPrdProcmtArrgmt 47014 |
| | | | ID 47016 | ProductProcurementArrangementID 47018 |

FIG. 47-2

| Package | level1 | level2 | level3 | Data Type Name |
|---|---|---|---|---|
| | | | ProductInternalID 47020 | ProductInternalID 47022 |
| | | | SupplierID 47024 | PartyID 47026 |
| | | | PurchasingOrganisationParty 47028 | PartyInternalID 47030 |
| | | | PlantID 47032 | PlantID 47034 |
| | | | SupplierProductCategoryID 47036 | ProductCategoryID 47038 |
| | | | Price 47040 | Price 47042 |

FIG. 47-3

| Package | level1 | level2 | level3 | Data Type Name |
|---|---|---|---|---|
| | | | OrderUnitConversionRate 47044 | Rate 47046 |
| | | | OrderPriceUnitConversionRate 47048 | Rate 47050 |

FIG. 49-1

| Package | level1 | level2 | level3 | level4 | level5 | Data Type Name |
|---|---|---|---|---|---|---|
| MerchandiseandAssortmentPlanning-SalesPriceSpecificationCalculationMessage 49000 | MerchandiseandAssortmentPlanning-SalesPriceSpecification-Calculation-Message 49002 | | | | | |
| Message-Header 49004 | | Message-Header 49006 | | | | BusinessDocument-MessageHeader 49008 |
| | | | ID 49010 | | | BusinessDocument-MessageID 49012 |
| | | | CreationDateTime 49014 | | | DateTime 49016 |
| | | | ... | | | ... |

FIG. 49-2

| Package | level1 | level2 | level3 | level4 | level5 | Data Type Name |
|---|---|---|---|---|---|---|
| MerchandiseandAssortmentPlanning-SalesPriceSpecifica-tionCalculation 49018 | | Merchandiseand Assort-mentPlanning-SalesPriceSpecificationCal-culation 49020 | | | | <MT>MrchdsAn-dAsstmtPlngSlsPrSpecCalc 49022 |
| | | | BusinessTransac-tionDocument-TypeCode 49024 | | | BusinessTransac-tionDocumentType-Code 49026 |
| | | | BusinessTransac-tionDocumentID 49028 | | | BusinessTransac-tionDocumentID 49030 |
| Item 49032 | | | Item 49034 | | | <MT>Itm 49036 |
| | | | | ProductInternalID 49038 | | ProductInternalID 49040 |

FIG. 49-3

| Package | level1 | level2 | level3 | level4 | level5 | Data Type Name |
|---|---|---|---|---|---|---|
| | | | | MeasureUnitCode 49042 | | MeasureUnitCode 49044 |
| | | | | SalesOrganisa-tionID 49046 | | OrganisationalCen-treID 49048 |
| | | | | DistributionChan-nelCode 49050 | | DsitributionChannel-Code 49052 |
| | | | | PriceZoneID 49054 | | PriceZoneID 49056 |
| | | | | StoreInternalID 49058 | | StoreInternalID 49060 |

FIG. 49-4

| Package | level1 | level2 | level3 | level4 | level5 | Data Type Name |
|---|---|---|---|---|---|---|
| | | | | ValidityPeriod 49062 | | TimePointPeriod 49064 |
| Price 49066 | | | | Price 49068 | | <MT>Pr 49070 |
| | | | | | Specifica-tionElement-PropertyDefini-tionClassCode 49072 | PriceSpecifica-tionElementProper-tyDefinitionClass-Code 49074 |
| | | | | | Price 49076 | Price 49078 |

FIG. 54-1

| Package | level1 | level2 | level3 | level4 | level5 | level6 | level7 | Data Type Name |
|---|---|---|---|---|---|---|---|---|
| MerchandiseAndAssortment-Planning-StoreLayoutElement-Message 54000 | MerchandiseAndAssortment-Planning-StoreLayoutElement-Message 54002 | | | | | | | |
| Message-Header 54004 | | Message Header 54006 | | | | | | BusinessDocument-MessageHeader 54008 |
| | | | ID 54010 | | | | | BusinessDocument-MessageID 54012 |

FIG. 54-2

| Package | level1 | level2 | level3 | level4 | level5 | level6 | level7 | Data Type Name |
|---|---|---|---|---|---|---|---|---|
| | | | Creation-DateTime 54014 | | | | | DateTime 54016 |
| | | | … | | | | | … |
| Merchan-diseAndAs-sortment-Planning StoreLay-outElement 54018 | | | Merchan-diseAndAs-sortment-Planning-StoreLay-outElement 54020 | | | | | <MT>MrchdsAn-dAsstmtPlngStoreLay-tElmnt 54022 |
| | | | | @action Code 54024 | | | | ActionCode 54026 |
| | | | | ID 54028 | | | | StoreLayoutElementID 54030 |

FIG. 54-3

| Package | level1 | level2 | level3 | level4 | level5 | level6 | level7 | Data Type Name |
|---|---|---|---|---|---|---|---|---|
| Version 54032 | | | | Version 54034 | | | | <MT>Vers 54036 |
| | | | | | @actionCode 54038 | | | ActionCode 54040 |
| | | | | | ID 54042 | | | VersionID 54044 |
| | | | | | ReleaseS-tatusCode 54046 | | | StoreLayoutElement-VersionReleaseS-tatusCode 54048 |
| | | | | | ValidityPeriod 54050 | | | DatePeriod 54052 |
| Material 54054 | | | | | Material 54056 | | | <MT>Matl 58058 |

FIG. 54-4

| Package | level1 | level2 | level3 | level4 | level5 | level6 | level7 | Data Type Name |
|---|---|---|---|---|---|---|---|---|
| | | | | | | @actionCode 54060 | | ActionCode 54062 |
| | | | | | | InternalID 54064 | | ProductInternalID 54066 |
| | | | | | | OrdinalNumber-Value 54068 | | OrdinalNumberValue 54070 |
| | | | | | | StoreFixtureOrdi-nalNumberValue 54072 | | OrdinalNumberValue 54074 |
| | | | | | | CalculatedOrdi-nalNumberValue 54076 | | OrdinalNumberValue 54078 |

FIG. 54-5

| Package | level1 | level2 | level3 | level4 | level5 | level6 | level7 | Data Type Name |
|---|---|---|---|---|---|---|---|---|
| | | | | | | LabelTypeCode 54080 | | MaterialLabelType-Code 54082 |
| | | | | | | LabelNumberValue 54084 | | NumberValue 54086 |
| | | | | | | UsedSpaceProportionDecimalValue 54088 | | DecimalValue 54090 |
| | | | | | | Quantity 54092 | | <MT>MatlQty 54094 |
| | | | | | | | StoreFixtureFacingQuantity 54096 | Quantity 54098 |
| | | | | | | | StoreFixture-FrontQuantity 54100 | Quantity 54102 |

FIG. 54-6

| Package | level1 | level2 | level3 | level4 | level5 | level6 | level7 | Data Type Name |
|---|---|---|---|---|---|---|---|---|
| | | | | | | | Presentation-Quantity 54104 | Quantity 54106 |
| | | | | | | | OptimumShelf-CapacityQuantity 54108 | Quantity 54110 |
| | | | | | | | MaximumShelf-CapacityQuantity 54112 | Quantity 54114 |
| StoreFix-ture 54116 | | | | | StoreFixture 54118 | | | <MT>StoreFxtr 54120 |
| | | | | | | @actionCode 54122 | | ActionCode 54124 |
| | | | | | | ID 54126 | | StoreFixtureID 54128 |

FIG. 54-7

| Package | level1 | level2 | level3 | level4 | level5 | level6 | level7 | Data Type Name |
|---|---|---|---|---|---|---|---|---|
| | | | | | | OrdinalNumber-Value 54130 | | OrdinalNumberValue 54132 |
| | | | | | | TypeCode 54134 | | StoreFixtureTypeCode 54136 |
| | | | | | | CapacityQuantity 54138 | | Quantity 54140 |

FIG. 55-1

| Package | level1 | level2 | level3 | Cardinality |
|---|---|---|---|---|
| MerchandiseAndAssortmentPlanningStoreLayoutElementERPStoreFixtureByIDQueryMessage_sync 55000 | MerchandiseAndAssortmentPlanningStoreLayoutElementERPStoreFixtureByIDQueryMessage_sync 55002 | | | |
| MessageHeader 55004 | | MessageHeader 55006 | | 0..1 55008 |
| | | | ID 55010 | 1 55012 |
| | | | CreationDateTime 55014 | 1 55016 |
| | | | … | 0..1 55018 |

FIG. 55-2

| Package | | | level1 | level2 | level3 | Cardinality |
|---|---|---|---|---|---|---|
| Selection 55020 | | | | MerchandiseAndAssortmentPlanningStoreLayoutElementStore-FixtureSelectionByID 55022 | | 1 55024 |
| | | | | | MerchandiseAndAssortmentPlanningStoreLayoutElementID 55026 | 1 55028 |
| | | | | | VersionID 55030 | 0..1 55032 |
| | | | | | ValidityPeriod 55034 | 0..1 55036 |

FIG. 56-1

| Package | level1 | level2 | level3 | level4 | level5 | Cardinality |
|---|---|---|---|---|---|---|
| MerchandiseAndAssortmentPlanningStoreLayoutElementERP-StoreFixtureByIDResponseMessage_sync 56000 | MerchandiseAndAssortmentPlanningStoreLayoutElementERP-StoreFixtureByIDResponseMessage_sync 56002 | | | | | |
| MessageHeader 56004 | | MessageHeader 56006 | | | | 0..1 56008 |
| | | | ID 56010 | | | 1 56012 |
| | | | Creation-DateTime 56014 | | | 1 56016 |
| | | | … | | | 0..1 56018 |

FIG. 56-2

| Package | level1 | level2 | level3 | level4 | level5 | Cardinality |
|---|---|---|---|---|---|---|
| MerchandiseAndAssortmentPlanning StoreLayoutElement 56020 | | MerchandiseAndAssortmentPlanning-StoreLayoutElement 56022 | | | | 0..1 56024 |
| | | | ID 56026 | | | 1 56028 |
| Version 56030 | | | Version 56032 | | | 1 56034 |
| | | | | ID 56036 | | 1 56038 |
| | | | | ReleaseStatusCode 56040 | | 1 56042 |
| | | | | ValidityPeriod 56044 | | 1 56046 |

FIG. 56-3

| Package | level1 | level2 | level3 | level4 | level5 | Cardinality |
|---|---|---|---|---|---|---|
| StoreFixture 56048 | | | | StoreFixture 56050 | | 0..n 56052 |
| | | | | | ID 56054 | 1 56056 |
| | | | | | OrdinalNumberValue 56058 | 1 56060 |
| | | | | | TypeCode 56062 | 1 56064 |
| | | | | | CapacityQuantity 56066 | 1 56068 |
| Log 56070 | | Log 56072 | | | | 1 56074 |

FIG. 57-1

| Package | level1 | level2 | level3 | level4 | level5 | level6 | Cardinality |
|---|---|---|---|---|---|---|---|
| MerchandiseAndAssortmentPlanningStoreLayoutElementERPRequestMessage 57000 | MerchandiseAndAssortmentPlanningStoreLayoutElementERPRequestMessage 57002 | | | | | | |
| MessageHeader 57004 | | MessageHeader 57006 | | | | | 1 57008 |
| | | | ID 57010 | | | | 1 57012 |
| | | | CreationDateTime 57014 | | | | 1 57016 |
| | | | … | | | | 0..1 57018 |

FIG. 57-2

| Package | level1 | level2 | level3 | level4 | level5 | level6 | Cardinality |
|---|---|---|---|---|---|---|---|
| MerchandiseAndAssortment-Planning StoreLayoutElement 57020 | | MerchandiseAndAssortmentPlanning-StoreLayoutElement 57022 | | | | | 1 57024 |
| | | | @actionCode 57026 | | | | 1 57028 |
| | | | ID 57030 | | | | 1 57032 |
| Version 57034 | | | Version 57036 | | | | 1 57038 |
| | | | | @actionCode 57040 | | | 1 57042 |
| | | | | ID 57044 | | | 0..1 57046 |

FIG. 57-3

| Package | level1 | level2 | level3 | level4 | level5 | level6 | Cardinality |
|---|---|---|---|---|---|---|---|
| | | | | ValidityPeriod 57048 | | | 0..1 57050 |
| Material 57052 | | | | Material 57054 | | | 0..n 57056 |
| | | | | | @actionCode 57058 | | 1 57060 |
| | | | | | InternalID 57062 | | 1 57064 |
| | | | | | OrdinalNumberValue 57066 | | 0..1 57068 |
| | | | | | StoreFixtureOrdinal-NumberValue 57070 | | 0..1 57072 |

FIG. 57-4

| Package | level1 | level2 | level3 | level4 | level5 | level6 | Cardinality |
|---|---|---|---|---|---|---|---|
| | | | | | CalculatedOrdinal-NumberValue 57074 | | 0..1 57076 |
| | | | | | LabelTypeCode 57078 | | 0..1 57080 |
| | | | | | LabelNumberValue 57082 | | 0..1 57084 |
| | | | | | UsedSpacePropor-tionDecimalValue 57086 | | 0..1 57088 |
| MaterialQuan-tity 57090 | | | | | Quantity 57092 | | 0..1 57094 |
| | | | | | | StoreFixtureFac-ingQuantity 57096 | 1 57098 |

FIG. 57-5

| Package | level1 | level2 | level3 | level4 | level5 | level6 | Cardinality |
|---|---|---|---|---|---|---|---|
| | | | | | | StoreFixture-FrontQuantity 57100 | 1 57102 |
| | | | | | | Presentation-Quantity 57104 | 0..1 57106 |
| | | | | | | OptimumShelf-CapacityQuantity 57108 | 0..1 57110 |
| | | | | | | MaximumShelf-CapacityQuantity 57112 | 1 57114 |
| StoreFixture 57116 | | | | StoreFixture 57118 | | | 0..n 57120 |
| | | | | | @actionCode 57122 | | 1 57124 |

FIG. 57-6

| Package | level1 | level2 | level3 | level4 | level5 | level6 | Cardinality |
|---|---|---|---|---|---|---|---|
| | | | | | ID 57126 | | 1 57128 |
| | | | | | OrdinalNumberValue 57130 | | 1 57132 |
| | | | | | CapacityQuantity 57134 | | 0..1 57136 |

MANAGING CONSISTENT INTERFACES FOR MERCHANDISE AND ASSORTMENT PLANNING BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, a tangible computer readable medium includes program code for providing a message-based interface for performing an assortment plan service. The service exposes at least one service as defined in a service registry. Upon execution, the program code executes in an environment of computer systems providing message-based services. The program code receives, from a service consumer, a first message for processing a plan for purchasing articles by a company. The program code invokes an assortment plan business object. The business object is a logically centralized, semantically disjointed object representing a plan for purchasing articles by a company. The business object comprises data logically organized as an assortment plan root node, a description subordinate node, a product category subordinate node, a season subordinate node, an item subordinate node, and a target sales subordinate node. The item node includes a description subordinate node, a sales price specification calculation subordinate node, a product procurement arrangement subordinate node, a product category subordinate node, a prepack subordinate node, and a quantity subordinate node. The prepack node includes a property valuation subordinate node and a ratio subordinate node. The property valuation node includes a property reference subordinate node and a value group node. The value group node includes a property value subordinate node. The ratio node includes a property valuation subordinate node. The property valuation node includes a property reference subordinate node and a value group subordinate node. The value group node includes a property value subordinate node. The quantity node includes a property valuation subordinate node. The property valuation node includes a property reference subordinate node and a value group subordinate node. The value group node includes a property value subordinate node. The program code initiates transmission of a message to a heterogeneous second application, executing in the environment of computer systems providing message-based services. The message is based on the data in the assortment plan business object. The message comprises an assortment plan message entity, a message header package, and an assortment plan package.

In a second aspect, a tangible computer readable medium includes program code for providing a message-based interface for performing an assortment plan service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in an assortment plan business object invoked by the second application. The business object is a logically centralized, semantically disjointed object representing a plan for purchasing articles by a company. The business object comprises data logically organized as an assortment plan root node, a description subordinate node, a product category subordinate node, a season subordinate node, an item subordinate node, and a target sales subordinate node. The item node includes a description subordinate node, a sales price specification calculation subordinate node, a product procurement arrangement subordinate node, a product category subordinate node, a prepack subordinate node, and a quantity subordinate node. The prepack node includes a property valuation subordinate node and a ratio subordinate node. The property valuation node includes a property reference subordinate node and a value group node. The value group node includes a property value subordinate node. The ratio node includes a property valuation subordinate node. The property valuation node includes a property reference subordinate node and a value group subordinate node. The value group node includes a property value subordinate node. The quantity node includes a property valuation subordinate node. The property valuation node includes a property reference subordinate node and a value group subordinate node. The value group node includes a property value subordinate node. The message comprises an assortment plan message entity, a message header package, and an assortment plan package. The program code receives a second message from the second application. The second message is associated with the invoked assortment plan business object and is in response to the first message.

In a third aspect, a distributed system operates in a landscape of computer systems providing message-based services. The system processes business objects involving processing a plan for purchasing articles by a company. The system comprises memory and a graphical user interface remote from the memory. The memory stores a business object repository storing a plurality of business objects. Each business object is a logically centralized, semantically disjointed object of a particular business object type. At least one of the business objects represents a plan for purchasing articles by a company. The business object comprises data logically organized as an assortment plan root node, a description subordinate node, a product category subordinate node, a season subordinate node, an item subordinate node, and a target sales subordinate node. The item node includes a description subordinate node, a sales price specification calculation subordinate node, a product procurement arrangement subordinate node, a product category subordinate node, a prepack subordinate node, and a quantity subordinate node. The prepack node includes a property valuation subordinate node and a ratio subordinate node. The property valuation node includes a property reference subordinate node and a value group node. The value group node includes a property value subordinate node. The ratio node includes a property valuation subordinate node. The property valuation node includes a property reference subordinate node and a value group subordinate node. The value group node includes a property value subordinate node. The quantity node includes a property valuation subordinate node. The property valuation node includes a property reference subordinate node and a value group subordinate node. The value group node includes a property value subordinate node. The graphical user interface presents data associated with an invoked instance of the assortment plan business object. The user interface comprises tangible computer readable instructions embodied on tangible media.

In a fourth aspect, a tangible computer readable medium includes program code for providing a message-based interface for performing a merchandise and assortment planning assortment service. The service exposes at least one service as defined in a service registry. Upon execution, the program code executes in an environment of computer systems providing message-based services. The program code receives, from a service consumer, a first message for processing a grouping of materials which may be ordered by a store or by a wholesaler. The program code invokes a merchandise and assortment planning assortment business object. The business object is a logically centralized, semantically disjointed object representing a grouping of materials which may be ordered by a store or by a wholesaler. The business object comprises data logically organized as a merchandise and assortment planning assortment root node, a description subordinate node, a dimension subordinate node, a product category subordinate node, a receiving store subordinate node, a receiving party subordinate node, and a store layout element subordinate node. The store layout element node includes a version subordinate node. The version node includes a material subordinate node. The material node includes a description subordinate node, a measure subordinate node, a product category subordinate node, and a quantity subordinate node. The program code initiates transmission of a message to a heterogeneous second application, executing in the environment of computer systems providing message-based services. The message is based on the data in the merchandise and assortment planning assortment business object. The message comprises a merchandise and assortment planning assortment enterprise resource planning store layout element request message entity, a message header package, and a merchandise and assortment planning assortment package.

In a fifth aspect, a tangible computer readable medium includes program code for providing a message-based interface for performing a merchandise and assortment planning assortment service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a merchandise and assortment planning assortment business object invoked by the second application. The business object is a logically centralized, semantically disjointed object representing a grouping of materials which may be ordered by a store or by a wholesaler. The business object comprises data logically organized as a merchandise and assortment planning assortment root node, a description subordinate node, a dimension subordinate node, a product category subordinate node, a receiving store subordinate node, a receiving party subordinate node, and a store layout element subordinate node. The store layout element node includes a version subordinate node. The version node includes a material subordinate node. The material node includes a description subordinate node, a measure subordinate node, a product category subordinate node, and a quantity subordinate node. The message comprises a merchandise and assortment planning assortment enterprise resource planning store layout element request message entity, a message header package, and a merchandise and assortment planning assortment package. The program code receives a second message from the second application. The second message is associated with the invoked merchandise and assortment planning assortment business object and is in response to the first message.

In a sixth aspect, a distributed system operates in a landscape of computer systems providing message-based services. The system processes business objects involving processing a grouping of materials which may be ordered by a store or by a wholesaler. The system comprises memory and a graphical user interface remote from the memory. The memory stores a business object repository storing a plurality of business objects. Each business object is a logically centralized, semantically disjointed object of a particular business object type. At least one of the business objects represents a grouping of materials which may be ordered by a store or by a wholesaler. The business object comprises data logically organized as a merchandise and assortment planning assortment root node, a description subordinate node, a dimension subordinate node, a product category subordinate node, a receiving store subordinate node, a receiving party subordinate node, and a store layout element subordinate node. The store layout element node includes a version subordinate node. The version node includes a material subordinate node. The material node includes a description subordinate node, a measure subordinate node, a product category subordinate node, and a quantity subordinate node. The graphical user interface presents data associated with an invoked instance of the merchandise and assortment planning assortment business object. The user interface comprises tangible computer readable instructions embodied on tangible media.

In a seventh aspect, a tangible computer readable medium includes program code for providing a message-based interface for performing a merchandise and assortment planning material service. The service exposes at least one service as defined in a service registry. Upon execution, the program code executes in an environment of computer systems providing message-based services. The program code receives, from a service consumer, a first message for processing a tangible product such as a sellable article. The program code invokes a merchandise and assortment planning material business object. The business object is a logically centralized, semantically disjointed object representing a tangible product such as a sellable article. The business object comprises data logically organized as a merchandise and assortment planning material root node, a description subordinate node, a product category subordinate node, a global trade item number subordinate node, a quantity unit subordinate node, a quantity conversion subordinate node, and a measure subordinate node. The program code initiates transmission of a message to a heterogeneous second application, executing in the environment of computer systems providing message-based services. The message is based on the data in the merchandise and assortment planning material business object. The message comprises a merchandise and assortment planning material message entity, a message header package, and a merchandise and assortment planning material package.

In an eighth aspect, a tangible computer readable medium includes program code for providing a message-based interface for performing a merchandise and assortment planning material service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a merchandise and assortment planning material business object invoked by the second application. The business object is a logically centralized, semantically disjointed object representing a tangible product such as a sellable article. The business object comprises data logically organized as a merchandise and assortment planning material root node, a description subordinate node, a product category subordinate node, a global trade item number subordinate node, a quantity unit subordinate node, a quantity conversion subordinate node, and a measure subordinate node. The message comprises a merchandise and assortment planning material message entity, a message header package, and a merchandise and assortment planning material package. The program code receives a second message from the second application. The second message is associated with the invoked a merchandise and assortment planning material business object and is in response to the first message.

In a ninth aspect, a distributed system operates in a landscape of computer systems providing message-based services. The system processes business objects involving processing a tangible product such as a sellable article. The system comprises memory and a graphical user interface remote from the memory. The memory stores a business object repository storing a plurality of business objects. Each business object is a logically centralized, semantically disjointed object of a particular business object type. At least one of the business objects represents a tangible product such as a sellable article. The business object comprises data logically organized as a merchandise and assortment planning material root node, a description subordinate node, a product category subordinate node, a global trade item number subordinate node, a quantity unit subordinate node, a quantity conversion subordinate node, and a measure subordinate node. The graphical user interface presents data associated with an invoked instance of the merchandise and assortment planning material business object. The user interface comprises tangible computer readable instructions embodied on tangible media.

In a tenth aspect, a tangible computer readable medium includes program code for providing a message-based interface for performing a merchandise and assortment planning product procurement arrangement service. The service exposes at least one service as defined in a service registry. Upon execution, the program code executes in an environment of computer systems providing message-based services. The program code receives, from a service consumer, a first message for processing a source of information for the procurement of a certain material or service from a certain vendor. The program code invokes a merchandise and assortment planning product procurement arrangement business object. The business object is a logically centralized, semantically disjointed object representing a source of information for the procurement of a certain material or service from a certain vendor. The business object comprises data logically organized as a merchandise and assortment planning product procurement arrangement root node. The program code initiates transmission of a message to a heterogeneous second application, executing in the environment of computer systems providing message-based services. The message is based on the data in the merchandise and assortment planning product procurement arrangement business object. The message comprises a merchandise and assortment planning product procurement arrangement message entity, a message header package, and a merchandise and assortment planning product procurement arrangement package.

In an eleventh aspect, a tangible computer readable medium includes program code for providing a message-based interface for performing a merchandise and assortment planning product procurement arrangement service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a merchandise and assortment planning product procurement arrangement business object invoked by the second application. The business object is a logically centralized, semantically disjointed object representing a source of information for the procurement of a certain material or service from a certain vendor. The business object comprises data logically organized as a merchandise and assortment planning product procurement arrangement root node. The message comprises a merchandise and assortment planning product procurement arrangement message entity, a message header package, and a merchandise and assortment planning product procurement arrangement package. The program code receives a second message from the second application. The second message is associated with the invoked merchandise and assortment planning product procurement arrangement business object and is in response to the first message.

In a twelfth aspect, a distributed system operates in a landscape of computer systems providing message-based services. The system processes business objects involving processing a source of information for the procurement of a certain material or service from a certain vendor. The system comprises memory and a graphical user interface remote from the memory. The memory stores a business object repository storing a plurality of business objects. Each business object is a logically centralized, semantically disjointed object of a particular business object type. At least one of the business objects represents a source of information for the procurement of a certain material or service from a certain vendor. The business object comprises data logically organized as a merchandise and assortment planning product procurement arrangement root node. The graphical user interface presents data associated with an invoked instance of the merchandise and assortment planning product procurement arrangement business object. The user interface comprises tangible computer readable instructions embodied on tangible media.

In a thirteenth aspect, a tangible computer readable medium includes program code for providing a message-based interface for performing a merchandise and assortment planning sales price specification calculation service. The service exposes at least one service as defined in a service registry. Upon execution, the program code executes in an environment of computer systems providing message-based services. The program code receives, from a service consumer, a first message for processing the calculated sales prices based on the price influencing factors for specific data retention levels. The program code invokes a merchandise and assortment planning sales price specification calculation business object. The business object is a logically centralized, semantically disjointed object representing the calculated sales prices based on the price influencing factors for specific data retention levels. The business object comprises data logically organized as a merchandise and assortment planning sales price specification calculation root node and an item subordinate node. The item node includes a price subordinate node. The program code initiates transmission of a message to a heterogeneous second application, executing in the environment of computer systems providing message-based services. The message is based on the data in the merchandise and assortment planning sales price specification calculation business object. The message comprises a merchandise and assortment planning sales price specification calculation message entity, a message header package, and a merchandise and assortment planning sales price specification calculation package.

In a fourteenth aspect, a tangible computer readable medium includes program code for providing a message-based interface for performing a merchandise and assortment planning sales price specification calculation service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a merchandise and assortment planning sales price specification calculation business object invoked by the second application. The business object is a logically centralized, semantically disjointed object representing the calculated sales prices based on the price influencing factors for specific data retention levels. The business object comprises data logically organized as a merchandise and assortment planning sales price specification calculation root node and an item subordinate node. The item node includes a price subordinate node. The message comprises a merchandise and assortment planning sales price specification calculation message entity, a message header package, and a merchandise and assortment planning sales price specification calculation package. The program code receives a second message from the second application. The second message is associated with the invoked merchandise and assortment planning sales price specification calculation business object and is in response to the first message.

In a fifteenth aspect, a distributed system operates in a landscape of computer systems providing message-based services. The system processes business objects involving processing the calculated sales prices based on the price influencing factors for specific data retention levels. The system comprises memory and a graphical user interface remote from the memory. The memory stores a business object repository storing a plurality of business objects. Each business object is a logically centralized, semantically disjointed object of a particular business object type. At least one of the business objects represents the calculated sales prices based on the price influencing factors for specific data retention levels. The business object comprises data logically organized as a merchandise and assortment planning sales price specification calculation root node and an item subordinate node. The item node includes a price subordinate node. The graphical user interface presents data associated with an invoked instance of the merchandise and assortment planning sales price specification calculation business object. The user interface comprises tangible computer readable instructions embodied on tangible media.

In a sixteenth aspect, a tangible computer readable medium includes program code for providing a message-based interface for performing a merchandise and assortment planning store layout element service. The service exposes at least one service as defined in a service registry. Upon execution, the program code executes in an environment of computer systems providing message-based services. The program code receives, from a service consumer, a first message for processing an element of a layout presentation for a group of materials in a store, corresponding to one or more store fixtures containing the offered materials and a placement sequence which can be established within it. The program code invokes a merchandise and assortment planning store layout element business object. The business object is a logically centralized, semantically disjointed object representing an element of a layout presentation for a group of materials in a store, corresponding to one or more store fixtures containing the offered materials and a placement sequence which can be established within it. The business object comprises data logically organized as a merchandise and assortment planning store layout element root node and a version subordinate node. The version node includes a material subordinate node and a store fixture subordinate node. The material node includes a quantity node. The program code initiates transmission of a message to a heterogeneous second application, executing in the environment of computer systems providing message-based services. The message is based on the data in the merchandise and assortment planning store layout element business object. The message comprises a merchandise and assortment planning store layout element message entity, a message header package, and a merchandise and assortment planning store layout element package.

In a seventeenth aspect, a tangible computer readable medium includes program code for providing a message-based interface for performing a merchandise and assortment planning store layout element service. The service exposes at least one service as defined in a service registry. Upon execution, the program code executes in an environment of computer systems providing message-based services. The program code initiates transmission of a message to a heterogeneous second application, executing in the environment of computer systems providing message-based services. The message is based on data in a merchandise and assortment planning store layout element business object invoked by the second application. The business object is a logically centralized, semantically disjointed object representing an element of a layout presentation for a group of materials in a store, corresponding to one or more store fixtures containing the offered materials and a placement sequence which can be established within it. The business object comprises data logically organized as a merchandise and assortment planning store layout element root node and a version subordinate node. The version node includes a material subordinate node and a store fixture subordinate node. The material node includes a quantity node. The message comprises a merchandise and assortment planning store layout element message entity, a message header package, and a merchandise and assortment planning store layout element package. The program code receives a second message from the second application. The second message is associated with the invoked merchandise and assortment planning store layout element business object and is in response to the first message.

In an eighteenth aspect, a distributed system operates in a landscape of computer systems providing message-based services. The system processes business objects involving processing an element of a layout presentation for a group of materials in a store, corresponding to one or more store fixtures containing the offered materials and a placement sequence can be established within it. The system comprises memory and a graphical user interface remote from the memory. The memory stores a business object repository storing a plurality of business objects. Each business object is a logically centralized, semantically disjointed object of a particular business object type. At least one of the business objects represents an element of a layout presentation for a group of materials in a store, corresponding to one or more store fixtures containing the offered materials and a placement sequence which can be established within it. The business object comprises data logically organized as a merchandise and assortment planning store layout element root node and a version subordinate node. The version node includes a material subordinate node and a store fixture subordinate node. The material node includes a quantity node. The graphical user interface presents data associated with an invoked instance of the merchandise and assortment planning store layout element business object. The user interface comprises tangible computer readable instructions embodied on tangible media.

In some implementations, processing business objects includes creating, updating and/or retrieving information associated with the business objects.

BRIEF DESCRIPTION OF THE DRAWINGS

FIGS. 33-1 through 33-20 illustrate an exemplary AssortmentPlanMessage Element Structure.

FIGS. 36-1 through 36-2 illustrate an exemplary MerchandiseAndAssortmentPlanningAssortmentERPStoreLayoutElementRequestMessage Message Data Type.

FIGS. 38-1 through 38-2 illustrate an exemplary MerchandiseAndAssortmentPlanningAssortmentERPStoreLayoutElementByIDResponseMessage_sync Message Data Type.

FIGS. 39-1 through 39-11 illustrate an exemplary MerchandiseAndAssortmentPlanningAssortmentMessage Element Structure.

FIGS. 40-1 through 40-5 illustrate an exemplary MerchandiseAndAssortmentPlanningAssortmentERPRequestMessage Element Structure.

FIGS. 41-1 through 41-8 illustrate an exemplary MerchandiseAndAssortmentPlanningAssortmentERPStoreLayoutElementRequestMessage Element Structure.

FIGS. 42-1 through 42-2 illustrate an exemplary MerchandiseAndAssortmentPlanningAssortmentERPStoreLayoutElementByIDQueryMessage_sync Element Structure.

FIGS. 43-1 through 43-8 illustrate an exemplary MerchandiseAndAssortmentPlanningAssortmentERPStoreLayoutElementByIDResponseMessage_sync Element Structure.

FIGS. 45-1 through 45-5 illustrate an exemplary MerchandiseAndAssortmentPlanningMaterialMessage Element Structure.

FIGS. 47-1 through 47-3 illustrate an exemplary MerchandiseAndAssortmentPlanningProductProcurementArrangementMessage Element Structure.

FIGS. 49-1 through 49-4 illustrate an exemplary MerchandiseAndAssortmentPlanningSalesPriceSpecificationCalculationMessage Element Structure.

FIGS. 52-1 through 52-2 illustrate an exemplary MerchandiseAndAssortmentPlanningStoreLayoutElementERPStoreFixtureByIDResponseMessage_sync Message Data Type.

FIGS. 54-1 through 54-7 illustrate an exemplary MerchandiseAndAssortmentPlanningStoreLayoutElementMessage Element Structure.

FIGS. 55-1 through 55-2 illustrate an exemplary MerchandiseAndAssortmentPlanningStoreLayoutElementERPStoreFixtureByIDQueryMessage_sync Element Structure.

FIGS. 56-1 through 56-3 illustrate an exemplary MerchandiseAndAssortmentPlanningStoreLayoutElementERPStoreFixtureByIDResponseMessage_sync Element Structure.

FIGS. 57-1 through 57-6 illustrate an exemplary MerchandiseAndAssortmentPlanningStoreLayoutElementERPRequestMessage Element Structure.

DETAILED DESCRIPTION

A. Overview

Figure 1:
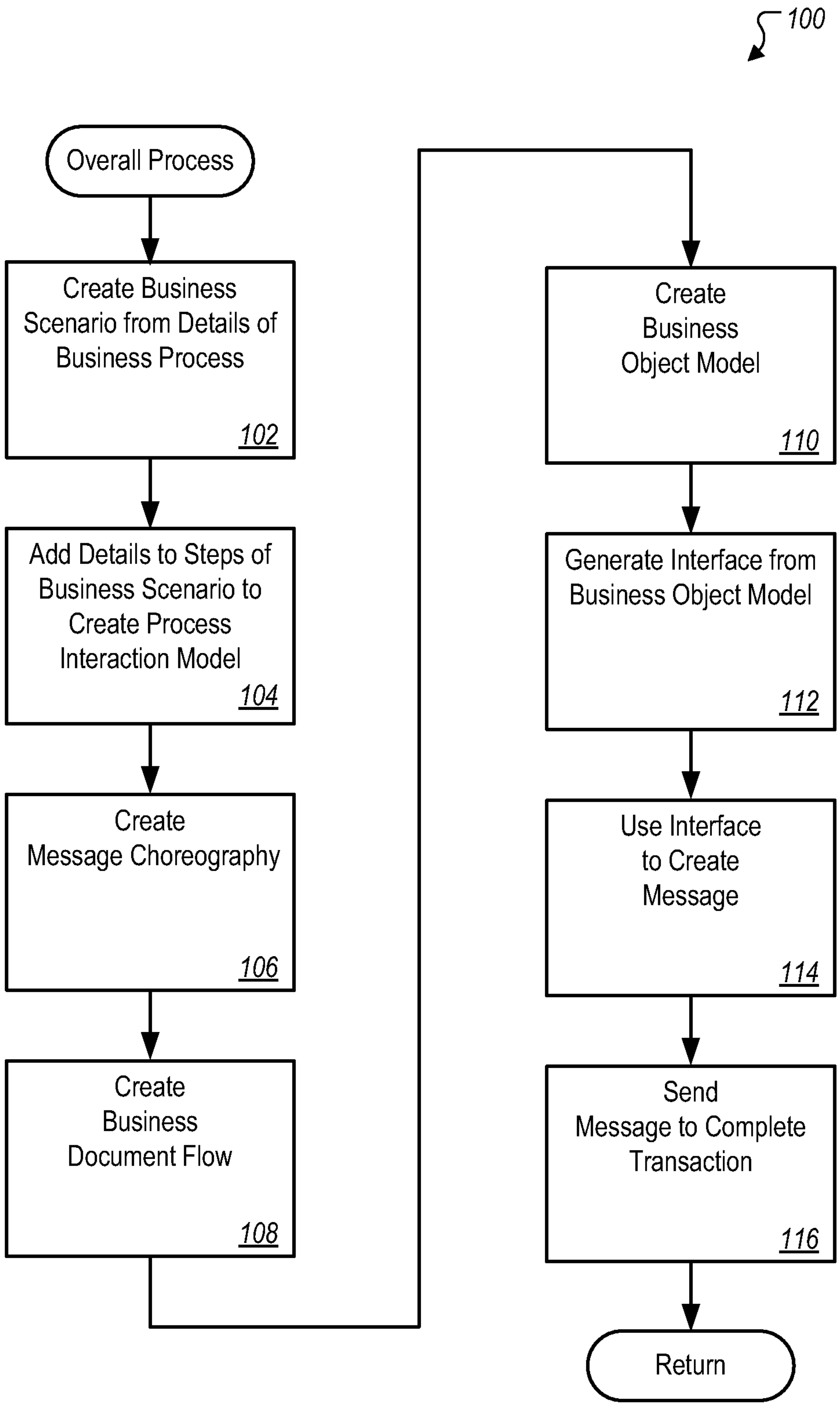
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
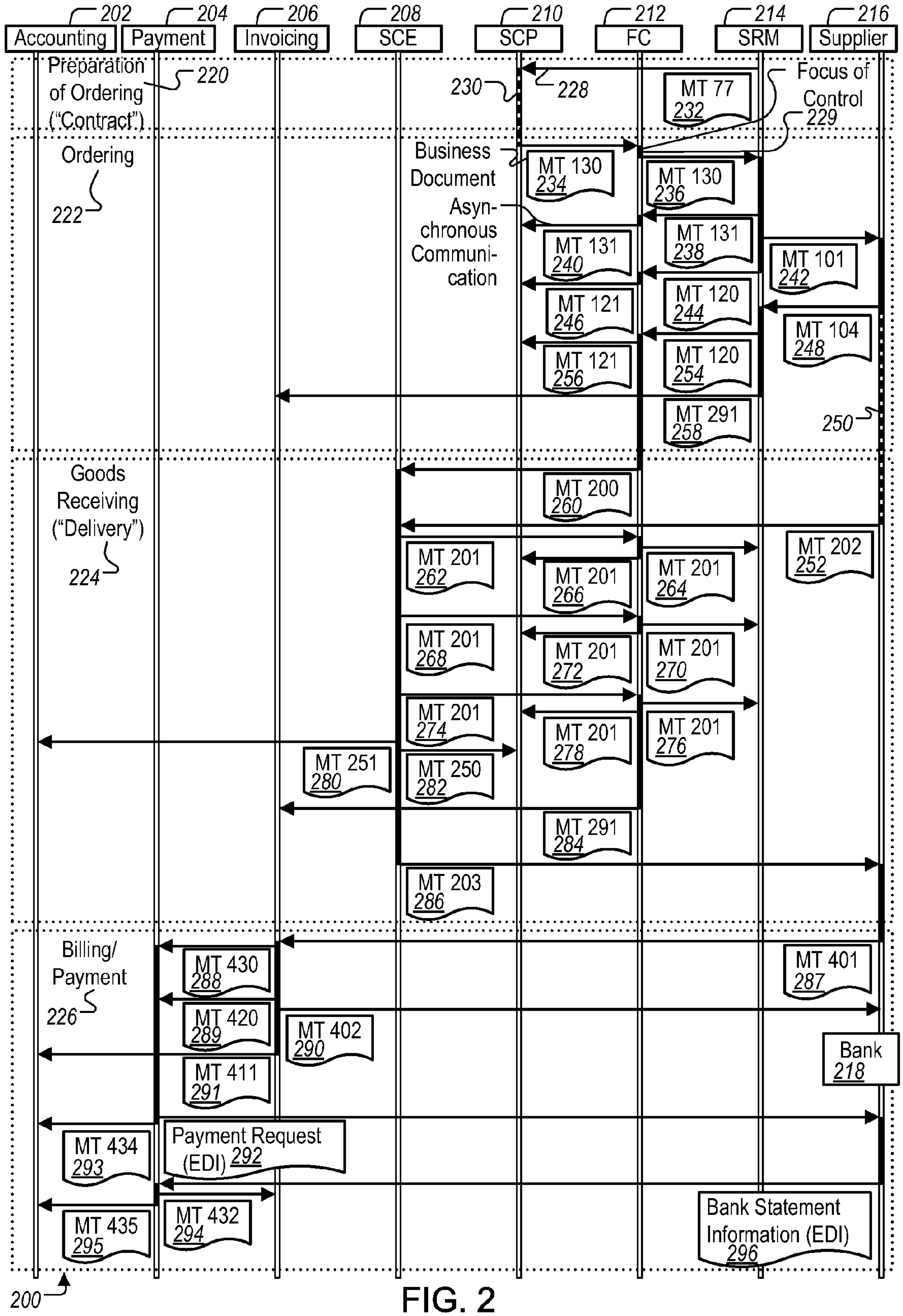
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
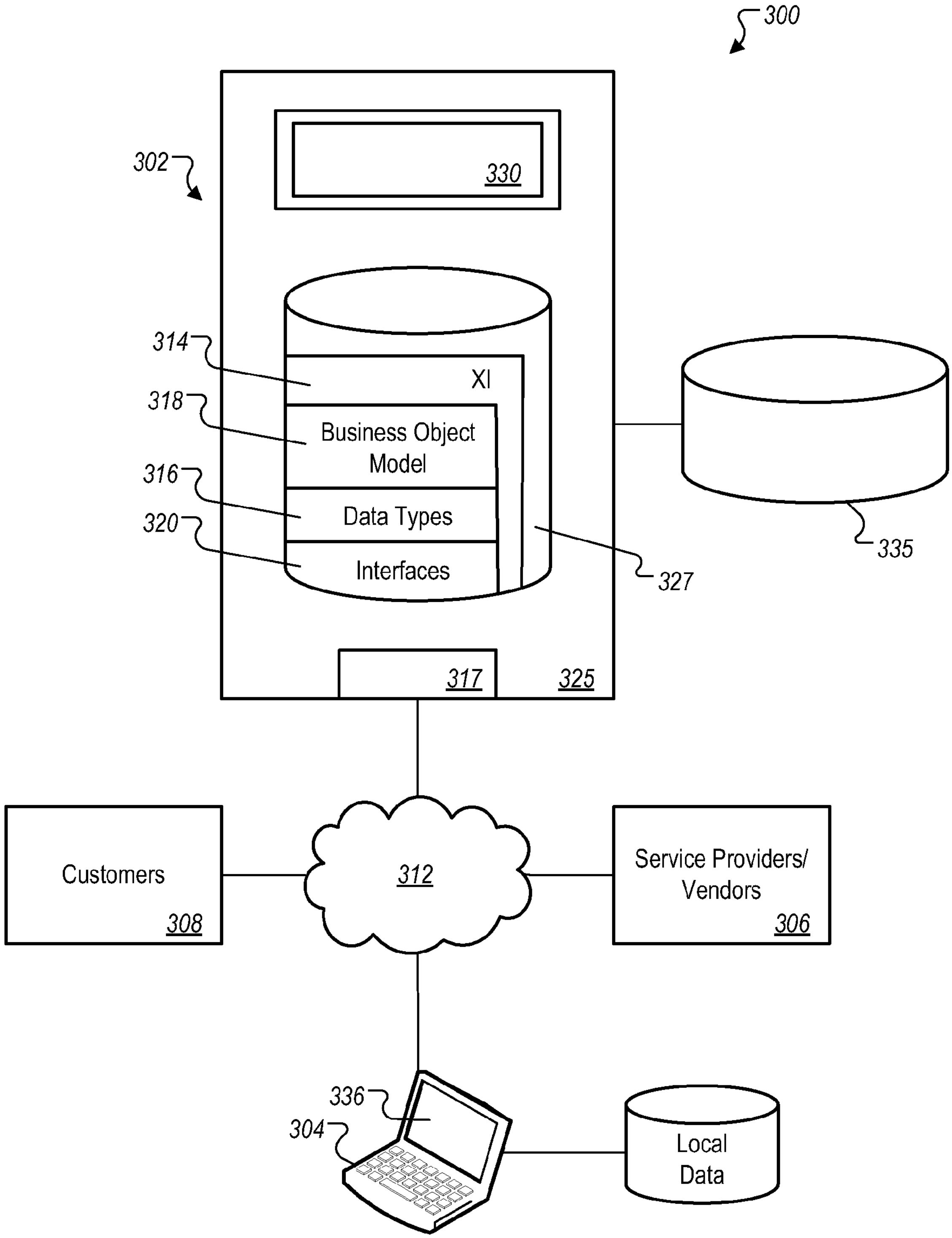
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
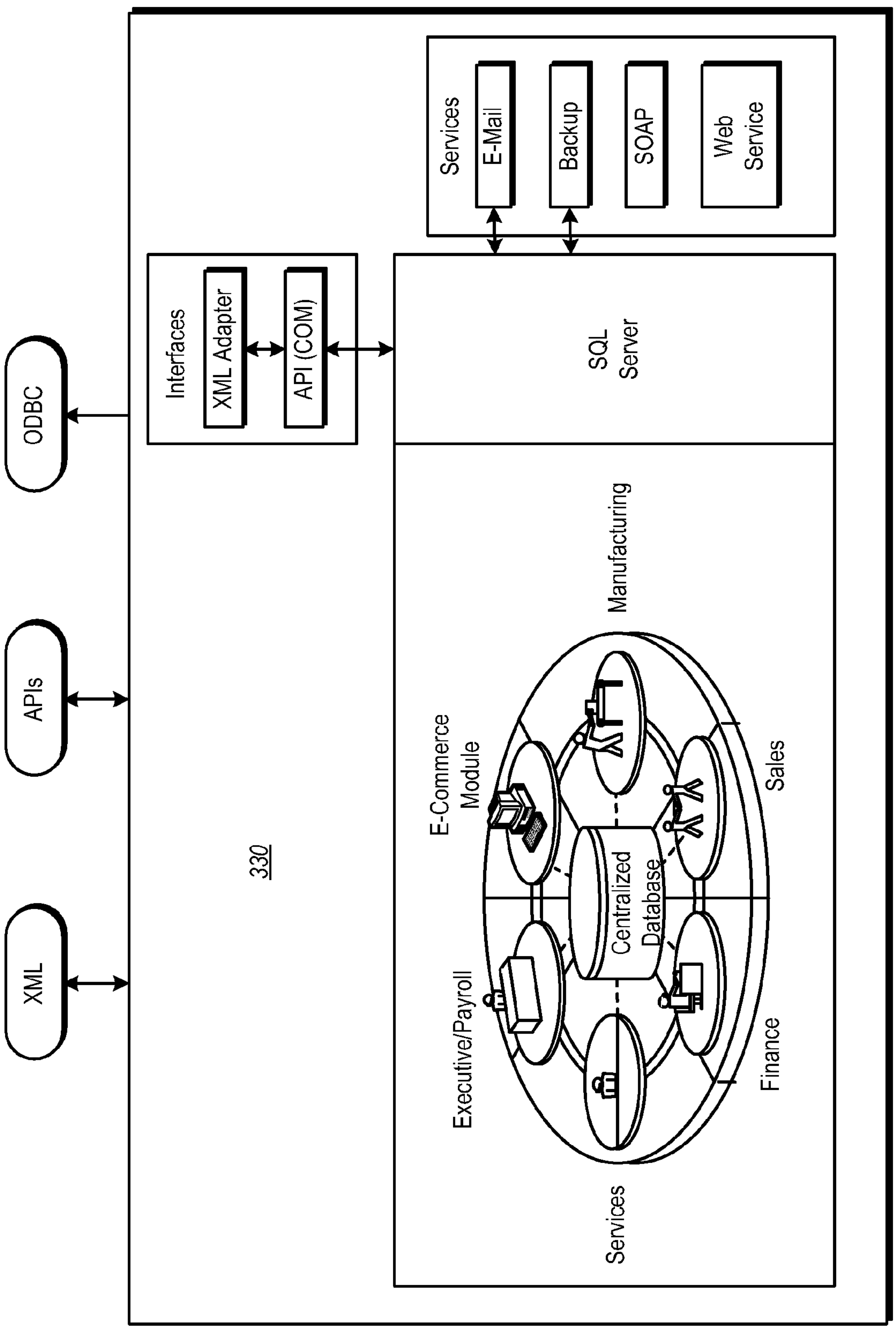
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
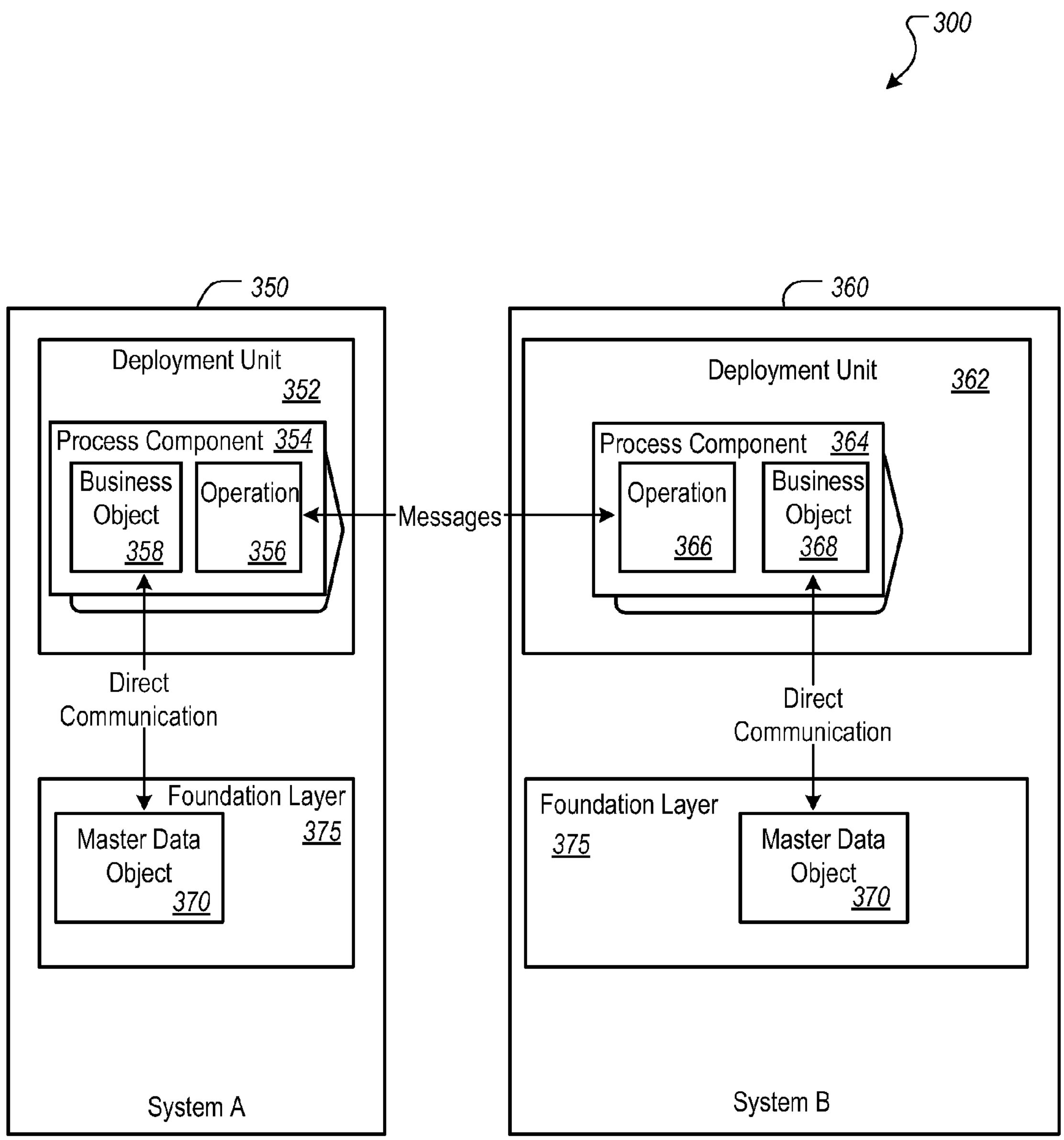

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
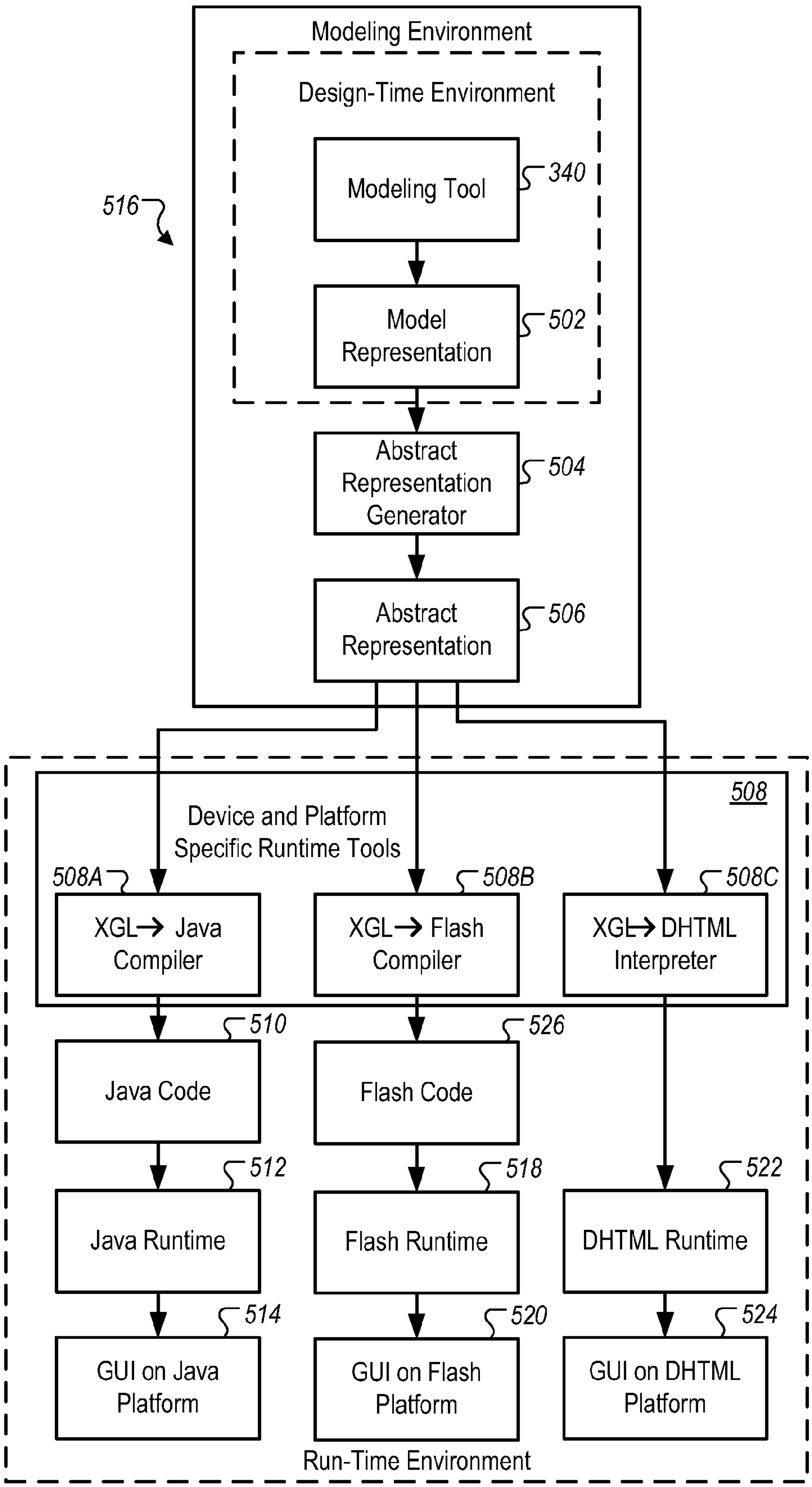
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
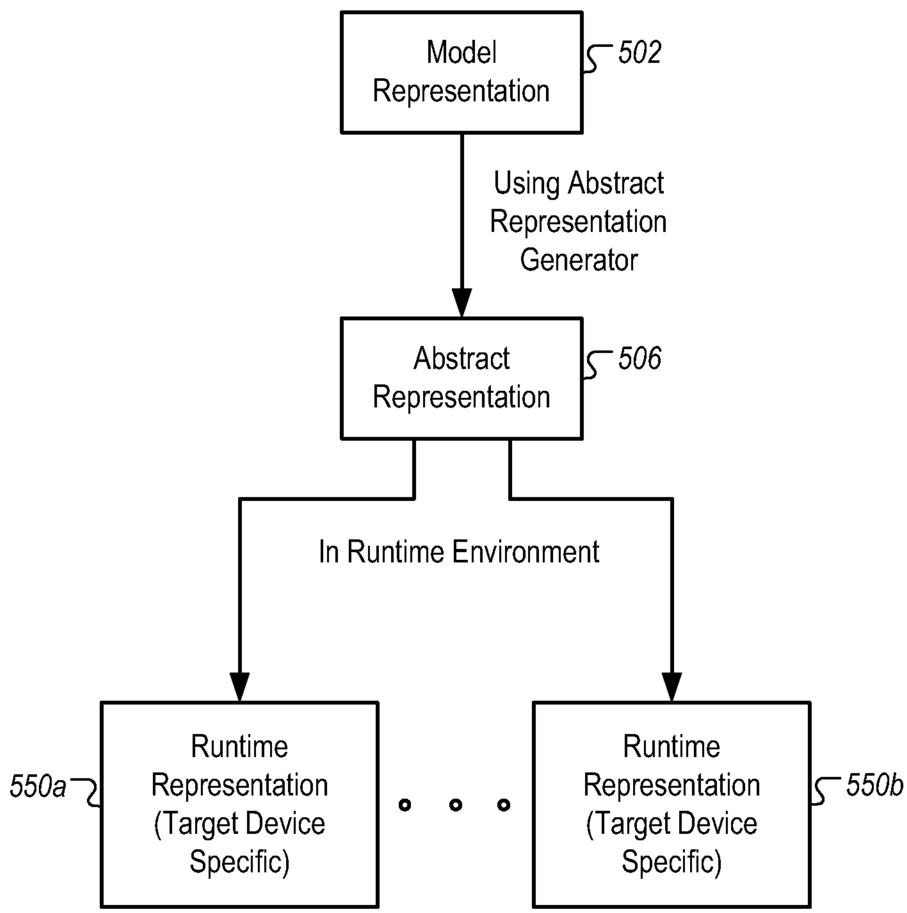
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
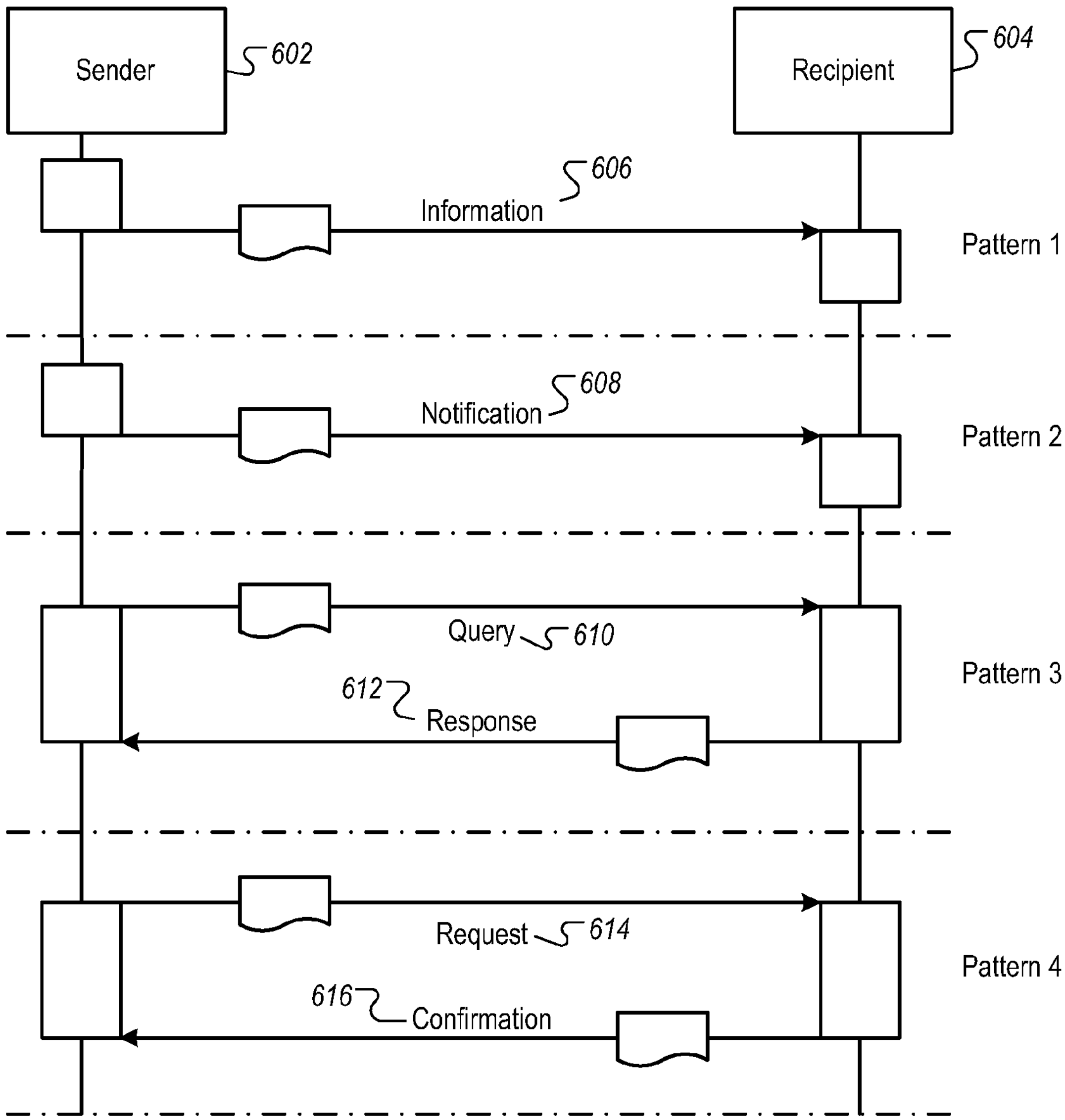
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
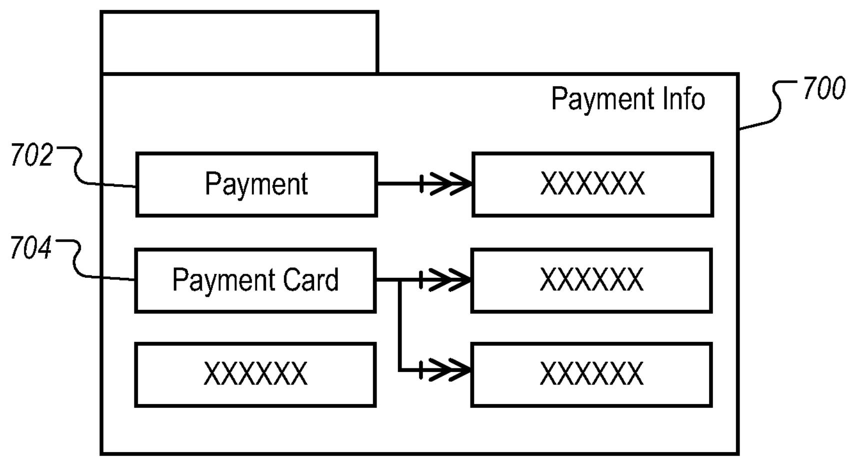
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
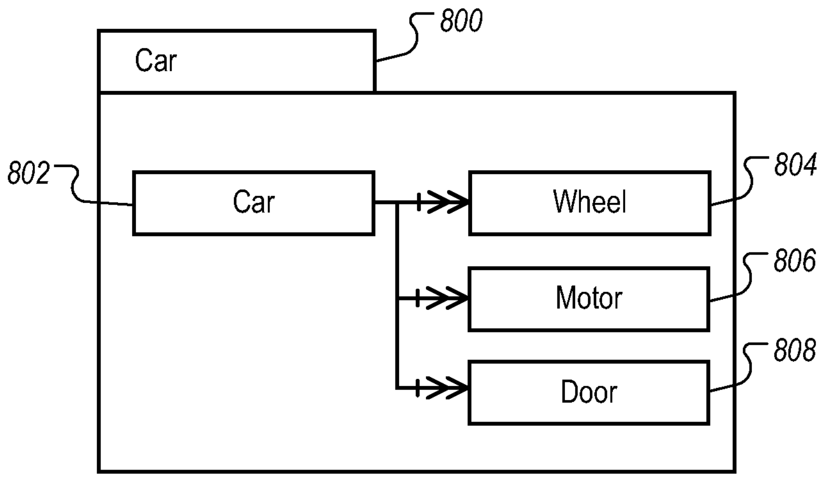
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
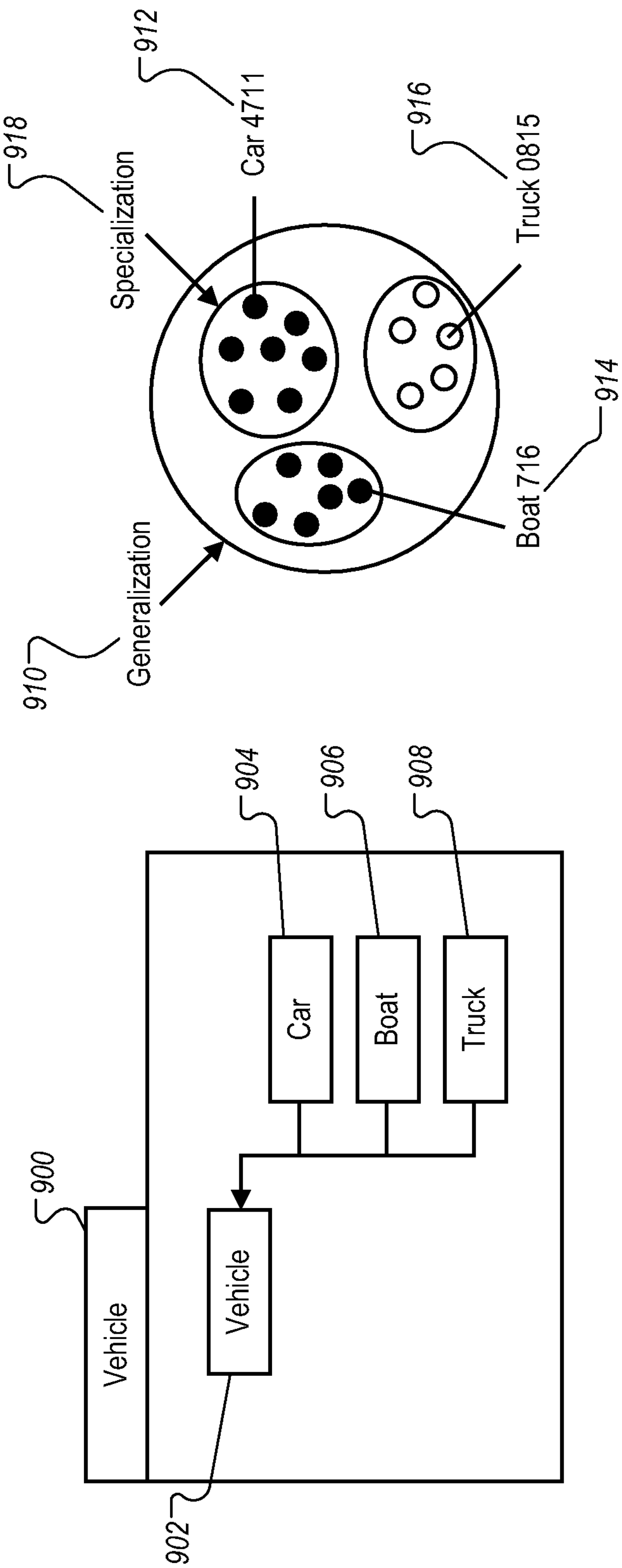
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
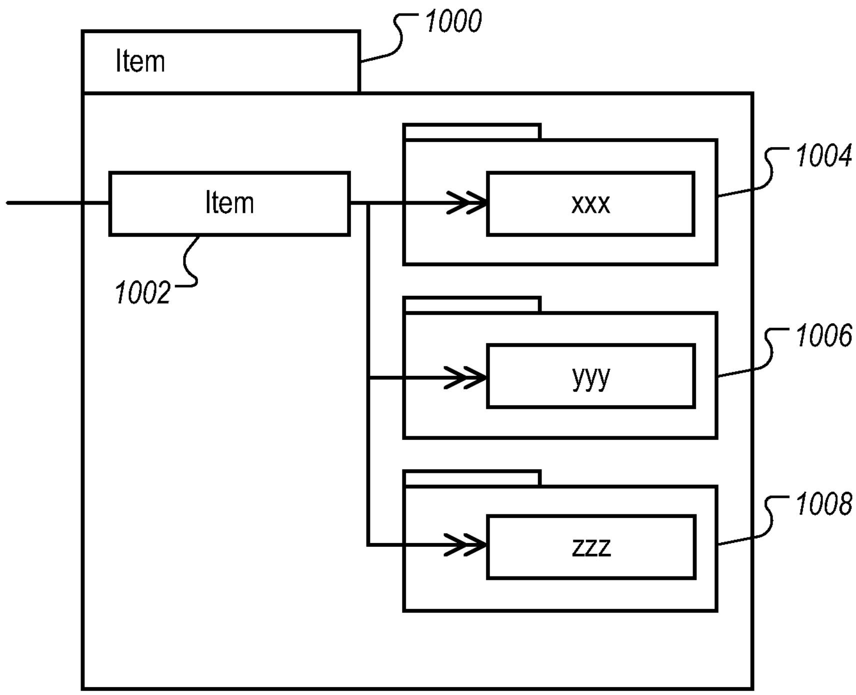
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
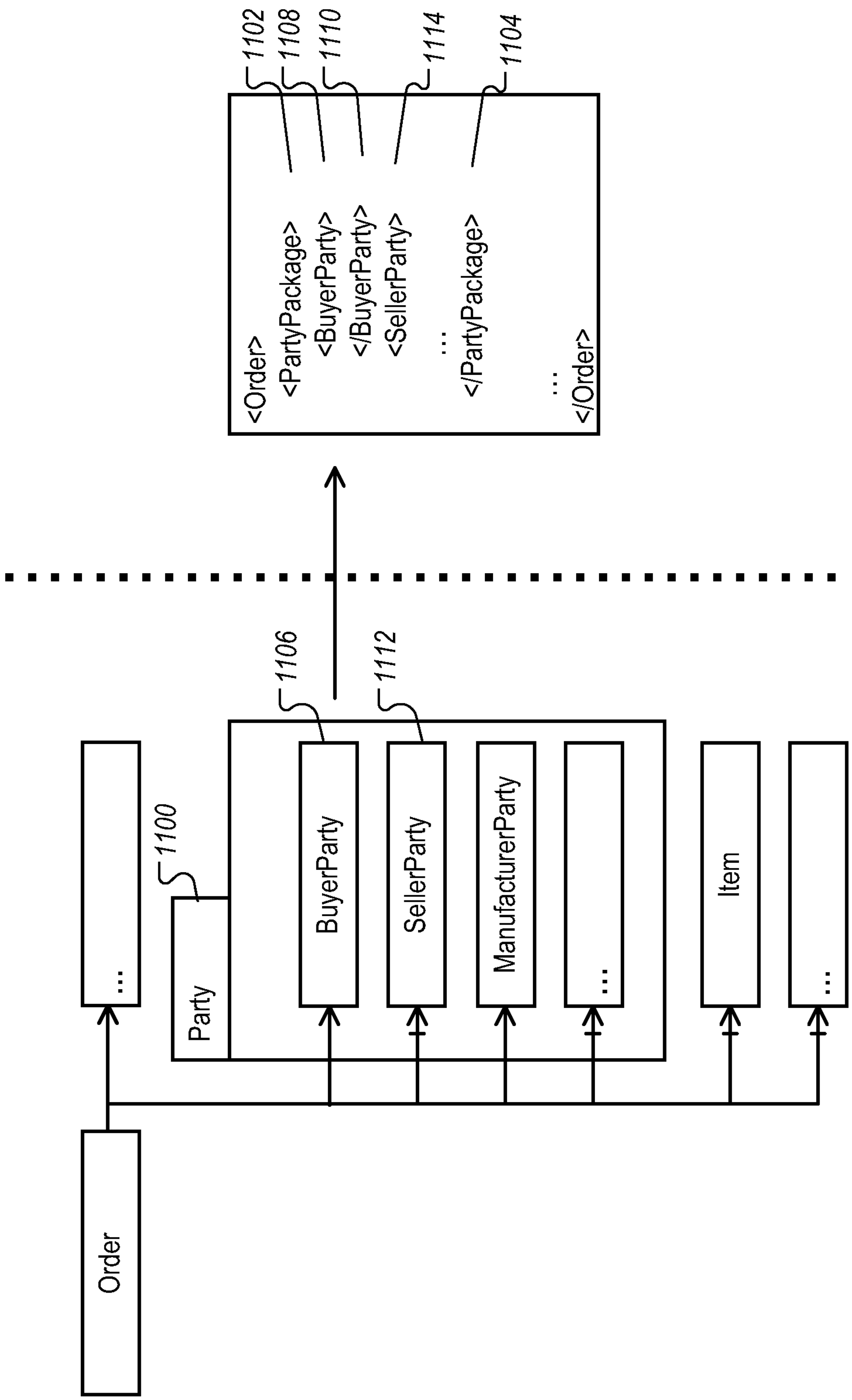
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
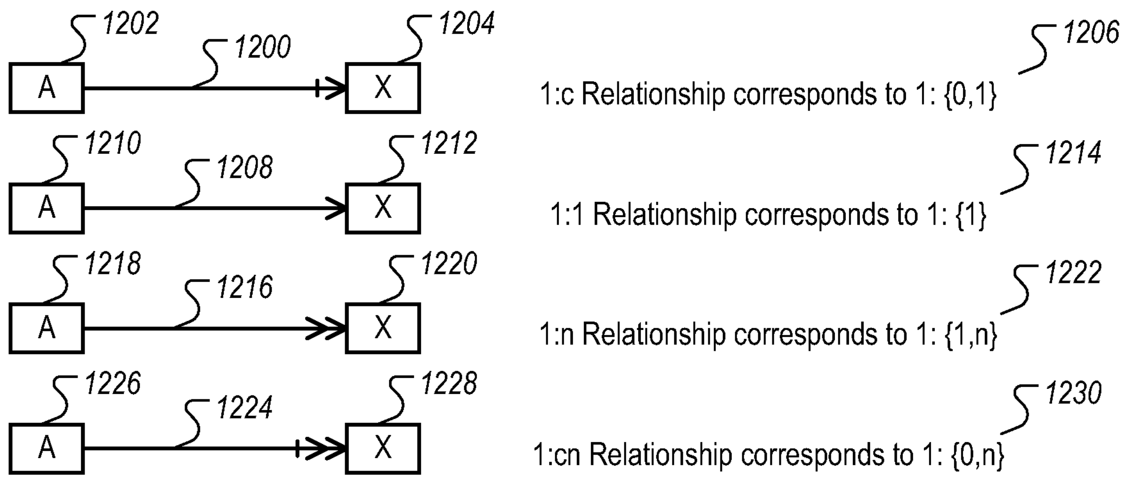
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
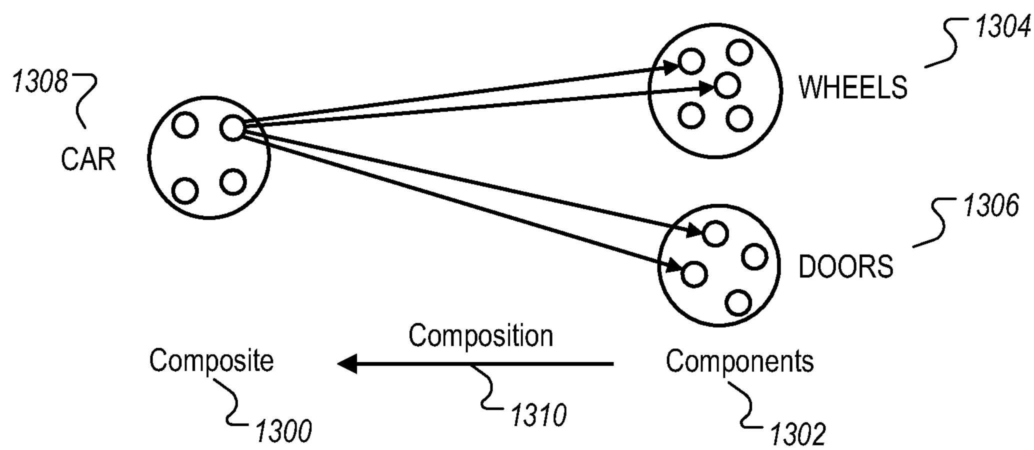
FIG. 13 depicts an example of a composition in accordance with methods and systems consistent with the subject matter described herein.
Figure 14:
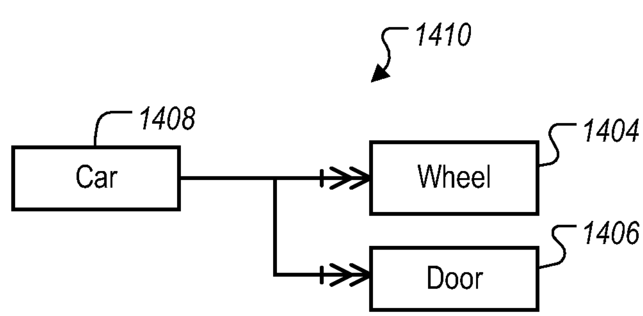
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
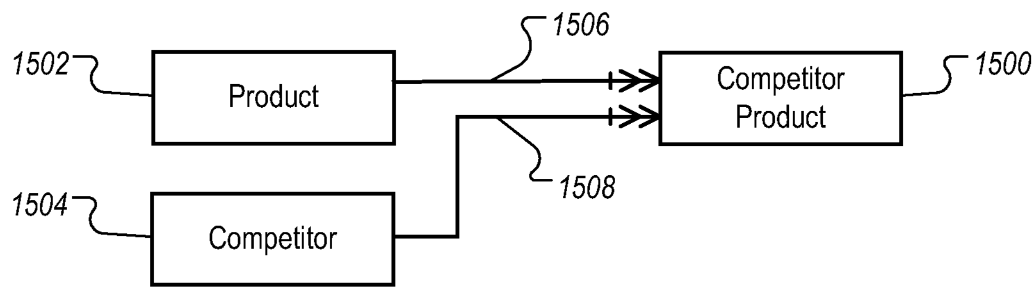
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
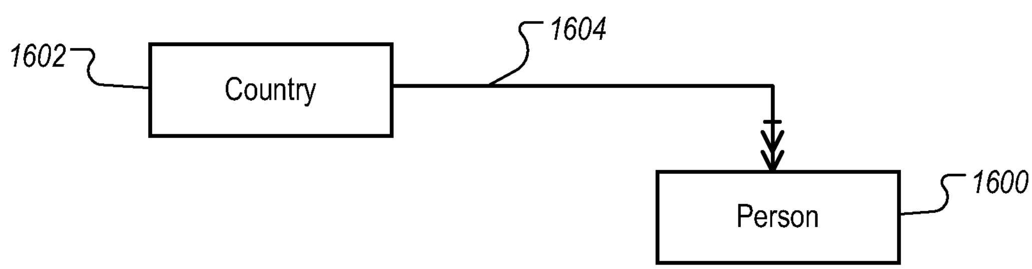
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
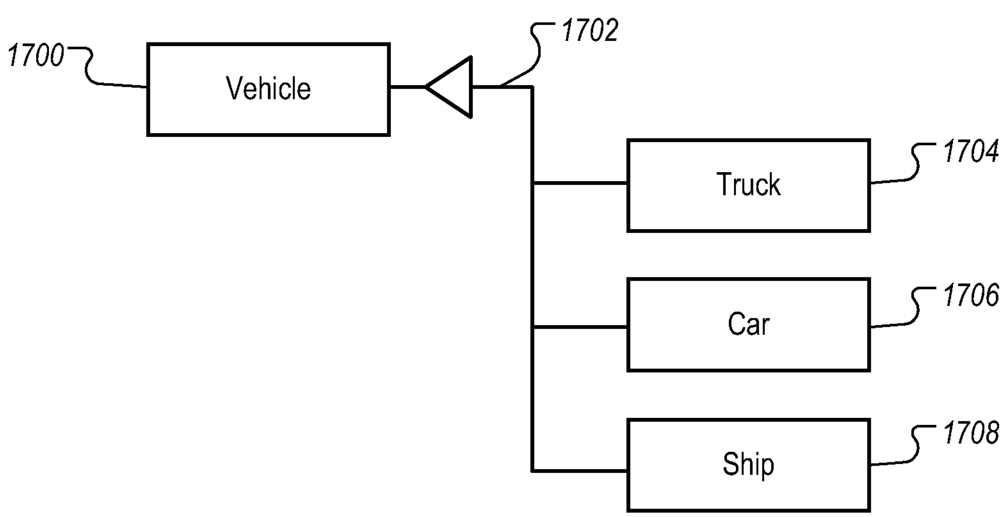
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
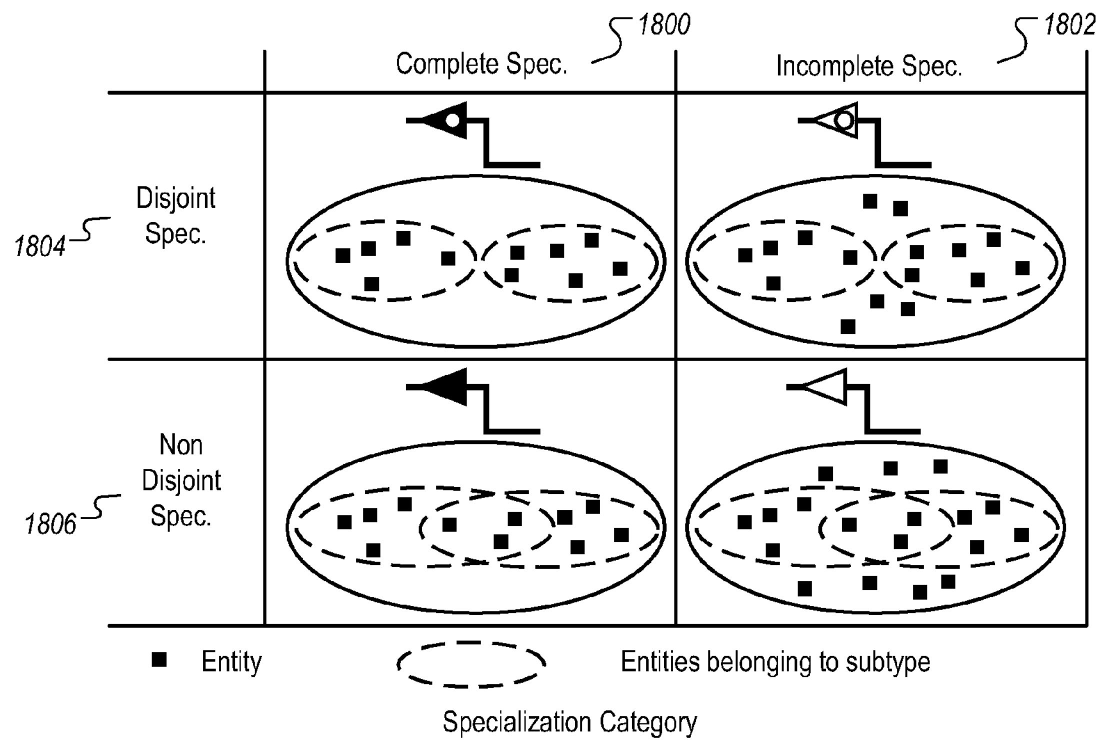
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
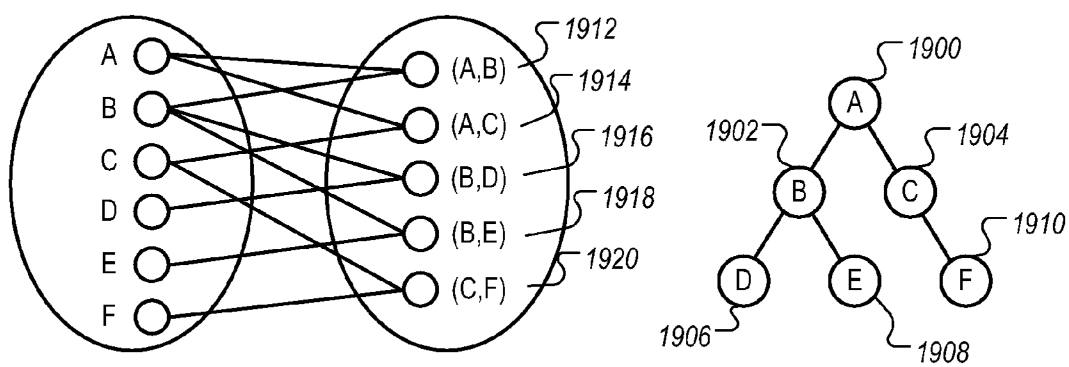
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
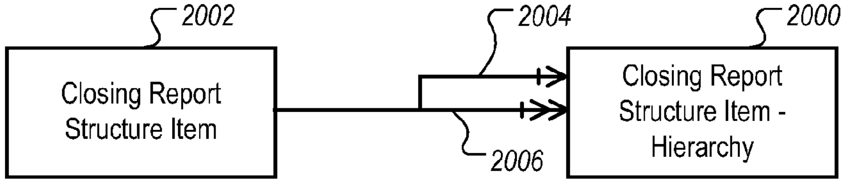
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
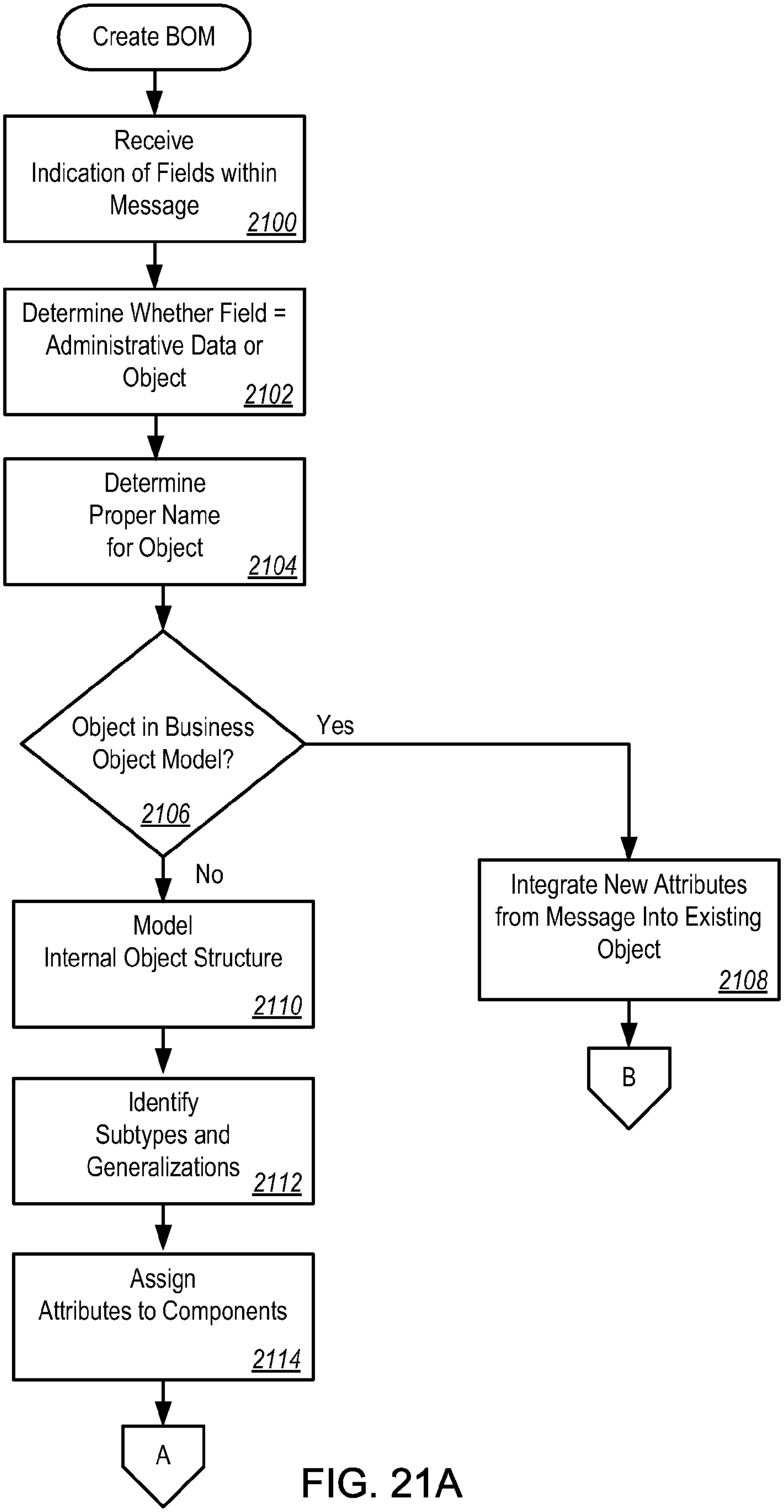
FIGS. 21A-B depict a flow diagram of the steps performed to create a business object model in accordance with methods and systems consistent with the subject matter described herein.
Figure 21B:
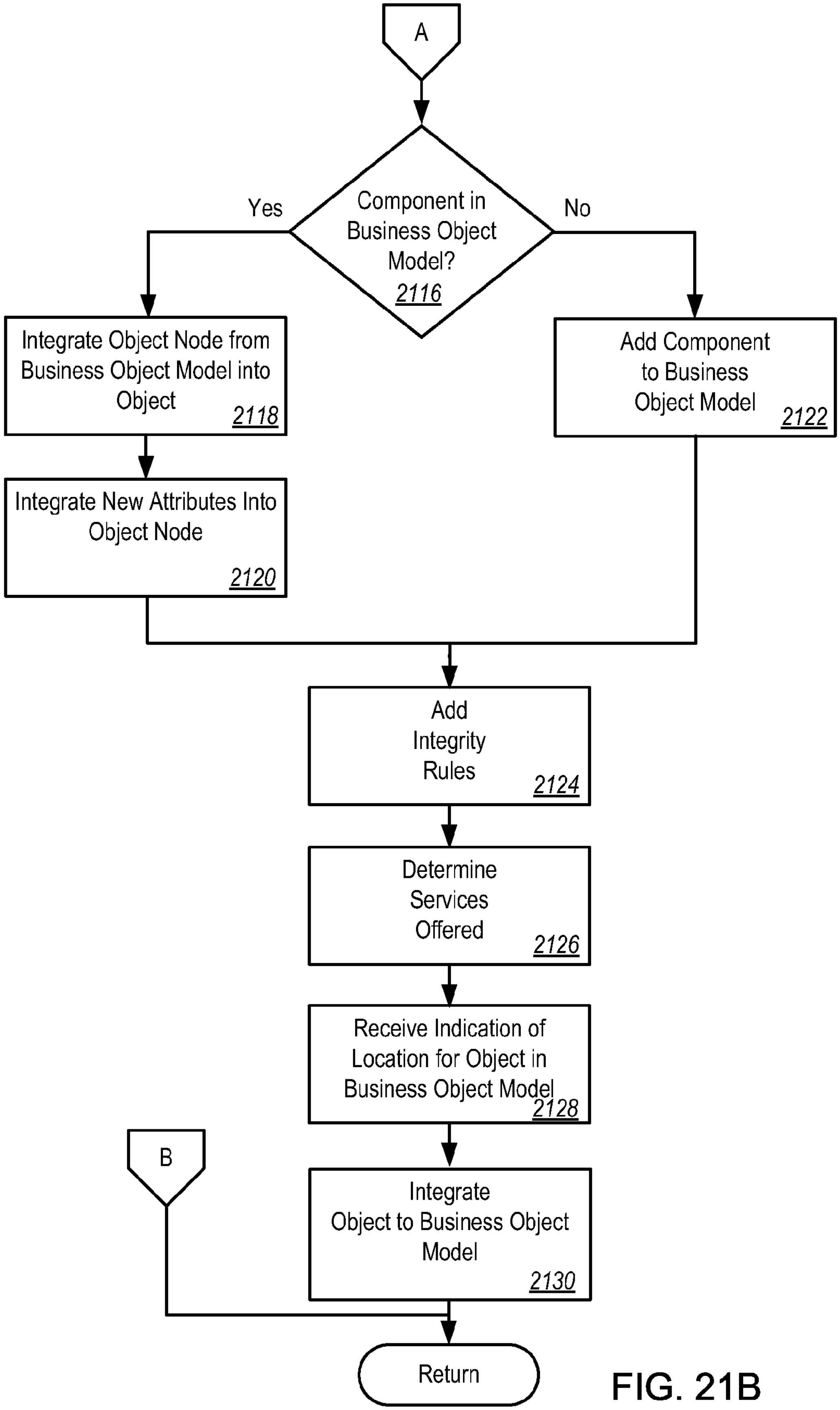

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |
| Amount | |
| BaseQuantity | |

-continued

| |
|---|
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | | |
|---|---|---|---|
| ID | Purchase Order | | |
| AdditionalID | | | |
| PostingDate | | | |
| LastChangeDate | | | |
| AcceptanceStatus | | | |
| Note | | | |
| CompleteTransmission Indicator | | | |
| Buyer | | Buyer | |
| BuyerOrganisationName | | | |
| Person Name | | | |
| FunctionalTitle | | | |
| DepartmentName | | | |
| CountryCode | | | |
| StreetPostalCode | | | |
| POBox Postal Code | | | |
| Company Postal Code | | | |
| City Name | | | |
| DistrictName | | | |
| PO Box ID | | | |
| PO Box Indicator | | | |
| PO Box Country Code | | | |
| PO Box Region Code | | | |
| PO Box City Name | | | |
| Street Name | | | |
| House ID | | | |
| Building ID | | | |
| Floor ID | | | |
| Room ID | | | |
| Care Of Name | | | |
| AddressDescription | | | |
| Telefonnumber | | | |
| MobileNumber | | | |
| Facsimile | | | |
| Email | | | |
| Seller | | Seller | |
| SellerAddress | | | |
| Location | | Location | |
| LocationType | | | |
| DeliveryItemGroupID | | DeliveryTerms | |
| DeliveryPriority | | | |
| DeliveryCondition | | | |
| TransferLocation | | | |
| NumberofPartialDelivery | | | |
| QuantityTolerance | | | |
| MaximumLeadTime | | | |
| TransportServiceLevel | | | |
| TranportCondition | | | |
| TransportDescription | | | |
| CashDiscountTerms | | | |
| PaymentForm | | Payment | |
| PaymentCardID | | | |
| PaymentCardReferenceID | | | |
| SequenceID | | | |
| Holder | | | |
| ExpirationDate | | | |
| AttachmentID | | | |
| AttachmentFilename | | | |
| DescriptionofMessage | | | |
| ConfirmationDescriptionof Message | | | |
| FollowUpActivity | | | |
| ItemID | | Purchase Order Item | |
| ParentItemID | | | |
| HierarchyType | | | |
| ProductID | | | Product |
| ProductType | | | |
| ProductNote | | | |
| ProductCategoryID | | | Product-Category |
| Amount | | | |
| BaseQuantity | | | |
| ConfirmedAmount | | | |

-continued

| | |
|---|---|
| ConfirmedBaseQuantity | |
| ItemBuyer | Buyer |
| ItemBuyerOrganisation | |
| Name | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |

-continued

| | |
|---|---|
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial | |
| Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetunitPrice | | 0 . . . 1 |
| | | ConfirmedPrice | | | 0 . . . 1 |
| | | | NetunitPrice | | 0 . . . 1 |
| | | Party | | | |
| | | | BuyerParty | | 0 . . . 1 |
| | | | SellerParty | | 0 . . . 1 |
| | | Location | | | |
| | | | ShipTo Location | | 0 . . . 1 |
| | | | ShipFrom Location | | 0 . . . 1 |
| | | DeliveryTerms | | | 0 . . . 1 |
| | | Attachment | | | 0 . . . n |
| | | Description | | | 0 . . . 1 |
| | | Confirmation Description | | | 0 . . . 1 |
| | | ScheduleLine | | | 0 . . . n |
| | | | Delivery Period | | 1 |
| | | ConfirmedScheduleLine | | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |

-continued

| | | |
|---|---|---|
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
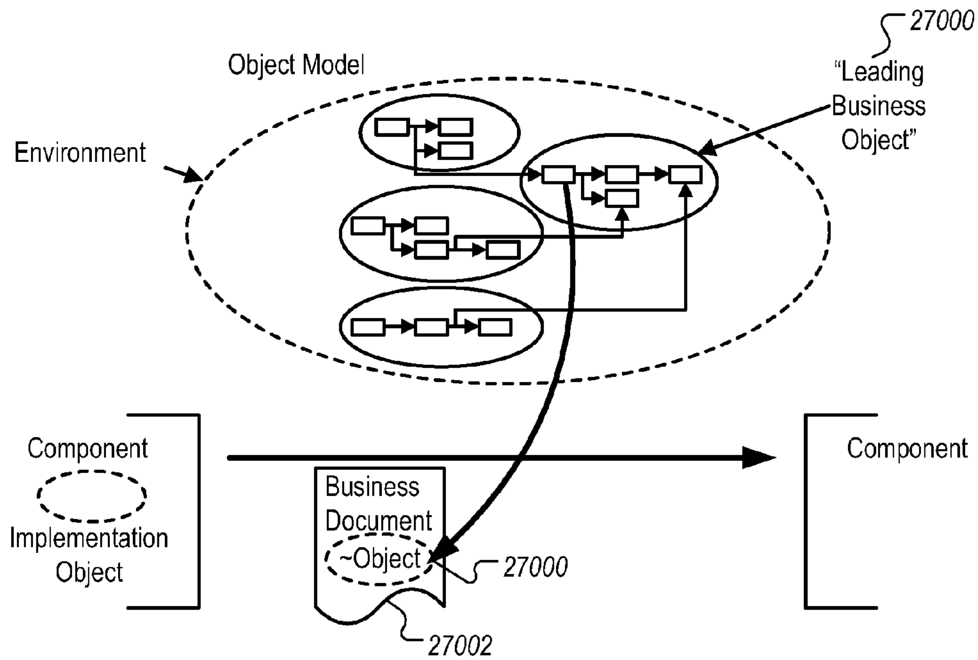
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
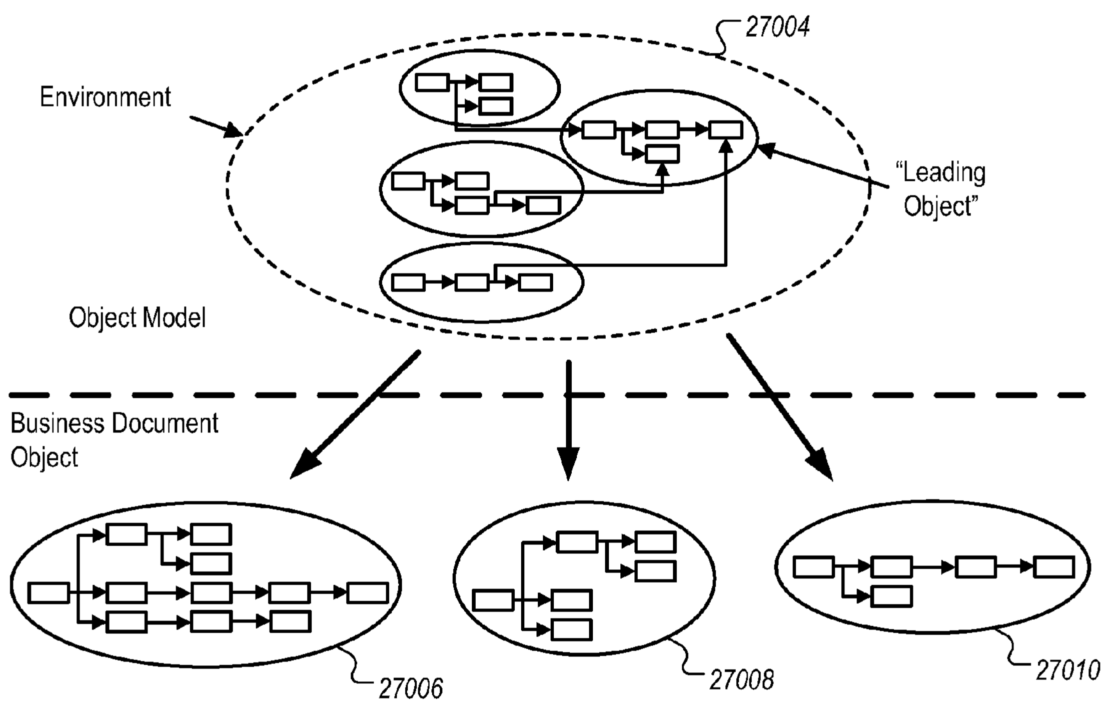

As illustrated in FIG. 27B, several business document objects 27006, 27008, and 27010 as overlapping views may be derived for a given leading object 27004. Each business document object results from the object model by hierarchization.

Figure 27C:
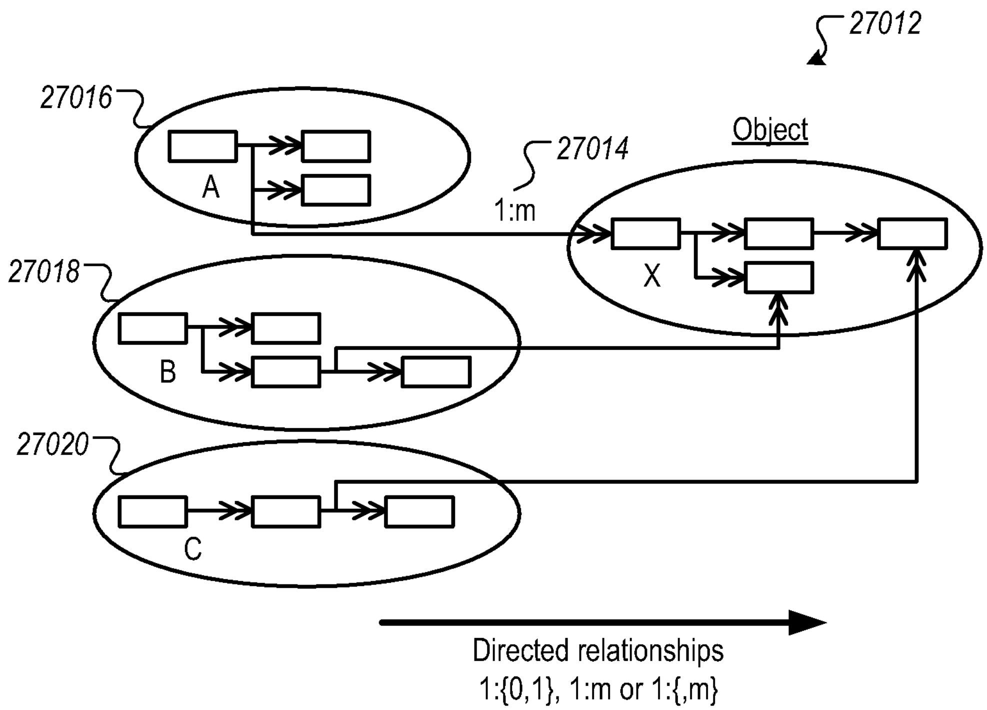

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
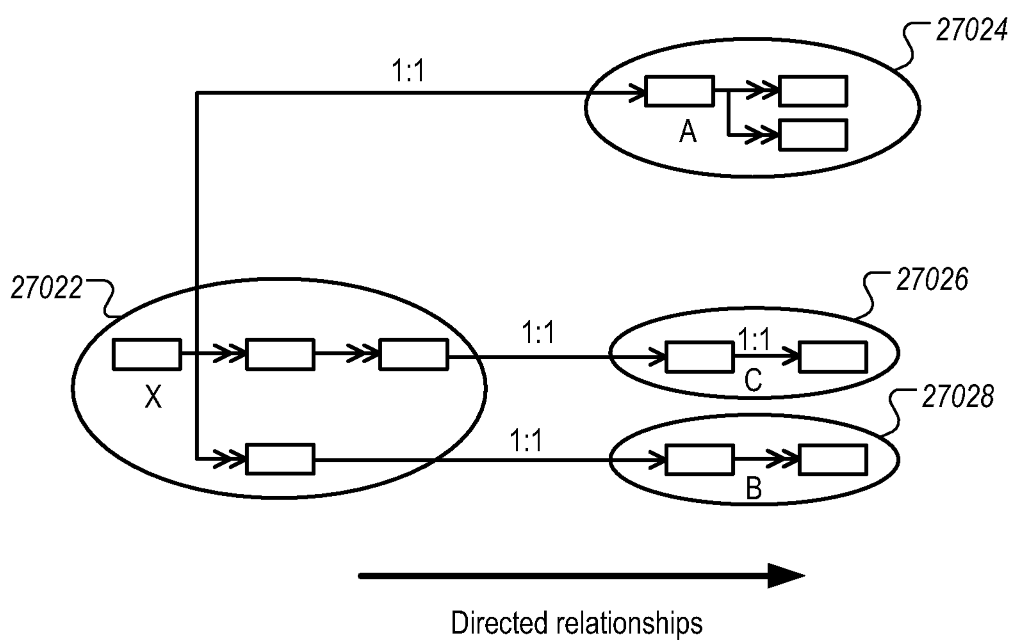

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
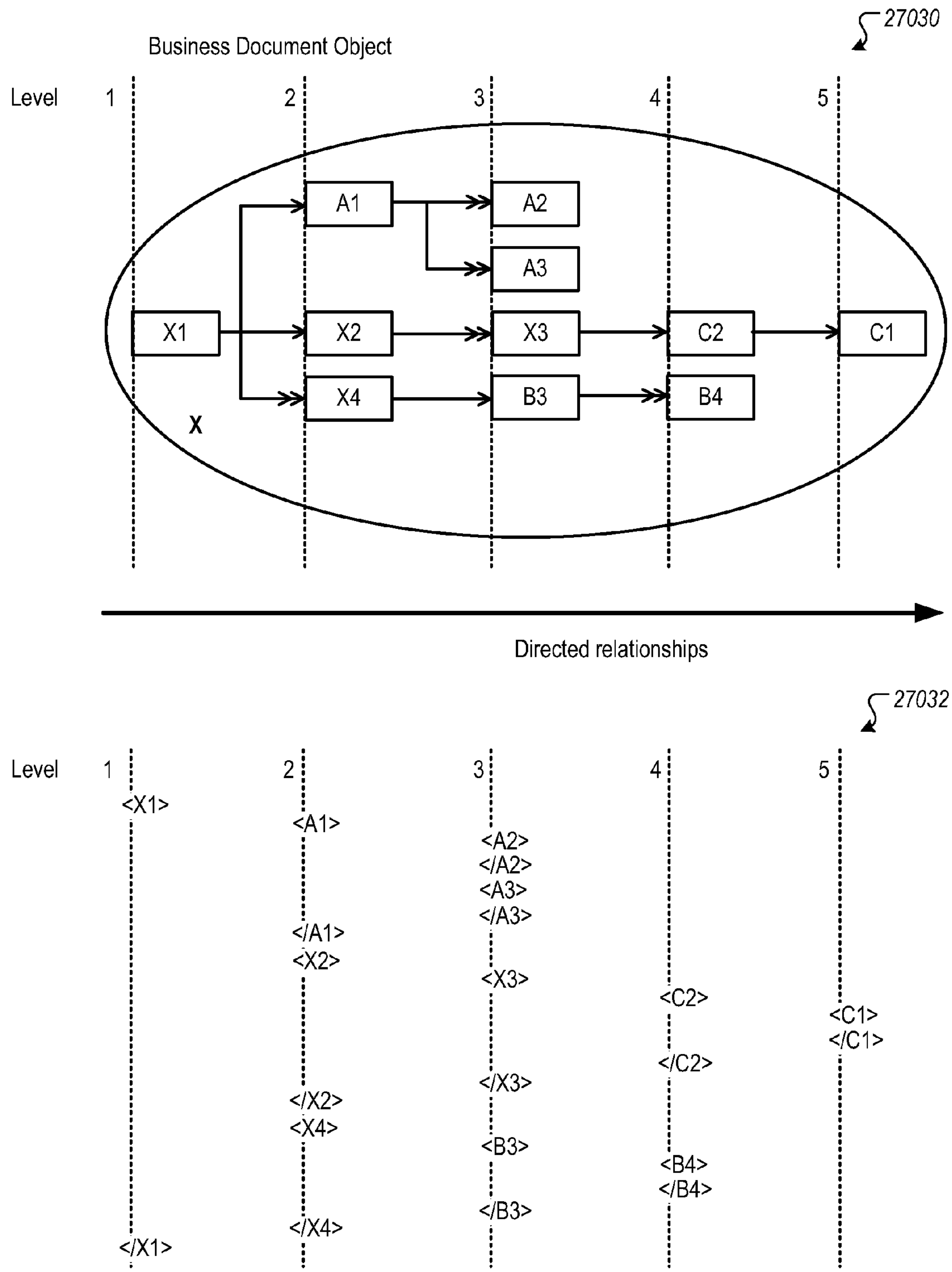

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process. A business document object always refers to a leading business document object and is derived from this object. The name of the root entity in the business document entity is the name of the business object or the name of a specialization of the business object or the name of a service specific view onto the business object. The nodes and elements of the business object that are relevant (according to the semantics of the associated message type) are contained as entities and elements in the business document object.

The name of a business document entity is predefined by the name of the corresponding business object node. The name of the superordinate entity is not repeated in the name of the business document entity. The "full" semantic name results from the concatenation of the entity names along the hierarchical structure of the business document object.

The structure of the business document object is, except for deviations due to hierarchization, the same as the structure of the business object. The cardinalities of the business document object nodes and elements are adopted identically or more restrictively to the business document object. An object from which the leading business object is dependent can be adopted to the business document object. For this arrangement, the relationship is inverted, and the object (or its parts, respectively) are hierarchically subordinated in the business document object.

Nodes in the business object representing generalized business information can be adopted as explicit entities to the business document object (generally speaking, multiply TypeCodes out). When this adoption occurs, the entities are named according to their more specific semantic (name of TypeCode becomes prefix). Party nodes of the business object are modeled as explicit entities for each party role in the business document object. These nodes are given the name <Prefix><Party Role>Party, for example, BuyerParty, ItemBuyerParty. BTDReference nodes are modeled as separate entities for each reference type in the business document object. These nodes are given the name <Qualifier><BO><Node>Reference, for example SalesOrderReference, OriginSalesOrderReference, SalesOrderItemReference. A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types. Elements are typed by GDTs according to their business objects. Aggregated levels are typed with message type specific data types (Intermediate Data Types), with their names being built according to the corresponding paths in the message type structure. The whole message type structured is typed by a message data type with its name being built according to the root entity with the suffix "Message". For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status “pending.”

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status “pending.” The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status “pending.” The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
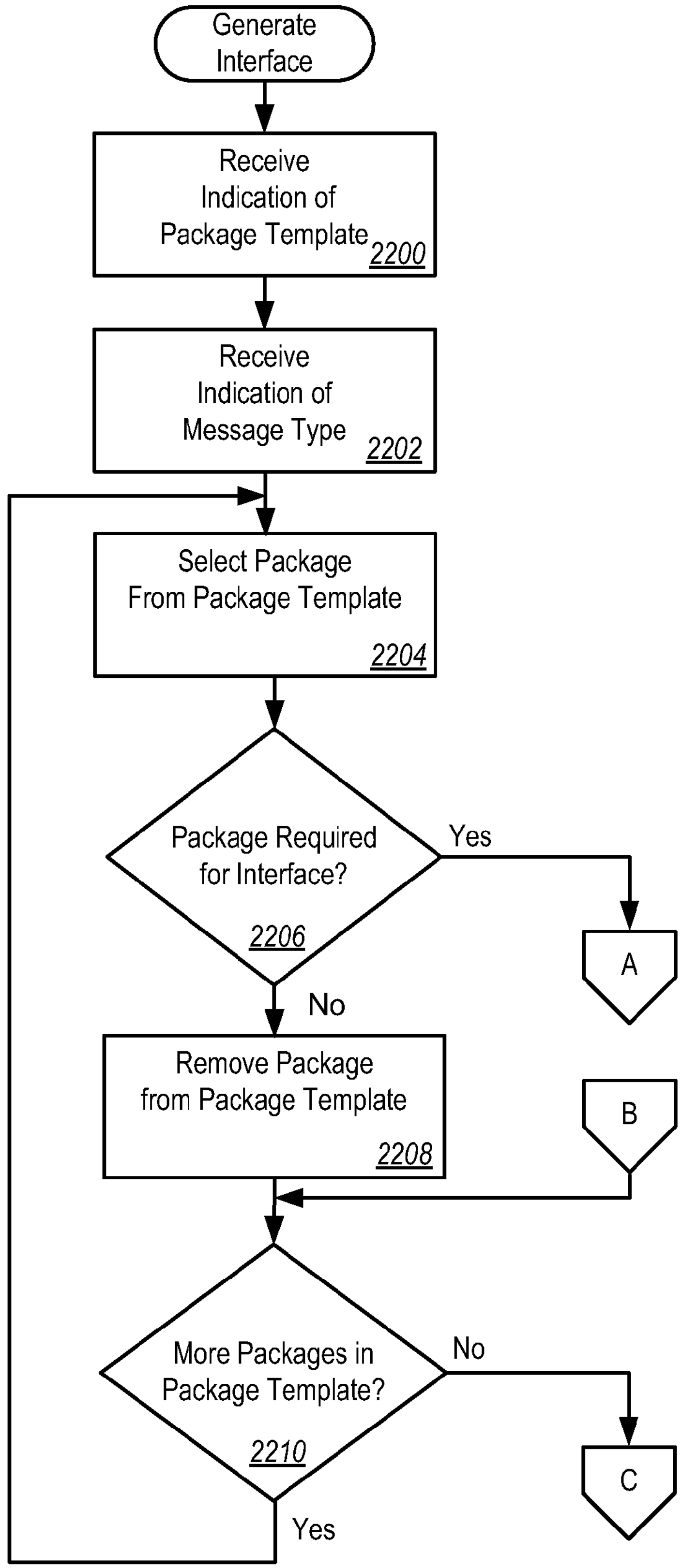
FIGS. 22A-F depict a flow diagram of the steps performed to generate an interface from the business object model in accordance with methods and systems consistent with the subject matter described herein.
Figure 22B:
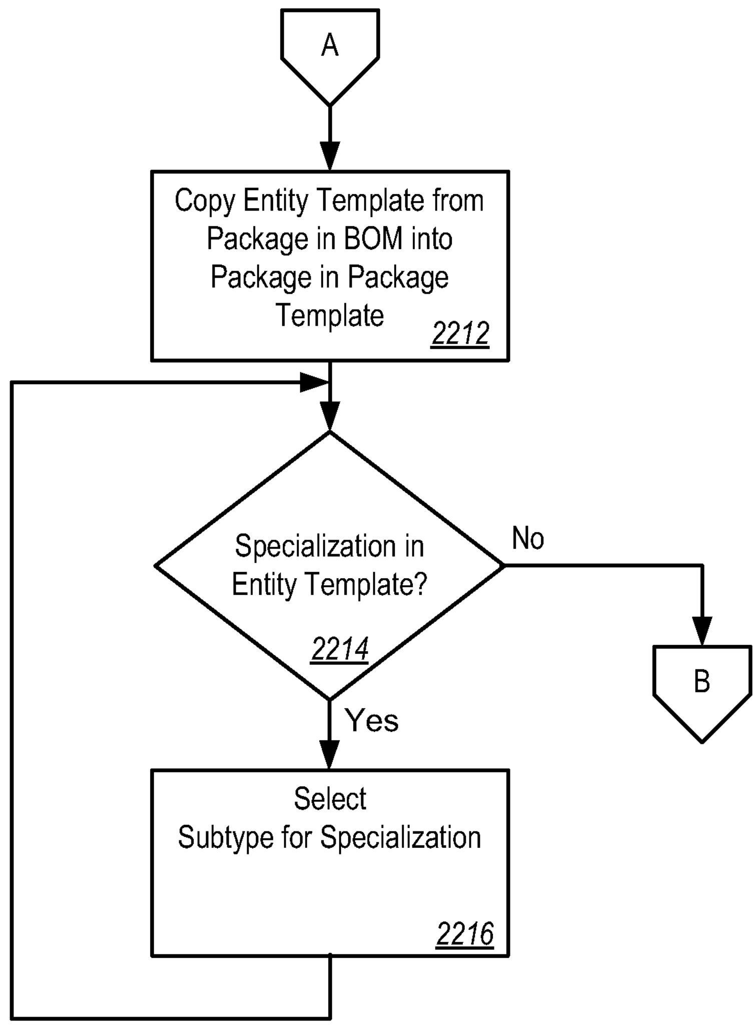
Figure 22C:
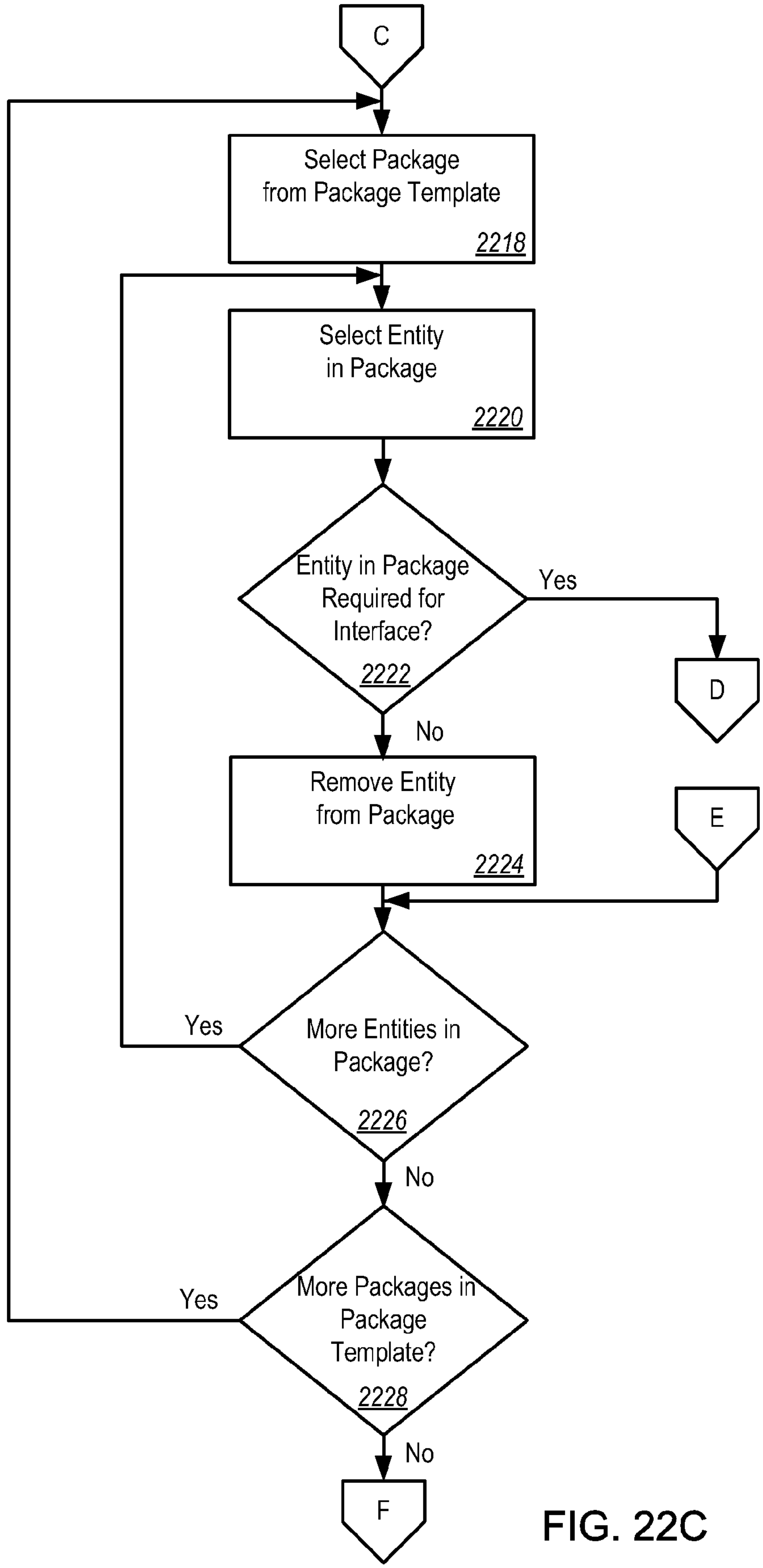

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
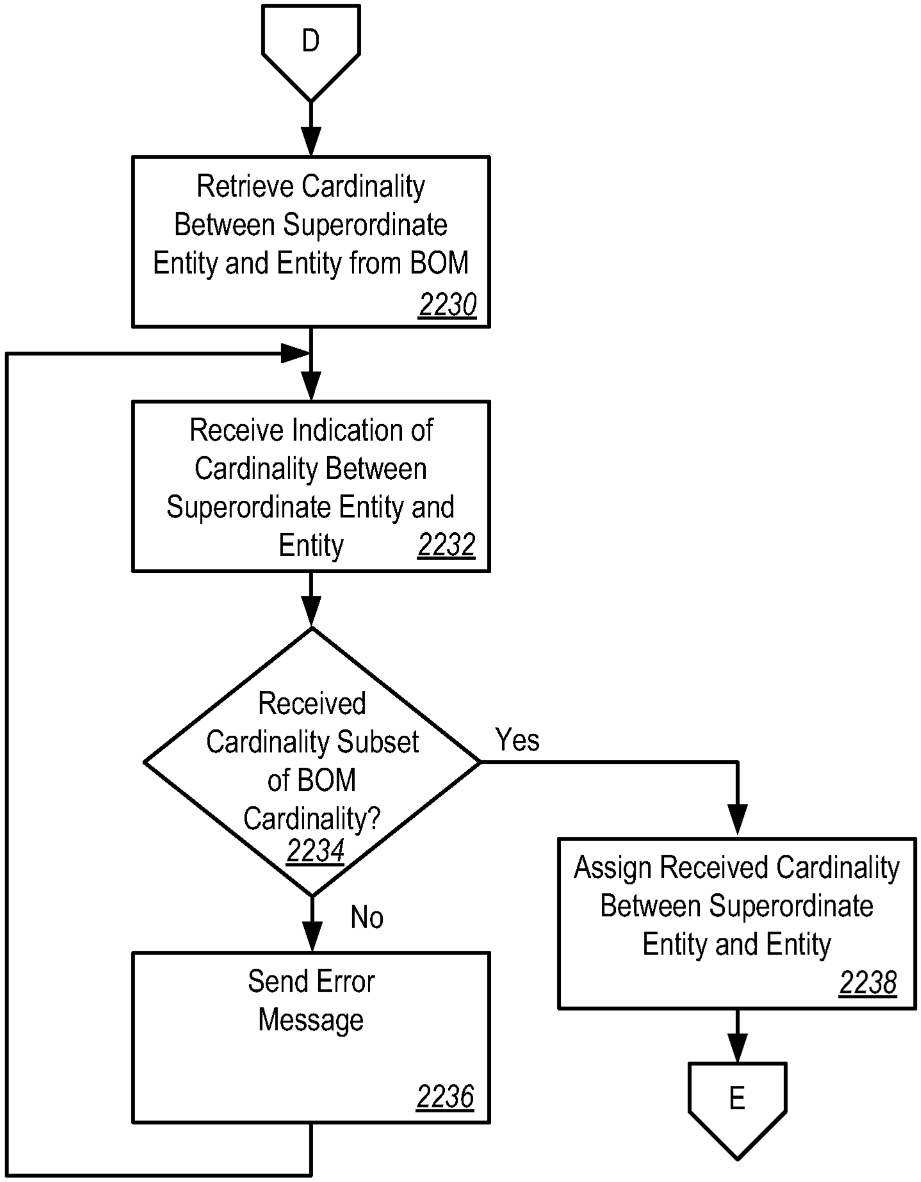

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
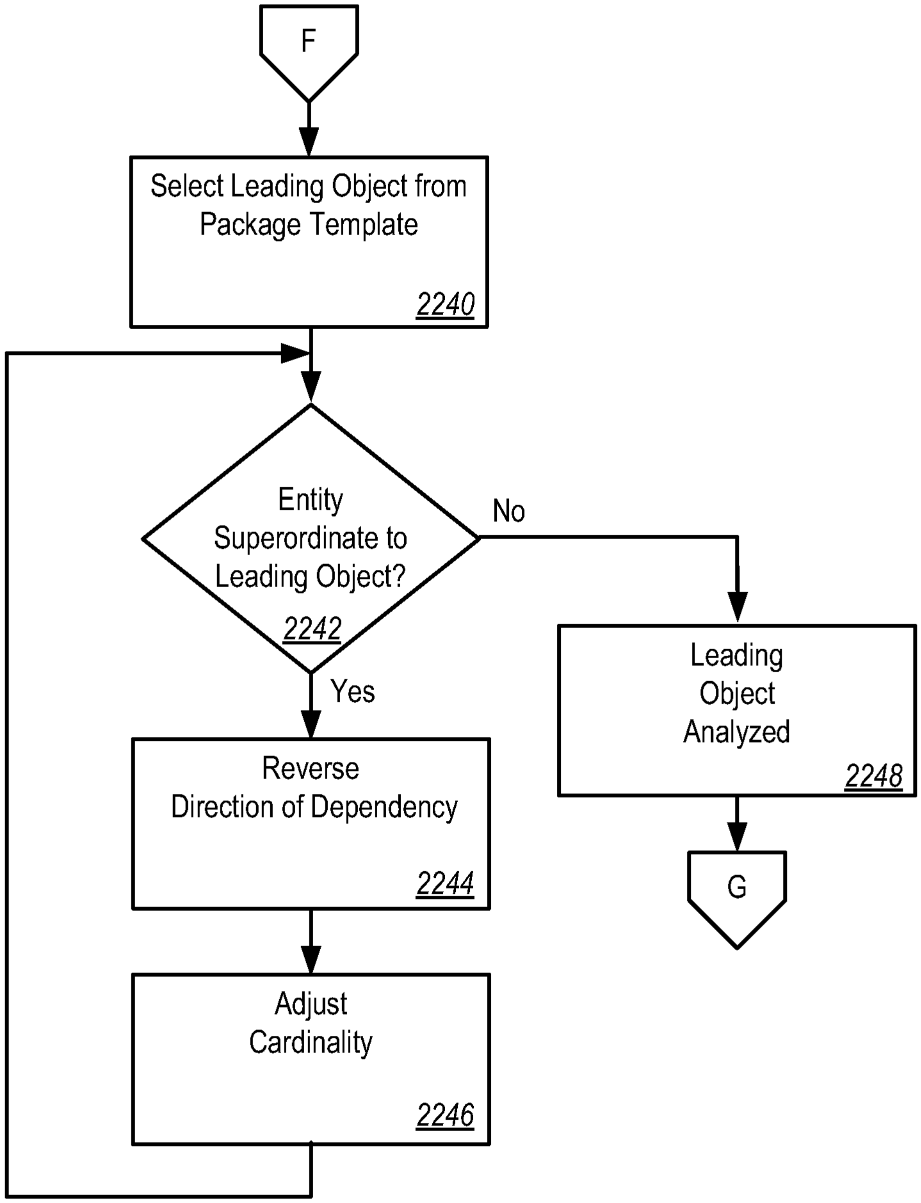

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
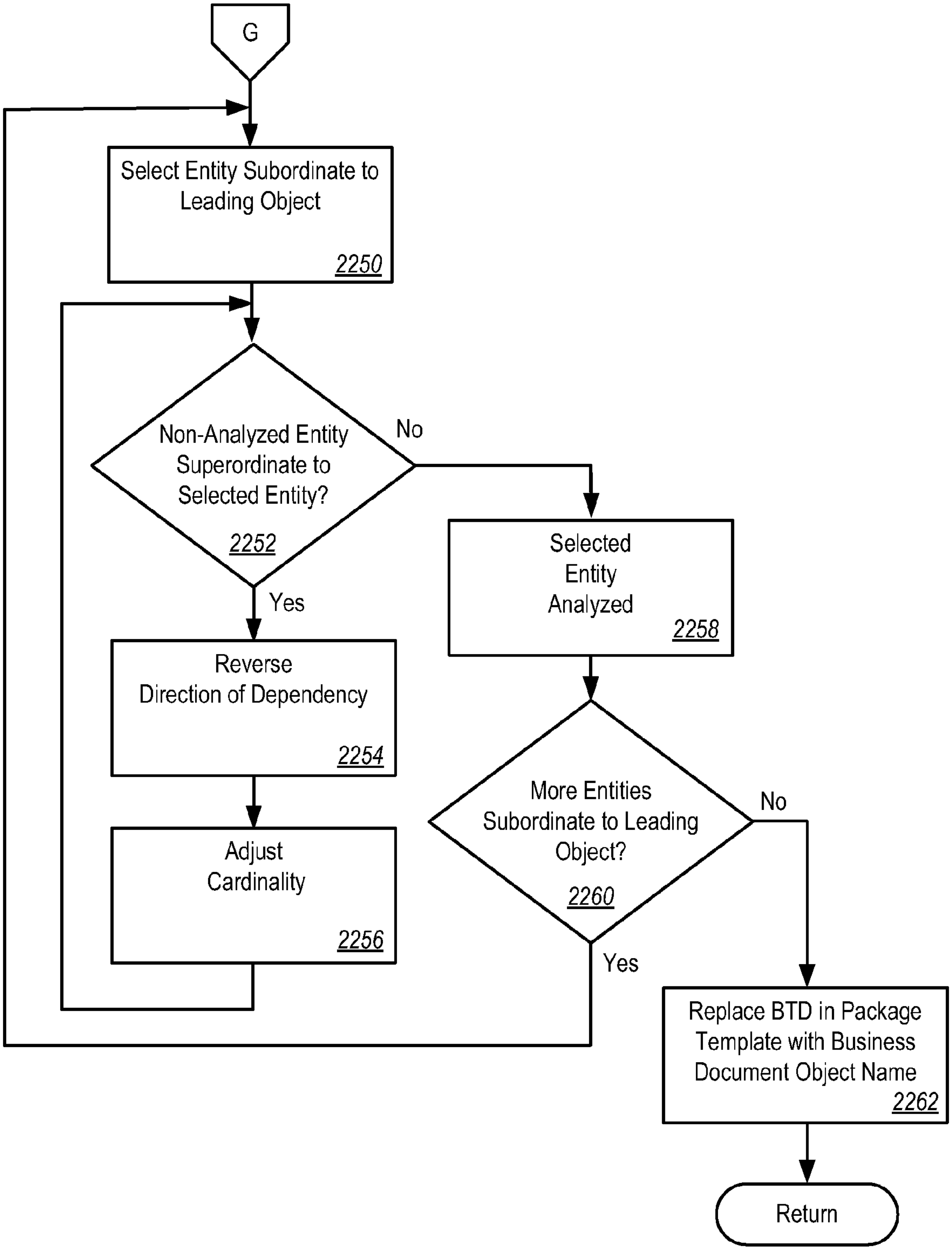

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
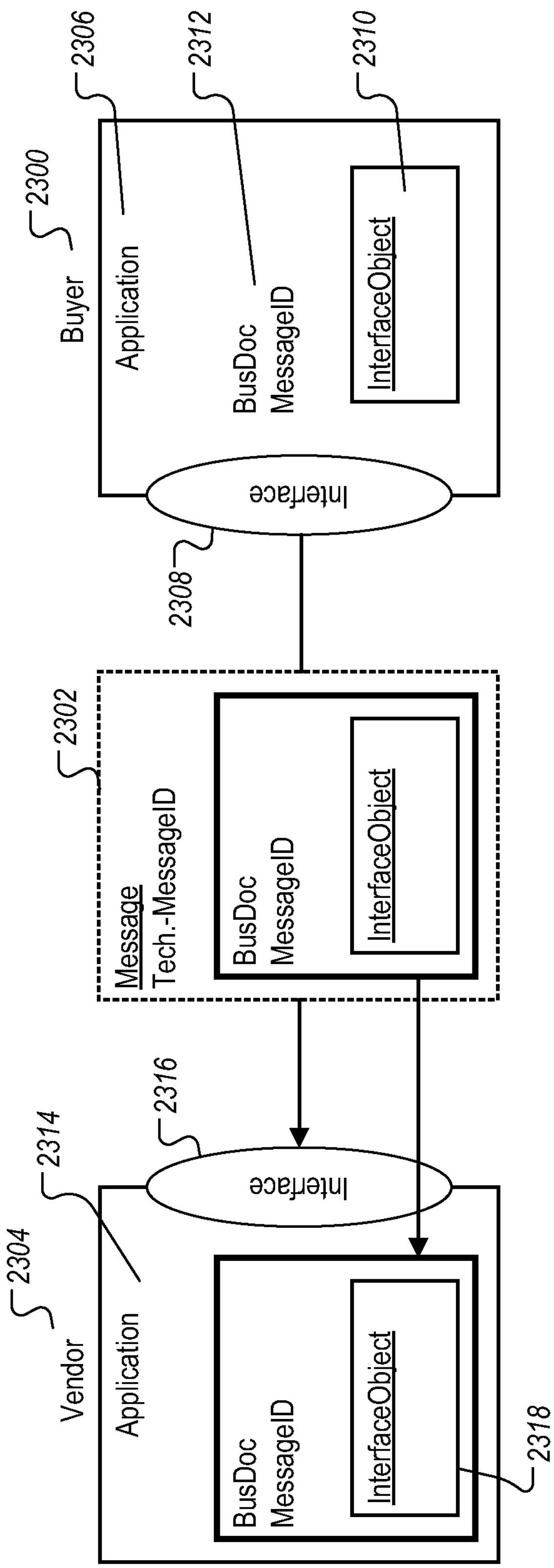
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
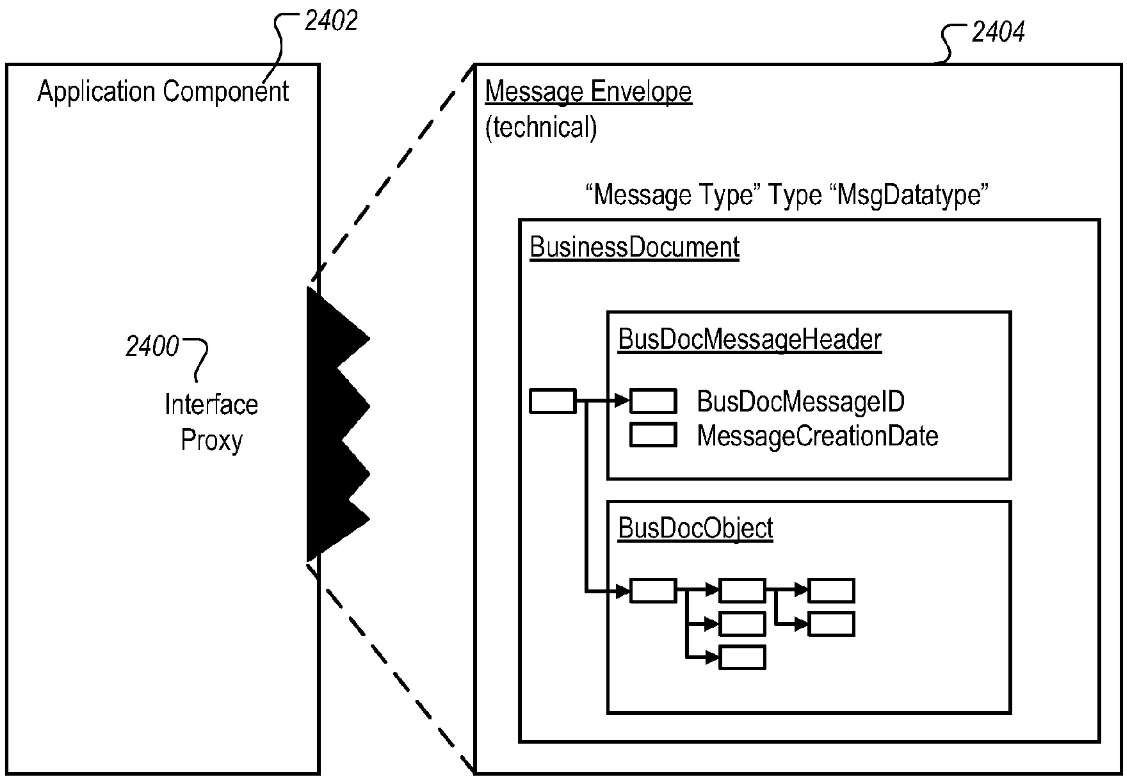
FIG. 24 depicts an interface proxy in accordance with methods and systems consistent with the subject matter described herein.
Figure 25:
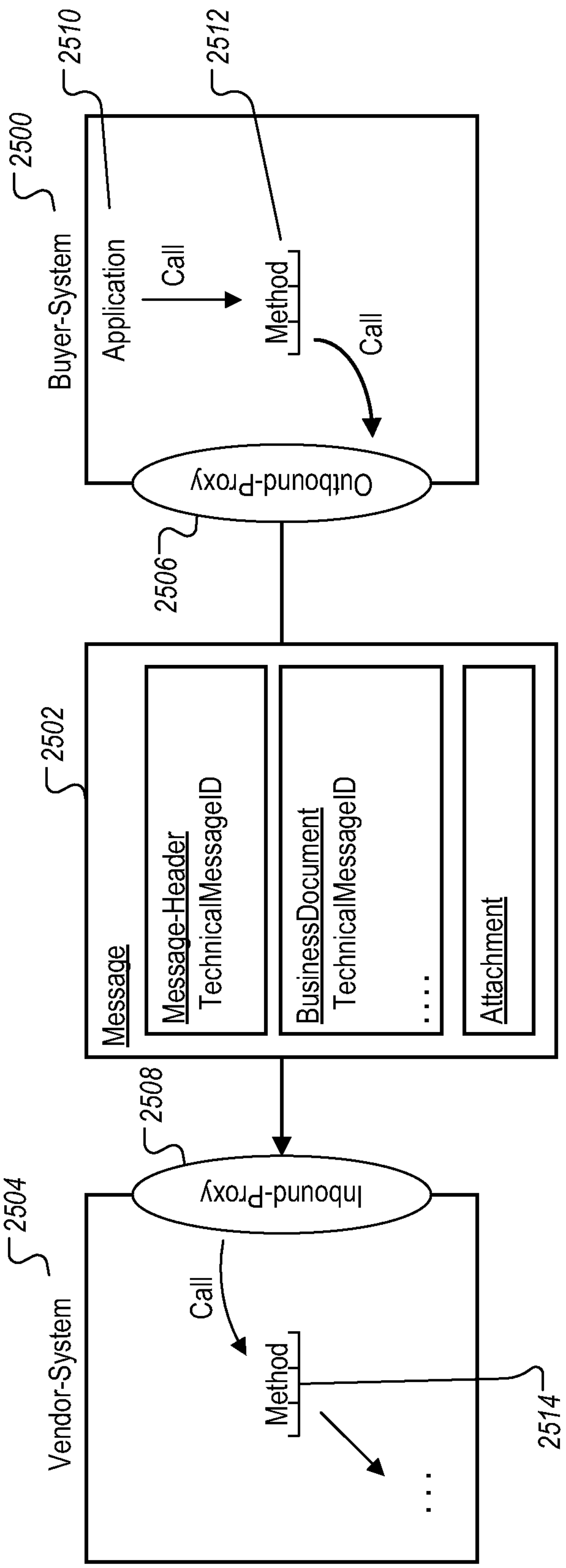
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
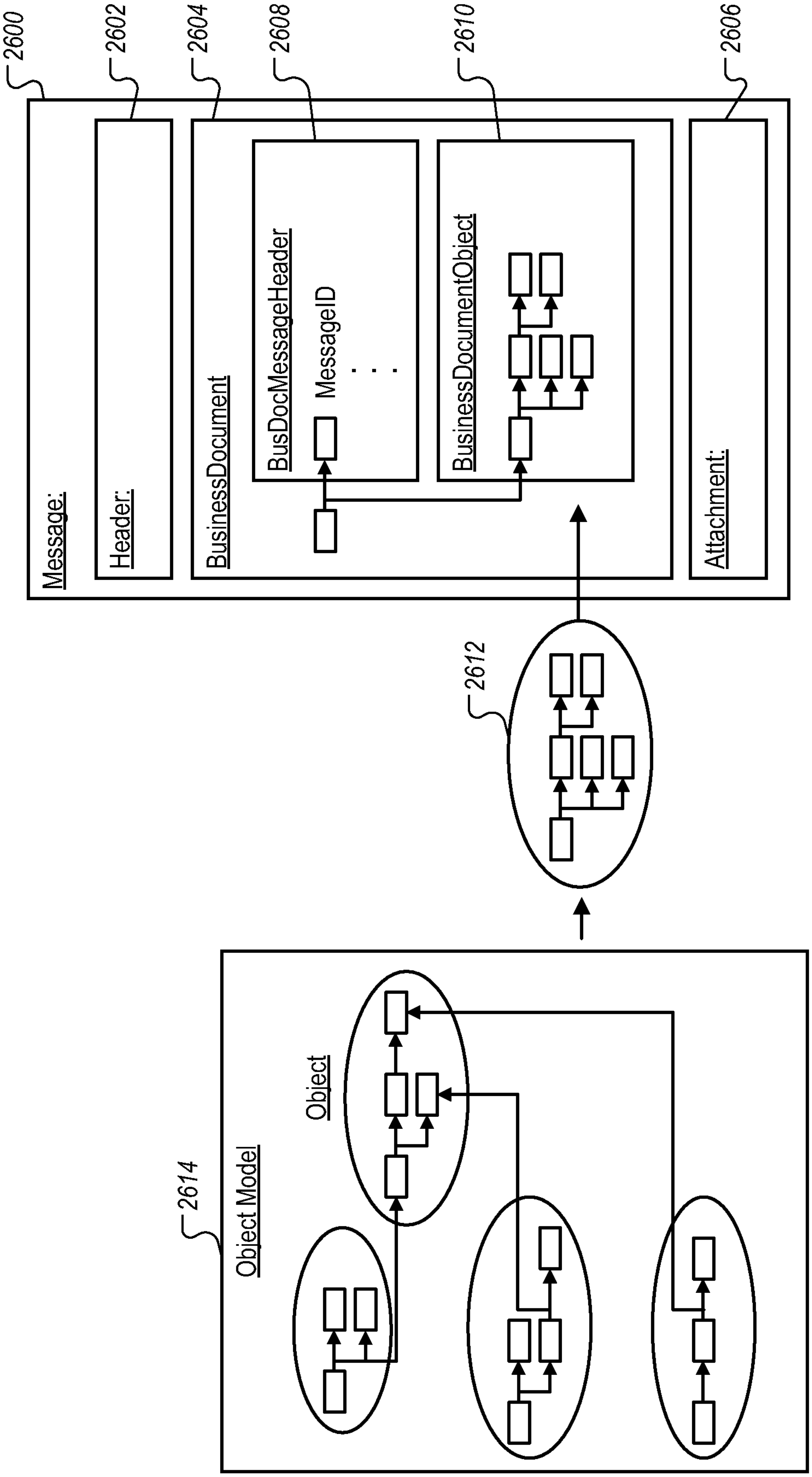
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
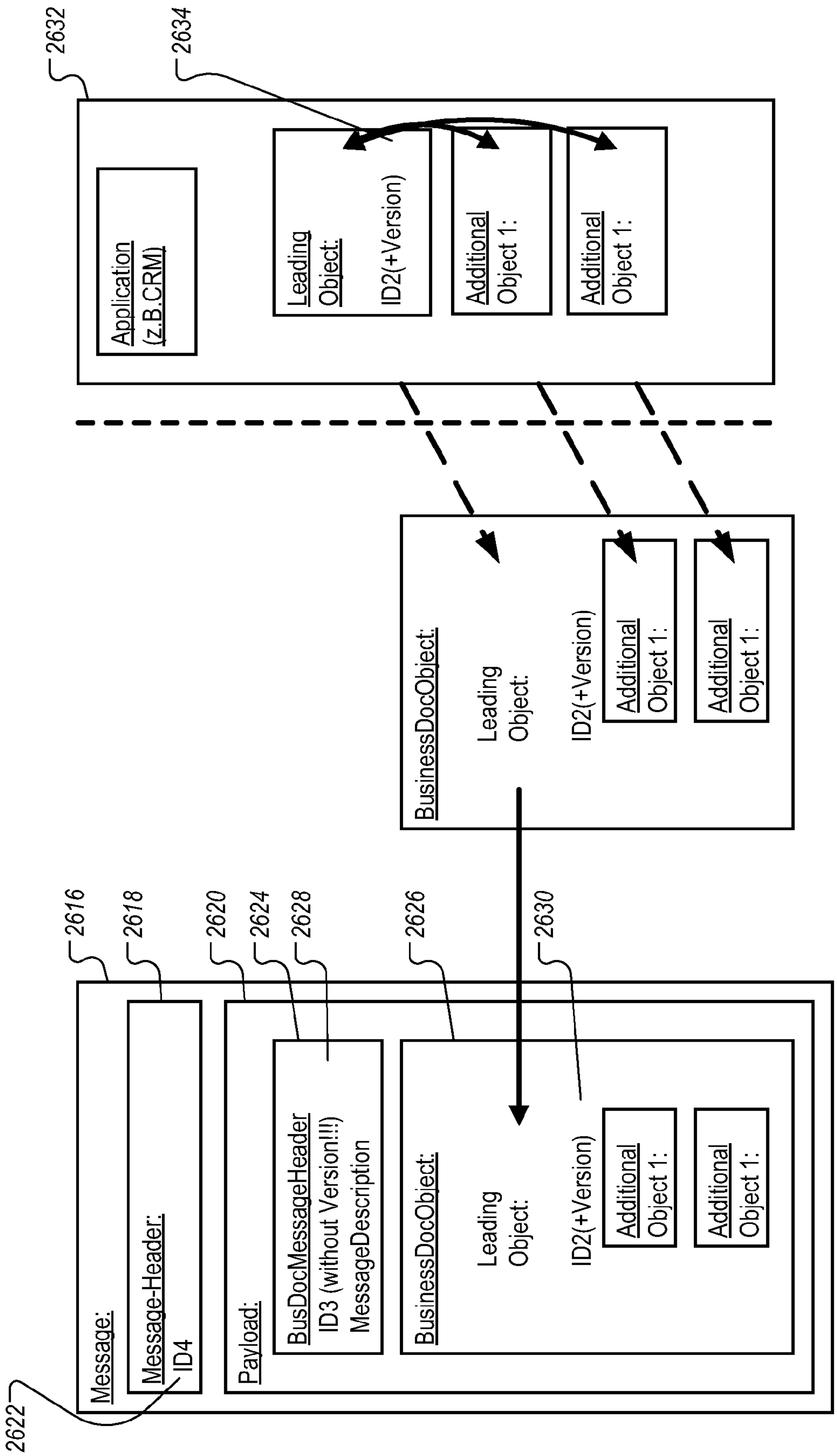
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
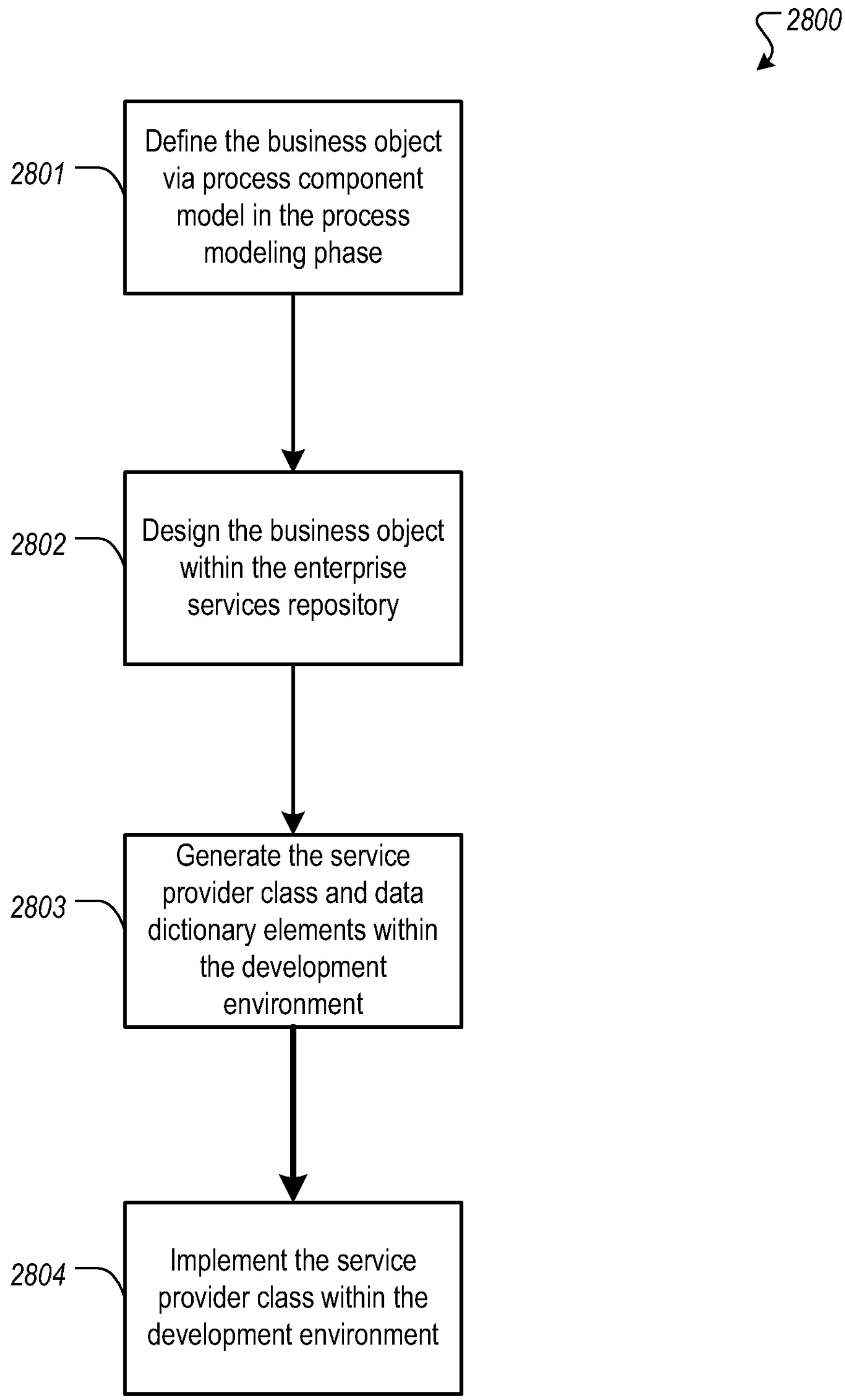
FIG. 28 illustrates an example method for service enabling in accordance with one embodiment of the present disclosure.
Figure 29:
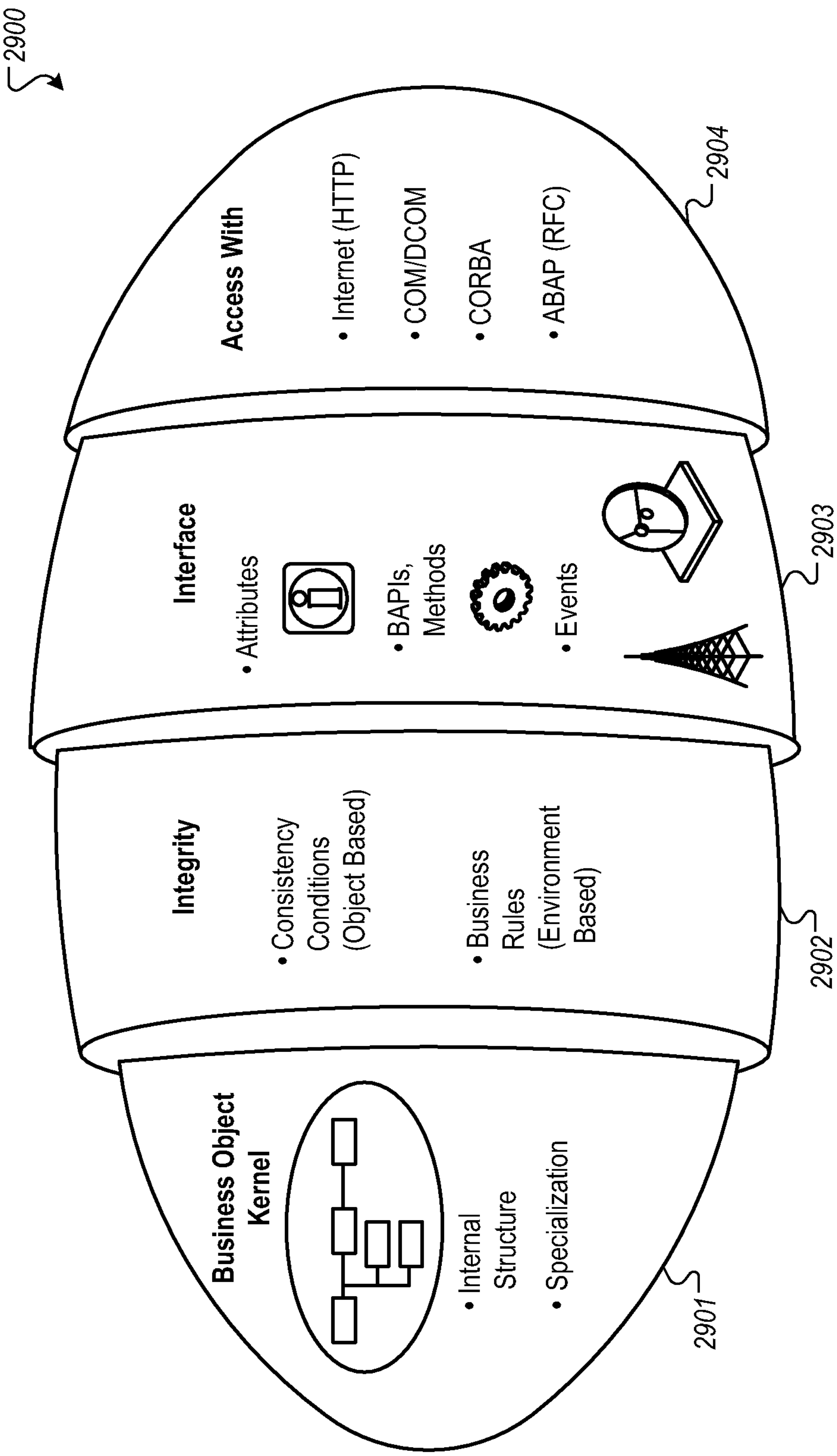
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
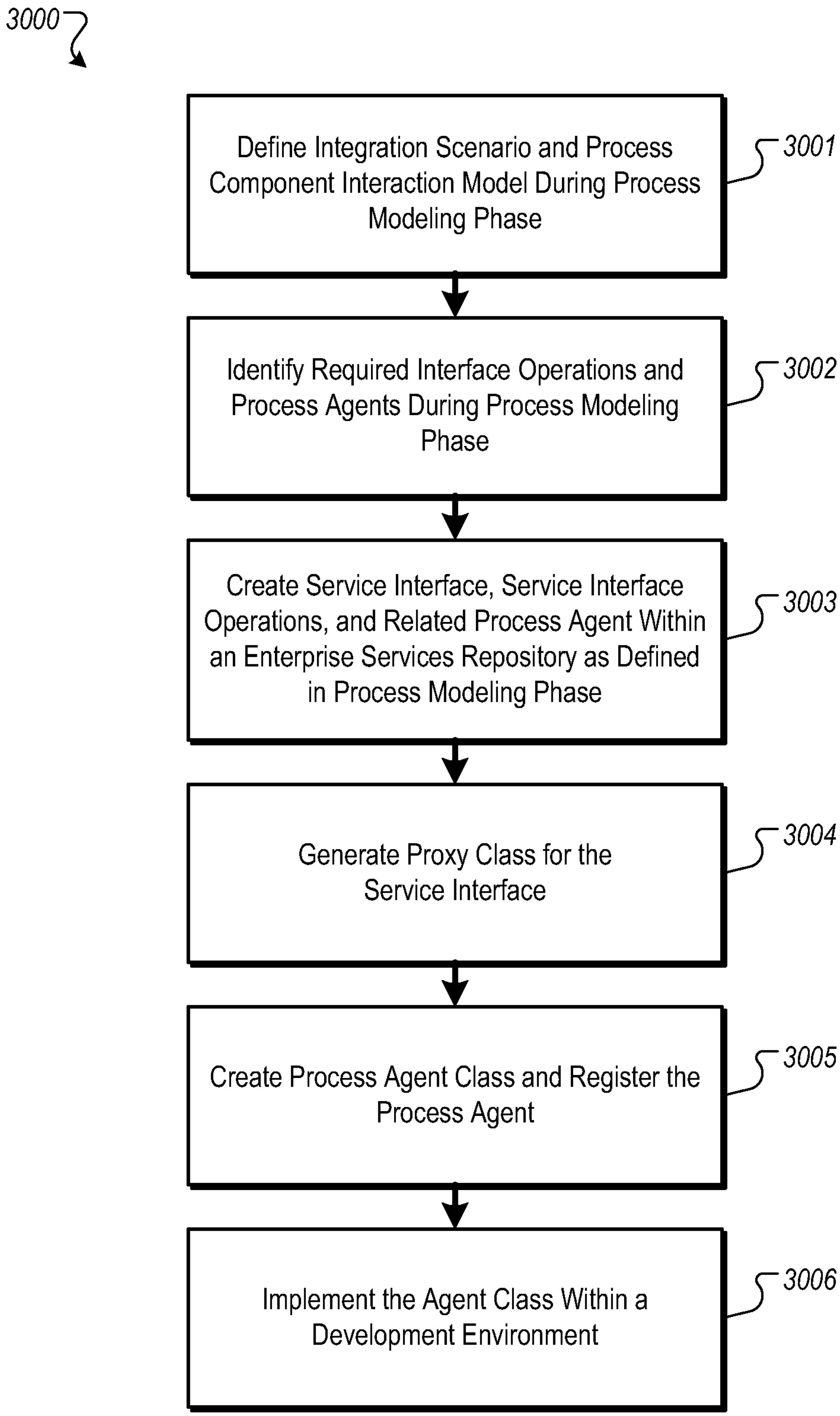
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
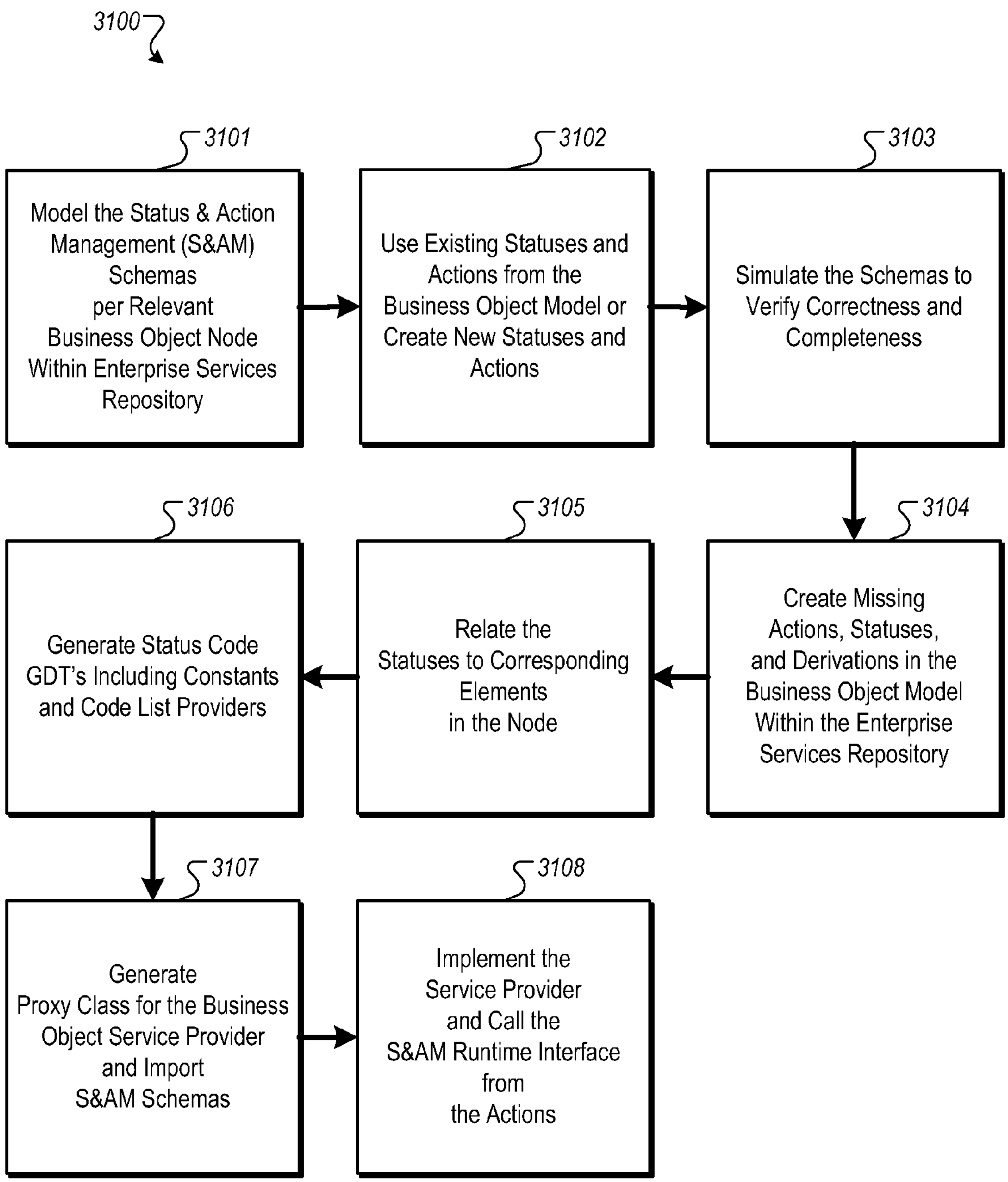
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

AssortmentPlan Interfaces

An AssortmentPlan is a plan for purchasing articles by a company. An AssortmentPlan may be assigned to one hierarchy node and made for a specific period in time (e.g., assigned to a season). AssortmentPlan includes materials related to a hierarchy node from a planning point of view. The materials are planned for the store groups involved. The AssortmentPlan interface performs a RetailPurchasingPlanERPRequest_Out operation. The RetailPurchasingPlanERPRequest_Out operation is a request from AssortmentPlanning to Retail Purchasing Request Processing to maintain a retail purchasing plan. This outbound operation is used to send a request to create or change a RetailPurchasingPlan from an AssortmentPlan in Merchandise and Assortment Planning. This is a representation of purchase quantities or values to realize a presentation of a planned product mix in groups of stores over a period of time. This plan is an output of an assortment planning process. The plan feeds one or more buying processes in purchasing systems. Therefore, this outbound operation can be seen as a central step to get from planning to execution of the AssortmentPlan.

The RetailPurchasingPlanERPRequest_Out operation includes a RetailPurchasingPlanERPRequest message type. The structure of the RetailPurchasingPlanERPRequest message type is specified by a RetailPurchasingPlanERPRequestMessage message data type.

Figure 32:
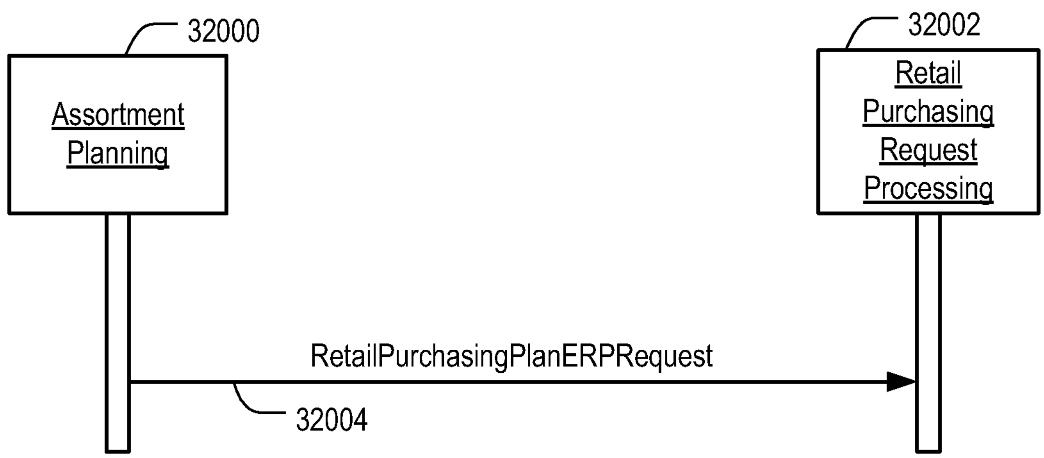
FIG. 32 illustrates an exemplary Assortment Planning Message Choreography.

The message choreography of FIG. 32 describes a possible logical sequence of messages that can be used to realize an Assortment Plan business scenario. An "Assortment Planning" system 32000 can request an employee resource planning (ERP) retail purchasing plan from a "Retail Purchasing Request Processing" system 32002, using a RetailPurchasingPlanERPRequest message 32004 as shown, for example, in FIG. 32.

FIGS. 33-1 through 33-20 illustrate one example logical configuration of AssortmentPlanMessage element structure 33000. Specifically, these figures depict the arrangement and hierarchy of various components such as one or more levels of packages, entities, and datatypes, shown here as 33000 through 33388. As described above, packages may be used to represent hierarchy levels. Entities are discrete business elements that are used during a business transaction. Data types are used to type object entities and interfaces with a structure. For example, AssortmentPlanMessage element structure 33000 includes, among other things, MessageHeader 33006. Accordingly, heterogeneous applications may communicate using this consistent message configured as such.

In further detail, FIGS. 33-1 through 33-20 illustrate an example configuration of an Element Structure that includes an AssortmentPlanMessage 33000 package. The AssortmentPlanMessage 33000 package includes an AssortmentPlanMessage 33002 entity. The AssortmentPlanMessage 33000 package includes various packages, namely a MessageHeader 33004 and an AssortmentPlan 33018.

The MessageHeader 33004 package is a BusinessDocumentMessageHeader 33008 data type. The MessageHeader 33004 package includes a MessageHeader 33006 entity. A BusinessDocumentMessageHeader includes business information from a perspective of a sender application for identifying processing of a business document instance within a technical message, if applicable, with a reference to a previous instance of the business document within a previous technical message. The BusinessDocumentMessageHeader also includes information about the sender, and information about the receiver. The MessageHeader 33006 entity includes various attributes, namely an ID 33010 and a CreationDateTime 33014. The ID 33010 attribute is a BusinessDocumentMessageID 33012 data type. The CreationDateTime 33014 attribute is a DateTime 33016 data type.

The AssortmentPlan 33018 package is an <MT>AsstmtPln 33022 data type. The AssortmentPlan 33018 package includes an AssortmentPlan 33020 entity. The AssortmentPlan 33018 package includes various packages, namely an Item 33096 and a TargetSales 33356. The AssortmentPlan 33020 entity includes various attributes, namely an @actionCode 33024, an ID 33028, an AssortmentTypeCode 33032, an OrdinalNumberValue 33036, a SalesOrganisationID 33080, a DistributionChannelCode 33084, a PurchasingOrganisationID 33088 and a PurchasingGroupID 33092. The AssortmentPlan 33020 entity includes various subordinate entities, namely a Description 33040, a ProductCategory 33048 and a Season 33064.

The @actionCode 33024 attribute is an ActionCode 33026 data type. The ActionCode is a coded representation of an instruction to the recipient of a message describing how to process a transmitted element. The ID 33028 attribute is a RetailPurchasingPlanID 33030 data type. RetailPurchasingPlanID is an identifier for a retail purchasing plan. The AssortmentTypeCode 33032 attribute is an AssortmentTypeCode 33034 data type. An AssortmentTypeCode is a coded representation of an assortment type.

The OrdinalNumberValue 33036 attribute is an OrdinalNumberValue 33038 data type. An OrdinalNumberValue is a number that indicates a position of an element in a linearly ordered set that is ordered according to particular factors. PurchasingPlan may be qualifier for GDT OrdinalNumberValue. The SalesOrganisationID 33080 attribute is an OrganisationalCentreID 33082 data type. An OrganisationalCentreID is a unique identifier of an organizational unit. The DistributionChannelCode 33084 attribute is a DistributionChannelCode 33086 data type. A DistributionChannelCode is a coded representation of a distribution channel. A distribution channel is a channel via which goods or services reach a customer.

The PurchasingOrganisationID 33088 attribute is an OrganisationalCentreID 33090 data type. An OrganisationalCentreID is a unique identifier of an organizational unit. The PurchasingGroupID 33092 attribute is a PurchasingGroupID 33094 data type. A PurchasingGroupID is a unique identifier for a group of buyers who are responsible for certain purchasing activities. The Description 33040 entity includes a Description 33044 attribute. The Description 33044 attribute is a SHORT_Description 33046 data type. SHORT_Description is a restriction on GDT Description to specify a uniform length for short descriptions.

The ProductCategory 33048 entity includes various attributes, namely an InternalID 33052, a ProductCategoryHierarchyID 33056 and a ProductCategoryHierarchyTypeCode 33060. The InternalID 33052 attribute is a ProductCategoryInternalID 33054 data type. A ProductCategoryInternalID is a proprietary identifier for a product category. The ProductCategoryHierarchyID 33056 attribute is a ProductCategoryHierarchyID 33058 data type. A ProductCategoryHierarchyID is a unique identifier for a product category hierarchy. The ProductCategoryHierarchyTypeCode 33060 attribute is a ProductCategoryHierarchyTypeCode 33062 data type. A ProductCategoryHierarchyUsageCode represents, in the form of a code, the usage of a product category hierarchy.

The Season 33064 entity includes various attributes, namely a YearID 33068, a CategoryCode 33072 and a PeriodTypeCode 33076. The YearID 33068 attribute is a SeasonYearID 33070 data type. A SeasonYearID is an identifier for a season year. The CategoryCode 33072 attribute is a SeasonCategoryCode 33074 data type. A SeasonCategoryCode is a coded representation of a season category. The PeriodTypeCode 33076 attribute is a SeasonPeriodTypeCode 33078 data type. A SeasonPeriodTypeCode is a coded representation of a period type within a season.

The Item 33096 package is an <MT>Itm 33100 data type. The Item 33096 package includes an Item 33098 entity. The Item 33096 package includes various packages, namely a SalesPriceSpecificationCalculation 33174, a ProductProcurementArrangement 33192, a ProductCategory 33214, a PrePackInformation 33232 and a Quantity 33306.

The Item 33098 entity includes various attributes, namely a CompleteIndicator 33102, a Date 33106, a FiscalYearVariantCode 33110, a FiscalYear 33114, a PostingPeriod 33118, a MaterialInternalID 33122, a MaterialTypeCode 33126, a MaterialMerchandiseTypeCode 33130, a ProductPropertyListID 33134, a ReferenceMaterial 33138, a BaseUnitofMeasure 33142, a SupplierID 33146, a SupplierName 33150, a DirectDeliveryIndicator 33154, a StoreConsignmentIndicator 33158 and a DistributionCenterConsignmentIndicator 33162. The Item 33098 entity includes a Description 33166 subordinate entity.

The CompleteIndicator 33102 attribute is an Indicator 33104 data type. Indicator is the representation of a situation that has two mutually exclusive Boolean values. Item is the secondary qualifier for the CompleteIndicator. The Date 33106 attribute is a Date 33108 data type. A Date is the specification of an exact day in the Gregorian calendar. The FiscalYearVariantCode 33110 attribute is a FiscalYearVariantCode 33112 data type. A FiscalYearVariantCode is a coded representation of a fiscal year variant. A fiscal year variant defines the first and last day of a fiscal year and its division into accounting periods.

The FiscalYear 33114 attribute is a FiscalYearID 33116 data type. A FiscalYearID is a unique identifier for a fiscal year. The PostingPeriod 33118 attribute is a Period 33120 data type. A PeriodRoleCode is a coded representation of the business semantics of a period. The MaterialInternalID 33122 attribute is a ProductInternalID 33124 data type. A ProductInternalID is a proprietary identifier for a product. A product is either a tangible or intangible good, and is a part of the business activities of a company. A product can be traded and contributes directly or indirectly to value added.

The MaterialTypeCode 33126 attribute is a MaterialTypeCode 33128 data type. A MaterialTypeCode is a coded representation of a material type. A MaterialType groups together materials with similar attributes. The MaterialMerchandiseTypeCode 33130 attribute is a MaterialMerchandiseTypeCode 33132 data type. A MaterialMerchandiseTypeCode is a coded representation of a merchandise type. Merchandise is materials which are bought and sold to customers or end consumers at a retail or wholesale level. Merchandising is the buying, presenting, and selling of merchandise.

The ProductPropertyListID 33134 attribute is a ProductPropertyListID 33136 data type. A ProductPropertyListID is an identifier of a property list of a product. The ReferenceMaterial 33138 attribute is a ProductInternalID 33140 data type. A ProductInternalID is a proprietary identifier for a product. The BaseUnitofMeasure 33142 attribute is a MeasureUnitCode 33144 data type. MeasureUnitCode is a coded representation of a non-monetary unit of measurement.

The SupplierID 33146 attribute is a PartyID 33148 data type. A PartyID is a unique identifier for a party. A Supplier is a business partner who offers or makes available materials or services. The SupplierName 33150 attribute is a LANGUAGEINDEPENDENT_MEDIUM_Name 33152 data type. LANGUAGEINDEPENDENT_MEDIUM_Name is language independent, so the attribute languageCode of the CDT Text may be omitted.

The DirectDeliveryIndicator 33154 attribute is an Indicator 33156 data type. An Indicator is a representation of a situation that has two mutually exclusive Boolean values. The StoreConsignmentIndicator 33158 attribute is an Indicator 33160 data type. An Indicator is a representation of a situation that has two mutually exclusive Boolean values. Store is the secondary qualifier for the ConsignmentIndicator. The DistributionCenterConsignmentIndicator 33162 attribute is an Indicator 33164 data type. An Indicator is a representation of a situation that has two mutually exclusive Boolean values. DistributionCenter is the secondary qualifier for the ConsignmentIndicator.

The Description 33166 entity includes a Description 33170 attribute. A description is a representation of properties of an object in natural language. The Description 33170 attribute is a SHORT_Description 33172 data type. SHORT_Description is a restriction on GDT Description to specify a uniform length for short descriptions.

The SalesPriceSpecificationCalculation 33174 package is an <MT>SlsPrSpecCalc 33178 data type. The SalesPriceSpecificationCalculation 33174 package includes a SalesPriceSpecificationCalculation 33176 entity. The SalesPriceSpecificationCalculation 33176 entity includes various attributes, namely a SalesOrganisationID 33180, a DistributionChannelCode 33184 and a SalesPrice 33188. The SalesOrganisationID 33180 attribute is an OrganisationalCentreID 33182 data type. An OrganisationalCentreID is a unique identifier of an organizational unit. The DistributionChannelCode 33184 attribute is a DistributionChannelCode 33186 data type. A DistributionChannelCode is a coded representation of a distribution channel. A distribution channel is a channel via which goods or services reach a customer.

The SalesPrice 33188 attribute is a Price 33190 data type. A Price is an exchange value, expressed in a monetary unit, of a product or a service in relation to a basic amount. The ProductProcurementArrangement 33192 package is an <MT>ProdProcmtArrgmt 33196 data type. The ProductProcurementArrangement 33192 package includes a ProductProcurementArrangement 33194 entity. The ProductProcurementArrangement 33194 entity includes various attributes, namely a PurchasingOrganisationID 33198, a PurchasingGroupID 33202, a PurchasingPrice 33206 and a SupplierID 33210.

The PurchasingOrganisationID 33198 attribute is an OrganisationalCentreID 33200 data type. An OrganisationalCentreID is a unique identifier of an organizational unit. The PurchasingGroupID 33202 attribute is a PurchasingGroupID 33204 data type. A PurchasingGroupID is a unique identifier for a group of buyers who are responsible for certain purchasing activities. The PurchasingPrice 33206 attribute is a Price 33208 data type. A Price is an exchange value, expressed in a monetary unit, of a product or a service in relation to a basic amount. The SupplierID 33210 attribute is a PartyID 33212 data type. A PartyID is a unique identifier for a party. A Supplier is a business partner who offers/makes available materials or services.

The ProductCategory 33214 package is an <MT>ItmProdCat 33218 data type. The ProductCategory 33214 package includes a ProductCategory 33216 entity. The ProductCategory 33216 entity includes various attributes, namely an InternalID 33220, a ProductCategoryHierarchyID 33224 and a ProductCategoryHierarchyTypeCode 33228. The InternalID 33220 attribute is a ProductCategoryInternalID 33222 data type. A ProductCategoryInternalID is a proprietary identifier for a product category. The ProductCategoryHierarchyID 33224 attribute is a ProductCategoryHierarchyID 33226 data type. A ProductCategoryHierarchyID is a unique identifier for a product category hierarchy. The ProductCategoryHierarchyTypeCode 33228 attribute is a ProductCategoryHierarchyTypeCode 33230 data type. A ProductCategoryHierarchyUsageCode represents, in the form of a code, usage of a product category hierarchy.

The PrePackInformation 33232 package is an <MT>Prepack 33236 data type. The PrePackInformation 33232 package includes a Prepack 33234 entity. The Prepack 33234 entity includes various attributes, namely a TotalQuantity 33238, an AssortmentID 33242 and a ProductSpecificationSplitID 33270. The Prepack 33234 entity includes various subordinate entities, namely a PropertyValuation 33246 and a Ratio 33274.

The TotalQuantity 33238 attribute is a Quantity 33240 data type. A Quantity is a non-monetary numerical specification of an amount in a unit of measurement. Prepack is the secondary qualifier for TotalQuantity qualifier. The AssortmentID 33242 attribute is an AssortmentID 33244 data type. An AssortmentID is a unique identifier of an assortment. The ProductSpecificationSplitID 33270 attribute is a ProductSpecificationSplitID 33272 data type. The ProductSpecificationSplitID is an identifier for a product specification split. A PropertyValuation is an assignment of one or more values to a simple or complex property. PropertyValuation includes one or more ValueGroups. A ValueGroup assigns a property value to a simple property. A ValueGroup assigns several ValueGroups (and thus their values) to a complex property. The PropertyValuation 33246 entity includes various subordinate entities, namely a PropertyReference 33250 and a ValueGroup 33258.

A PropertyReference is a unique reference to a property or a version of a property. The referenced property may have been defined in a property definition class. The PropertyReference 33250 entity includes an ID 33254 attribute. The ID 33254 attribute is a PropertyID 33256 data type. A PropertyID is a unique identifier for a property. The ValueGroup 33258 entity includes a PropertyValue 33262 subordinate entity. PropertyValue describes a value that can be assigned to a property. The PropertyValue 33262 entity includes a CodeSpecification 33266 attribute. The CodeSpecification 33266 attribute is a PropertyValueCodeSpecification 33268 data type. PropertyValueNameSpecification includes a specification of qualitative and human-readable values in property values.

The Ratio 33274 entity includes a QuotaValue 33278 attribute. The Ratio 33274 entity includes a PropertyValuation 33282 subordinate entity. The QuotaValue 33278 attribute is a QuotaValue 33280 data type. A QuotaValue is a share.

A PropertyValuation is an assignment of one or more values to a simple or complex property. PropertyValuation includes one or more ValueGroups. A ValueGroup assigns a property value to a simple property. A ValueGroup assigns several ValueGroups (and thus their values) to a complex property. The PropertyValuation 33282 entity includes various subordinate entities, namely a PropertyReference 33286 and a ValueGroup 33294. A PropertyReference is a unique reference to a property or a version of a property. The referenced property may have been defined in a property definition class. The PropertyReference 33286 entity includes an ID 33290 attribute.

The ID 33290 attribute is a PropertyID 33292 data type. A PropertyID is a unique identifier for a property. The ValueGroup 33294 entity includes a PropertyValue 33298 subordinate entity. PropertyValue describes a value that can be assigned to a property. The PropertyValue 33298 entity includes a CodeSpecification 33302 attribute.

The CodeSpecification 33302 attribute is a PropertyValueCodeSpecification 33304 data type. PropertyValueNameSpecification includes a specification of qualitative and human-readable values in property values. The Quantity 33306 package is an <MT>Qty 33310 data type. The Quantity 33306 package includes a Quantity 33308 entity. The Quantity 33308 entity includes various attributes, namely an ID 33312, a ParentID 33316, an AssortmentID 33320, a ReallocationRequiredIndicator 33324 and a Quantity 33352. The Quantity 33308 entity includes a PropertyValuation 33328 subordinate entity.

The ID 33312 attribute is a RetailPurchasingPlanItemQuantityID 33314 data type. TheRetailPurchasingPlanItemQuantityID is a unique identifier for a quantity of an item in a retail purchasing plan. The ParentID 33316 attribute is a RetailPurchasingPlanItemQuantityID 33318 data type. TheRetailPurchasingPlanItemQuantityID is a unique identifier for the quantity of an item in a retail purchasing plan. The AssortmentID 33320 attribute is an AssortmentID 33322 data type. An AssortmentID is a unique identifier of an assortment.

The ReallocationRequiredIndicator 33324 attribute is an Indicator 33326 data type. An Indicator is a representation of a situation that has two mutually exclusive Boolean values. Reallocation is the secondary qualifier for RequiredIndicator qualifier. The Quantity 33352 attribute is a Quantity 33354 data type. A Quantity is a non-monetary numerical specification of an amount in a unit of measurement.

A PropertyValuation is an assignment of one or more values to a simple or complex property. PropertyValuation includes one or more ValueGroups. A ValueGroup assigns a property value to a simple property. A ValueGroup assigns several ValueGroups (and thus their values) to a complex property. The PropertyValuation 33328 entity includes various subordinate entities, namely a PropertyReference 33332 and a ValueGroup 33340. A PropertyReference is a unique reference to a property or a version of a property. The referenced property may have been defined in a property definition class. The PropertyReference 33332 entity includes an ID 33336 attribute.

The ID 33336 attribute is a PropertyID 33338 data type. A PropertyID is a unique identifier for a property. A PropertyValuationValueGroup assigns a property value to a simple property or it assigns several PropertyValuationValueGroups, (and thus their values) to a complex property. The ValueGroup 33340 entity includes a PropertyValue 33344 subordinate entity. PropertyValue describes a value that can be assigned to a property. The PropertyValue 33344 entity includes a CodeSpecification 33348 attribute. The CodeSpecification 33348 attribute is a PropertyValueCodeSpecification 33350 data type. PropertyValueIdentifierSpecification includes unique identifications of objects within an identification scheme that are managed by an agency in property values.

The TargetSales 33356 package is an <MT>TgtSls 33360 data type. The TargetSales 33356 package includes a TargetSales 33358 entity. The TargetSales 33358 entity includes various attributes, namely an AssortmentID 33362, a ReallocationRequiredIndicator 33366, a ProcurementCostAmount 33370, a ProcurementNetCostAmount 33374, a RetailNetSalesVolumeAmount 33378, a RetailSalesVolumeAmount 33382 and a Quantity 33386.

The AssortmentID 33362 attribute is an AssortmentID 33364 data type. An AssortmentID is a unique identifier of an assortment. The ReallocationRequiredIndicator 33366 attribute is an Indicator 33368 data type. An Indicator is a representation of a situation that has two mutually exclusive Boolean values. Reallocation is the secondary qualifier for RequiredIndicator qualifier. The ProcurementCostAmount 33370 attribute is an Amount 33372 data type. An Amount is an amount with a corresponding currency unit. Cost is the Primary qualifier for the Amount and the Procurement is the Secondary qualifier. The ProcurementNetCostAmount 33374 attribute is an Amount 33376 data type. An Amount is an amount with a corresponding currency unit. Cost is the Primary qualifier for the Amount and the ProcurementNet is the Secondary qualifier.

The RetailNetSalesVolumeAmount 33378 attribute is an Amount 33380 data type. An Amount is an amount with a corresponding currency unit. SalesVolume is the Primary qualifier for the Amount and the RetailNet is the Secondary qualifier. The RetailSalesVolumeAmount 33382 attribute is an Amount 33384 data type. An Amount is an amount with a corresponding currency unit. SalesVolume is the Primary qualifier for the Amount and the Retail is the Secondary qualifier. The Quantity 33386 attribute is a Quantity 33388 data type. A Quantity is a non-monetary numerical specification of an amount in a unit of measurement.

MerchandiseAndAssortmentPlanningAssortment Interfaces

A Merchandise and Assortment Planning Assortment is a grouping of materials which may be ordered by a store or by a wholesaler. The assignments of materials may be time dependent. Merchandise and Assortment Planning Assortments can be assigned (also time dependent) to stores or business partners, for example, of type customer. The combinations of materials and sites (which may be grouped in assortments) are used to check whether a material may be ordered by a store (or, for example, by a customer). The MerchandiseAndAssortmentPlanningAssortment interface performs various operations, namely a MerchandiseAndAssortmentPlanningAssortmentERPRequest_In, a MerchandiseAndAssortmentPlanningAssortmentERPStoreLayoutElementRequest_Out, and a MerchandiseAndAssortmentPlanningAssortmentERPStoreLayoutElementByIDQueryResponse_In.

The MerchandiseAndAssortmentPlanningAssortmentERPRequest_In operation is a request from Shelf Optimization Solution (3rd party) to Assortment Planning to maintain a Merchandise and Assortment Planning Assortment. This inbound operation is used to create or change a Merchandise And Assortment Planning Assortment from a Third party Shelf Optimization Solution in Assortment Planning. The MerchandiseAndAssortmentPlanningAssortmentERPRequest_In operation includes a MerchandiseAndAssortmentPlanningAssortmentERPRequest message type. The structure of the MerchandiseAndAssortmentPlanningAssortmentERPRequest message type is specified by a MerchandiseAndAssortmentPlanningAssortmentERPRequestMessage message data type.

The MerchandiseAndAssortmentPlanningAssortmentERPStoreLayoutElementRequest_Out operation is a request sent from Assortment Planning to Shelf Optimization Solution (3rd party) with Merchandise and Assortment Planning Assortment and Store Layout Element information. This outbound operation is used to send information about Merchandise And Assortment Planning Assortment and Store Layout Element from the Assortment Planning to a third party Shelf Optimization Solution. The MerchandiseAndAssortmentPlanningAssortmentERPStoreLayoutElementRequest_Out operation includes a MerchandiseAndAssortmentPlanningAssortmentERPStoreLayoutElementRequest message type. The structure of the MerchandiseAndAssortmentPlanningAssortmentERPStoreLayoutElementRequest message type is specified by a MerchandiseAndAssortmentPlanningAssortmentERPStoreLayoutElementRequestMessage message data type.

The MerchandiseAndAssortmentPlanningAssortmentERPStoreLayoutElementByIDQueryResponse_In operation can query the Merchandise And Assortment Planning Assortment based on an Assortment ID and Store Layout Element version number/validity period from a third party shelf optimization solution. Merchandise And Assortment Planning may return information about Merchandise And Assortment Planning Assortment and Store Layout Element from the Assortment Planning to a third party Shelf Optimization Solution. The MerchandiseAndAssortmentPlanningAssortmentERPStoreLayoutElementByIDQueryResponse_In operation includes various message types, namely a MerchandiseAndAssortmentPlanningAssortmentERPStoreLayoutElementByIDQuery_sync and a MerchandiseAndAssortmentPlanningAssortmentERPStoreLayoutElementByIDResponse_sync. The structure of the MerchandiseAndAssortmentPlanningAssortmentERPStoreLayoutElementByIDQuery_sync message type is specified by a MerchandiseAndAssortmentPlanningAssortmentERPStoreLayoutElementByIDQueryMessage_sync message data type. The structure of the MerchandiseAndAssortmentPlanningAssortmentERPStoreLayoutElementByIDResponse_sync message type is specified by a MerchandiseAndAssortmentPlanningAssortmentERPStoreLayoutElementByIDResponseMessage_sync message data type.

Figure 34:
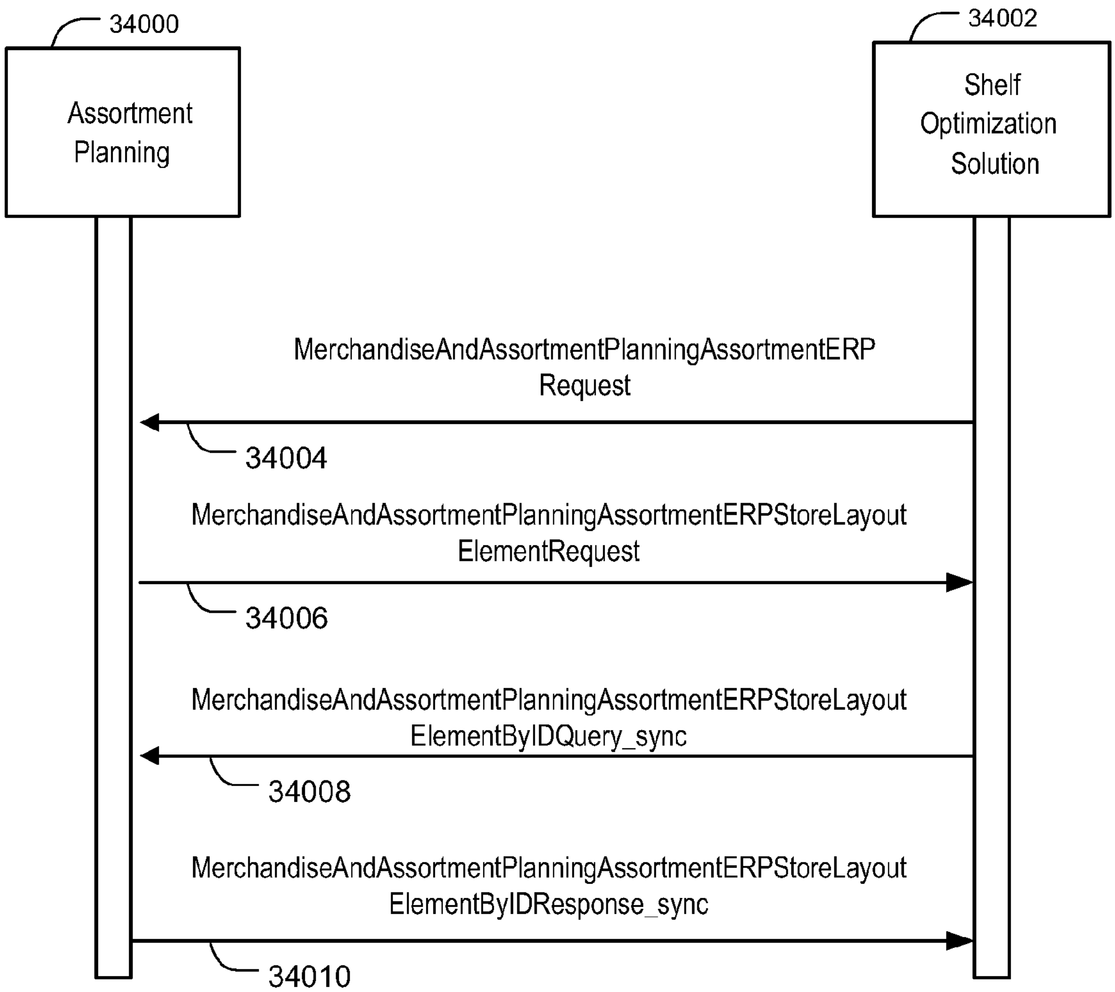
FIG. 34 illustrates an exemplary MerchandiseAndAssortmentPlanningAssortment Message Choreography.

The message choreography of FIG. 34 describes a possible logical sequence of messages that can be used to realize a Merchandise and Assortment Planning Assortment business scenario. A "Shelf Optimization Solution" system 34002 can request merchandise and assortment planning assortment information from an "Assortment Planning" system 34000 using a MerchandiseAndAssortmentPlanningAssortmentERPRequest message 34004 as shown, for example, in FIG. 34.

The "Assortment Planning" system 34000 can request merchandise and assortment planning assortment information from the "Shelf Optimization Solution" system 34002 using a MerchandiseAndAssortmentPlanningAssortmentERPStoreLayoutElementRequest message 34006 as shown, for example, in FIG. 34.

The "Shelf Optimization Solution" system 34002 can query merchandise and assortment planning assortment ERP store layout information elements by ID from the "Assortment Planning" system 34000 using a MerchandiseAndAssortmentPlanningAssortmentERPStoreLayoutElementByIDQuery_sync message 34008 as shown, for example, in FIG. 34. The "Assortment Planning" system 34000 can respond to the query using a MerchandiseAndAssortmentPlanningAssortmentERPStoreLayoutElementByIDResponse_sync 34010 as shown, for example, in FIG. 34.

Figure 35:
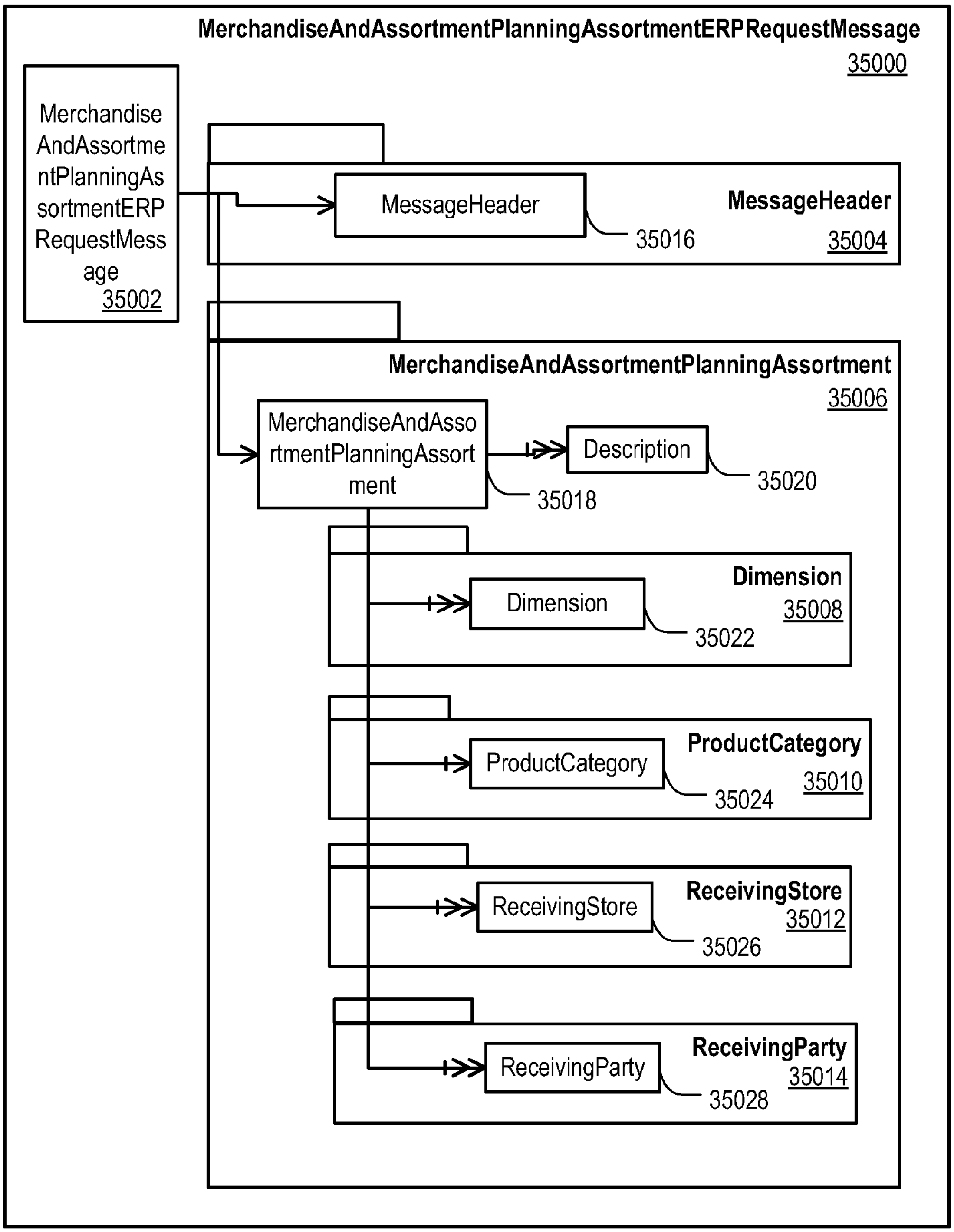
FIG. 35 illustrates an exemplary MerchandiseAndAssortmentPlanningAssortmentERPRequestMessage Message Data Type.

FIG. 35 illustrates one example logical configuration of MerchandiseAndAssortmentPlanningAssortmentERPRequestMessage message 35000. Specifically, this figure depicts the arrangement and hierarchy of various components such as one or more levels of packages, entities, and datatypes, shown here as 35000 through 35028. As described above, packages may be used to represent hierarchy levels. Entities are discrete business elements that are used during a business transaction. Data types are used to type object entities and interfaces with a structure. For example, MerchandiseAndAssortmentPlanningAssortmentERPRequestMessage message 35000 includes, among other things, MerchandiseAndAssortmentPlanningAssortment package 35006. Accordingly, heterogeneous applications may communicate using this consistent message configured as such.

Figures 1, 36:
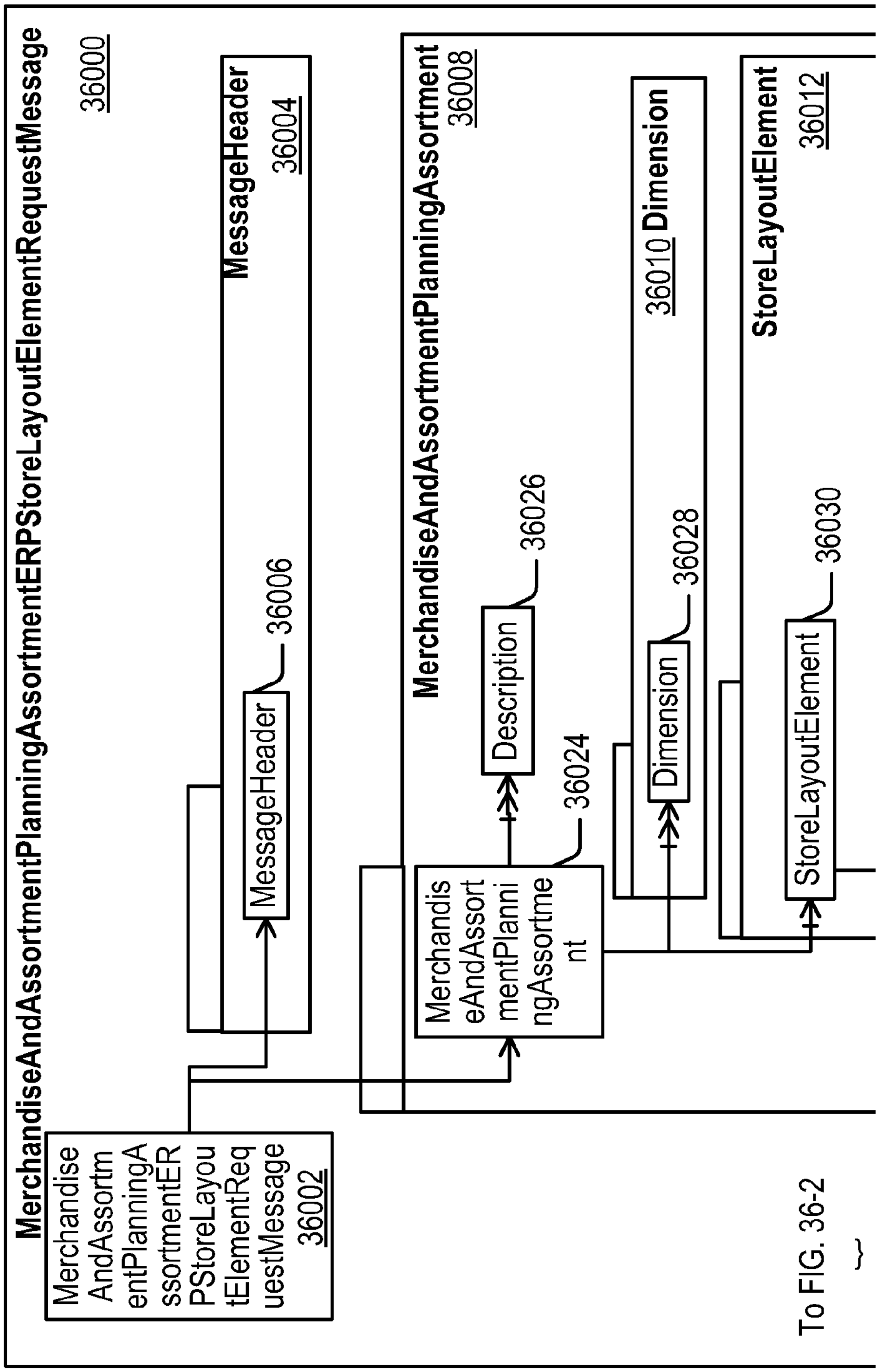
Figures 2, 36:
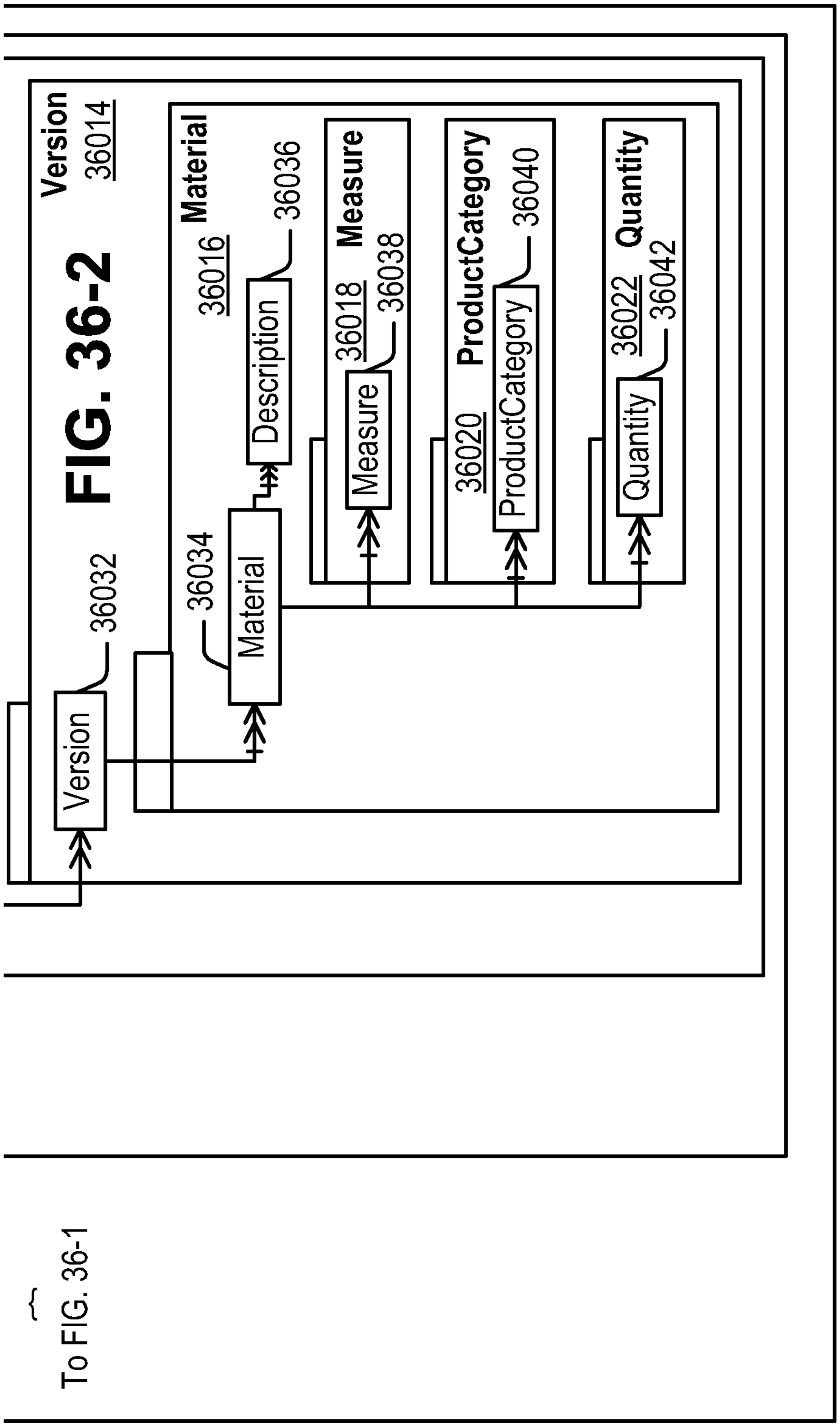

Additionally, FIGS. 36-1 through 36-2 illustrate one example logical configuration of MerchandiseAndAssortmentPlanningAssortmentERPStoreLayoutElementRequestMessage message 36000. Specifically, these figures depict the arrangement and hierarchy of various components such as one or more levels of packages, entities, and datatypes, shown here as 36000 through 36042. As described above, packages may be used to represent hierarchy levels. Entities are discrete business elements that are used during a business transaction. Data types are used to type object entities and interfaces with a structure. For example, MerchandiseAndAssortmentPlanningAssortmentERPStoreLayoutElementRequestMessage message 36000 includes, among other things, MerchandiseAndAssortmentPlanningAssortment package 36008. Accordingly, heterogeneous applications may communicate using this consistent message configured as such.

Figure 37:
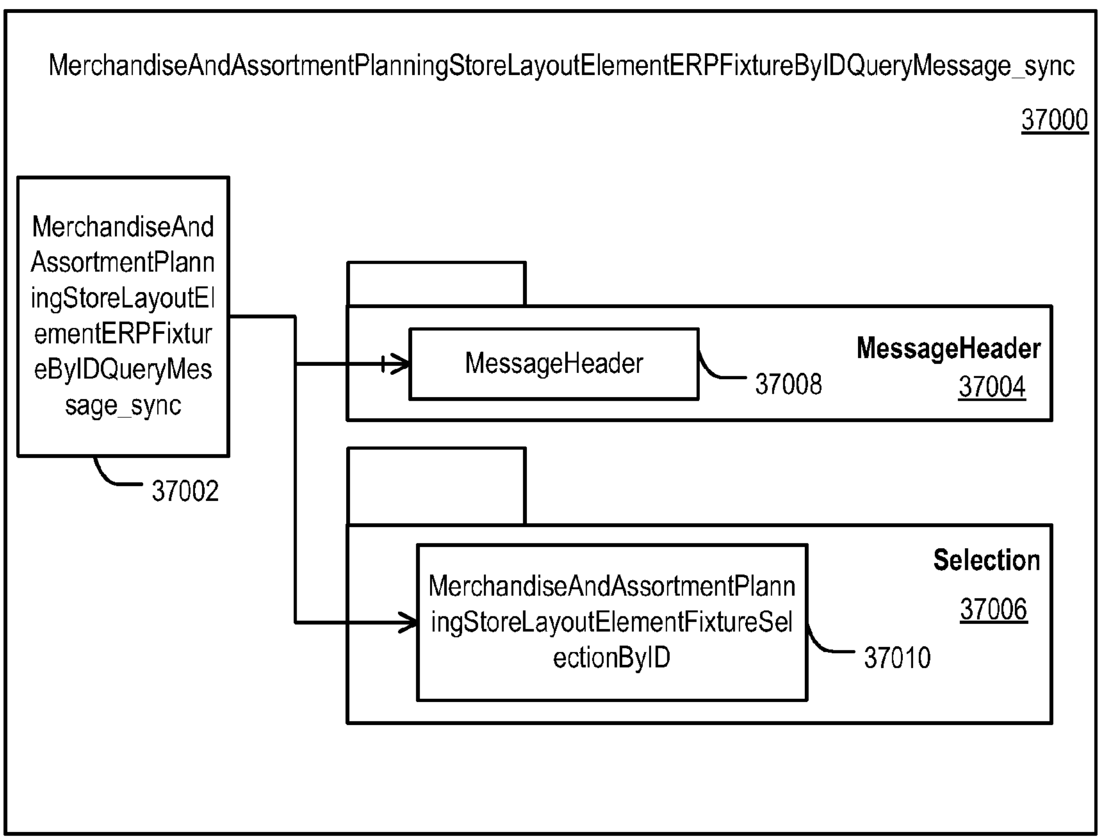
FIG. 37 illustrates an exemplary MerchandiseAndAssortmentPlanningAssortmentERPStoreLayoutElementByIDQueryMessage_sync Message Data Type.

Additionally, FIG. 37 illustrates one example logical configuration of MerchandiseAndAssortmentPlanningStoreLayoutElementERPFixtureByIDQueryMessage_sync message 37000. Specifically, this figure depicts the arrangement and hierarchy of various components such as one or more levels of packages, entities, and datatypes, shown here as 37000 through 37010. As described above, packages may be used to represent hierarchy levels. Entities are discrete business elements that are used during a business transaction. Data types are used to type object entities and interfaces with a structure. For example, MerchandiseAndAssortmentPlanningStoreLayoutElementERPFixtureByIDQueryMessage_sync message 37000 includes, among other things, Selection package 37006. Accordingly, heterogeneous applications may communicate using this consistent message configured as such.

Figures 1, 38:
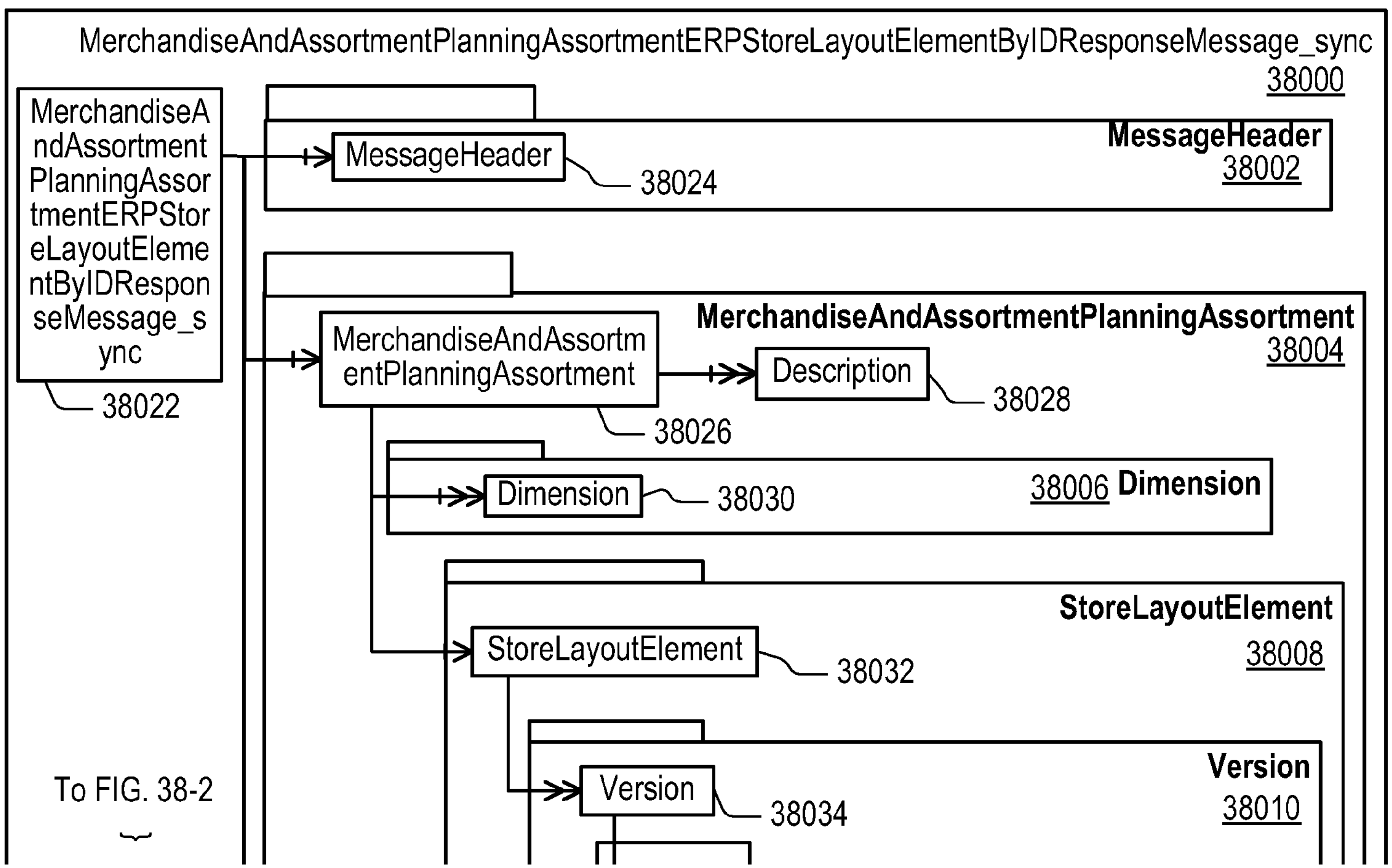
Figures 2, 38:
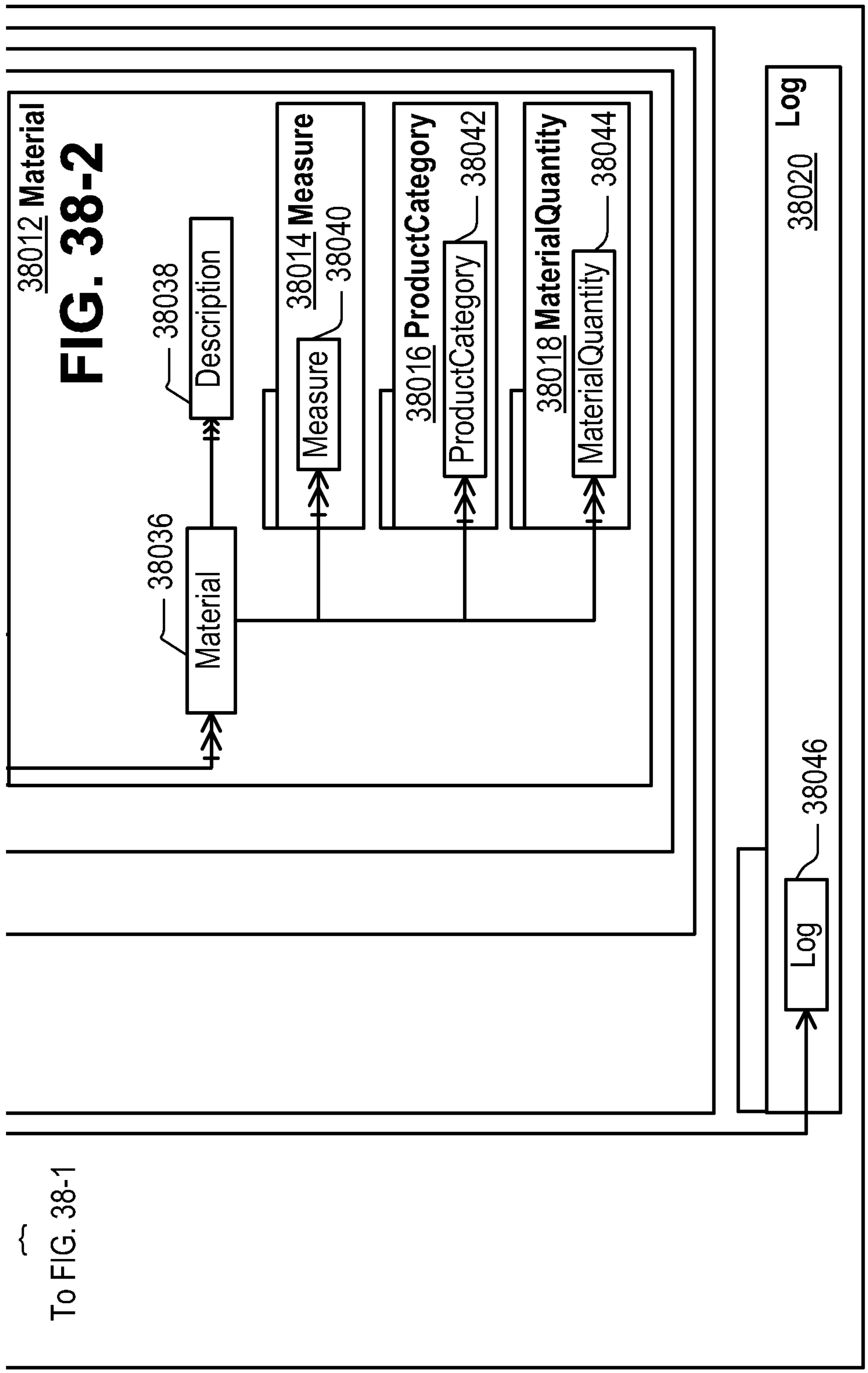

Additionally, FIGS. 38-1 through 38-2 illustrate one example logical configuration of MerchandiseAndAssortmentPlanningAssortmentERPStoreLayoutElementByIDResponseMessage_sync message 38000. Specifically, these figures depict the arrangement and hierarchy of various components such as one or more levels of packages, entities, and datatypes, shown here as 38000 through 38046. As described above, packages may be used to represent hierarchy levels. Entities are discrete business elements that are used during a business transaction. Data types are used to type object entities and interfaces with a structure. For example, MerchandiseAndAssortmentPlanningAssortmentERPStoreLayoutElementByIDResponseMessage_sync message 38000 includes, among other things, StoreLayoutElement package 38008. Accordingly, heterogeneous applications may communicate using this consistent message configured as such.

FIGS. 39-1 through 39-11 illustrate one example logical configuration of MerchandiseAndAssortmentPlanningAssortmentMessage element structure 39000. Specifically, these figures depict the arrangement and hierarchy of various components such as one or more levels of packages, entities, and datatypes, shown here as 39000 through 39238. As described above, packages may be used to represent hierarchy levels. Entities are discrete business elements that are used during a business transaction. Data types are used to type object entities and interfaces with a structure. For example, MerchandiseAndAssortmentPlanningAssortmentMessage element structure 39000 includes, among other things, MessageHeader 39006. Accordingly, heterogeneous applications may communicate using this consistent message configured as such.

Additionally, FIGS. 40-1 through 40-5 illustrate one example logical configuration of MerchandiseAndAssortmentPlanningAssortmentERPRequestMessage element structure 40000. Specifically, these figures depict the arrangement and hierarchy of various components such as one or more levels of packages, entities, and datatypes, shown here as 40000 through 40124. As described above, packages may be used to represent hierarchy levels. Entities are discrete business elements that are used during a business transaction. Data types are used to type object entities and interfaces with a structure. For example, MerchandiseAndAssortmentPlanningAssortmentERPRequestMessage element structure 40000 includes, among other things, MessageHeader 40006. Accordingly, heterogeneous applications may communicate using this consistent message configured as such.

Additionally, FIGS. 41-1 through 41-8 illustrate one example logical configuration of MerchandiseAndAssortmentPlanningAssortmentERPStoreLayoutElementRequestMessage element structure 41000. Specifically, these figures depict the arrangement and hierarchy of various components such as one or more levels of packages, entities, and datatypes, shown here as 41000 through 41174. As described above, packages may be used to represent hierarchy levels. Entities are discrete business elements that are used during a business transaction. Data types are used to type object entities and interfaces with a structure. For example, MerchandiseAndAssortmentPlanningAssortmentERPStoreLayoutElementRequestMessage element structure 41000 includes, among other things, MessageHeader 41006. Accordingly, heterogeneous applications may communicate using this consistent message configured as such.

Additionally, FIGS. 42-1 through 42-2 illustrate one example logical configuration of MerchandiseAndAssortmentPlanningAssortmentERPStoreLayoutElementByIDQueryMessage_sync element structure 42000. Specifically, these figures depict the arrangement and hierarchy of various components such as one or more levels of packages, entities, and datatypes, shown here as 42000 through 42036. As described above, packages may be used to represent hierarchy levels. Entities are discrete business elements that are used during a business transaction. Data types are used to type object entities and interfaces with a structure. For example, MerchandiseAndAssortmentPlanningAssortmentERPStoreLayoutElementByIDQueryMessage_sync element structure 42000 includes, among other things, MessageHeader 42006. Accordingly, heterogeneous applications may communicate using this consistent message configured as such.

Additionally, FIGS. 43-1 through 43-8 illustrate one example logical configuration of MerchandiseAndAssortmentPlanningAssortmentERP-StoreLayoutElementByIDResponseMessage_sync element structure 43000. Specifically, these figures depict the arrangement and hierarchy of various components such as one or more levels of packages, entities, and datatypes, shown here as 43000 through 43180. As described above, packages may be used to represent hierarchy levels. Entities are discrete business elements that are used during a business transaction. Data types are used to type object entities and interfaces with a structure. For example, MerchandiseAndAssortmentPlanningAssortmentERPStoreLayoutElementByIDResponseMessage_sync element structure 43000 includes, among other things, MessageHeader 43006. Accordingly, heterogeneous applications may communicate using this consistent message configured as such.

In further detail, FIGS. 39-1 through 39-11 illustrate an example configuration of an Element Structure that includes a MerchandiseAndAssortmentPlanningAssortmentMessage 39000 package. The MerchandiseAndAssortmentPlanningAssortmentMessage 39000 package includes a MerchandiseAndAssortmentPlanningAssortmentMessage 39002 entity. The MerchandiseAndAssortmentPlanningAssortmentMessage 39000 package includes various packages, namely a MessageHeader 39004 and a MerchandiseAndAssortmentPlanningAssortment 39018.

The MessageHeader 39004 package is a BusinessDocumentMessageHeader 39008 data type. The MessageHeader 39004 package includes a MessageHeader 39006 entity. A BusinessDocumentMessageHeader includes business information from a perspective of the sender application for identifying processing of a business document instance within a technical message (if applicable, with a reference to a previous instance of a business document within a previous technical message). BusinessDocumentMessageHeader may also include information about the sender, and information about the receiver. The MessageHeader 39006 entity includes various attributes, namely an ID 39010 and a CreationDateTime 39014.

The ID 39010 attribute is a BusinessDocumentMessageID 39012 data type. A BusinessDocumentMessageID is a unique identifier of a business document in a technical message that is issued by a sender business application. The CreationDateTime 39014 attribute is a DateTime 39016 data type. The MerchandiseAndAssortmentPlanningAssortment 39018 package is an <MT>MrchdsAndAsstmtPlngAsstmt 39022 data type. The MerchandiseAndAssortmentPlanningAssortment 39018 package includes a MerchandiseAndAssortmentPlanningAssortment 39020 entity. The MerchandiseAndAssortmentPlanningAssortment 39018 package includes various packages, namely a Dimension 39048, a ProductCategory 39070, a ReceivingStore 39088, a ReceivingParty 39106 and a StoreLayoutElement 39124.

The MerchandiseAndAssortmentPlanningAssortment 39020 entity includes various attributes, namely an @actionCode 39024, an ID 39028, a TypeCode 39032 and a UsedSpaceQuantity 39036. The MerchandiseAndAssortmentPlanningAssortment 39020 entity includes a Description 39040 subordinate entity. The @actionCode 39024 attribute is an ActionCode 39026 data type. The ActionCode is a coded representation of an instruction to the recipient of a message describing how to process a transmitted element.

The ID 39028 attribute is an AssortmentID 39030 data type. An AssortmentID is a unique identifier of an assortment. The TypeCode 39032 attribute is an AssortmentTypeCode 39034 data type. An AssortmentTypeCode is a coded representation of an assortment type. The UsedSpaceQuantity 39036 attribute is a Quantity 39038 data type. A Quantity is a non-monetary numerical specification of an amount in a unit of measurement. SpaceQuantity is the primary qualifier for GDT Quantity and Used is the secondary qualifier. The Description 39040 entity includes a Description 39044 attribute. The Description 39044 attribute is a SHORT_Description 39046 data type. SHORT_Description is a restriction on GDT Description to specify a uniform length for short descriptions.

The Dimension 39048 package is an <MT>Dimn 39052 data type. The Dimension 39048 package includes a Dimension 39050 entity. The Dimension 39050 entity includes various attributes, namely an OrdinalNumberValue 39054 and a Description 39066. The Dimension 39050 entity includes a MerchandiseAndAssortmentPlanningAssortmentPropertyValue 39058 subordinate entity. The OrdinalNumberValue 39054 attribute is an OrdinalNumberValue 39056 data type. An OrdinalNumberValue is a number that indicates a position of an element in a linearly ordered set that is ordered according to particular factors. Dimension is a qualifier for GDT OrdinalNumberValue.

The Description 39066 attribute is a SHORT_Description 39068 data type. SHORT_Description is a restriction on GDT Description to specify a uniform length for short descriptions. PropertyValue describes a value that can be assigned to a property. The MerchandiseAndAssortmentPlanningAssortmentPropertyValue 39058 entity includes a CodeSpecification 39062 attribute. The CodeSpecification 39062 attribute is a PropertyValueCodeSpecification 39064 data type. PropertyValueCodeSpecification includes character strings of letters, numbers, special characters (except escape sequences), and symbols representing a definitive value, a method, or a property description in an abbreviated or language-independent form.

The ProductCategory 39070 package is an <MT>ProdCat 39074 data type. The ProductCategory 39070 package includes a ProductCategory 39072 entity. The ProductCategory 39072 entity includes various attributes, namely an InternalID 39076, a ProductCategoryHierarchyID 39080 and a ProductCategoryHierarchyTypeCode 39084. The InternalID 39076 attribute is a ProductCategoryInternalID 39078 data type. A ProductCategoryInternalID is a proprietary identifier for a product category. The ProductCategoryHierarchyID 39080 attribute is a ProductCategoryHierarchyID 39082 data type. A ProductCategoryHierarchyID is a unique identifier for a product category hierarchy.

The ProductCategoryHierarchyTypeCode 39084 attribute is a ProductCategoryHierarchyTypeCode 39086 data type. A ProductCategoryHierarchyUsageCode represents, in the form of a code, the usage of a product category hierarchy. The ReceivingStore 39088 package is an <MT>RcvgStore 39092 data type. The ReceivingStore 39088 package includes a ReceivingStore 39090 entity.

The ReceivingStore 39090 entity includes various attributes, namely an @actionCode 39094, a StoreInternalID 39098 and a ValidityPeriod 39102. The @actionCode 39094 attribute is an ActionCode 39096 data type. The ActionCode is a coded representation of an instruction to the recipient of a message describing how to process a transmitted element.

The StoreInternalID 39098 attribute is a StoreInternalID 39100 data type. A StoreInternalID is a proprietary identifier for a store.

The ValidityPeriod 39102 attribute is a DatePeriod 39104 data type. A DatePeriod is a period that is defined by two points in time. These points in time are expressed in calendar days. The date period is determined by a start time point and an end time, duration and a start time point, or duration with an end time point. The ReceivingParty 39106 package is an <MT>RcvgPty 39110 data type. The ReceivingParty 39106 package includes a ReceivingParty 39108 entity.

The ReceivingParty 39108 entity includes various attributes, namely an @actionCode 39112, a CustomerID 39116 and a ValidityPeriod 39120. The @actionCode 39112 attribute is an ActionCode 39114 data type. The ActionCode is a coded representation of an instruction to the recipient of a message describing how to process a transmitted element. The CustomerID 39116 attribute is a CustomerID 39118 data type. A CustomerID is a unique identifier for a Customer. The ValidityPeriod 39120 attribute is a DatePeriod 39122 data type. A DatePeriod is a period that is defined by two points in time. These points in time are expressed in calendar days. The date period is determined by a start time point and an end time, duration and a start time point, or duration with an end time point.

The StoreLayoutElement 39124 package is an <MT>StoreLaytElmnt 39128 data type. The StoreLayoutElement 39124 package includes a StoreLayoutElement 39126 entity. The StoreLayoutElement 39124 package includes a Version 39134 package. The StoreLayoutElement 39126 entity includes an ID 39130 attribute. The ID 39130 attribute is a StoreLayoutElementID 39132 data type. A StoreLayoutElementID is an identifier of a collective presentation of materials in a store layout.

The Version 39134 package is an <MT>Vers 39138 data type. The Version 39134 package includes a Version 39136 entity. The Version 39134 package includes a Material 39148 package. The Version 39136 entity includes various attributes, namely an ID 39140 and a ValidityPeriod 39144.

The ID 39140 attribute is a VersionID 39142 data type. A VersionID is a unique identifier for a version. A version is a differentiation of objects of an object type in accordance with the sequence in which they were created. In some implementations, only integer numbers are allowed. The ValidityPeriod 39144 attribute is a DatePeriod 39146 data type. A DatePeriod is a period that is defined by two points in time. These points in time are expressed in calendar days. The date period is determined by a start time point and an end time, duration and a start time point, or duration with an end time point.

The Material 39148 package is an <MT>Matl 39152 data type. The Material 39148 package includes a Material 39150 entity. The Material 39148 package includes various packages, namely a Measure 39194, a ProductCategory 39212 and a Quantity 39230.

The Material 39150 entity includes various attributes, namely an InternalID 39154, an OrdinalNumberValue 39158, a StandardID 39162, a MerchandiseTypeCode 39166, a ShelfOptimizationIndexValue 39170, a StoreFixtureOrdinalNumberValue 39174, a SalesPrice 39178 and a PurchasingPrice 39182. The Material 39150 entity includes a Description 39186 subordinate entity.

The InternalID 39154 attribute is a ProductInternalID 39156 data type. A ProductInternalID is a proprietary identifier for a product. A product is either a tangible or intangible good, and is a part of the business activities of a company. A product can be traded and contributes directly or indirectly to value added. The OrdinalNumberValue 39158 attribute is an OrdinalNumberValue 39160 data type. An OrdinalNumberValue is a number that indicates a position of an element in a linearly ordered set that is ordered according to particular factors. Material may be a qualifier for GDT OrdinalNumberValue.

The StandardID 39162 attribute is a ProductStandardID 39164 data type. A ProductStandardID is a standardized identifier for a product, and the identification scheme is managed by an agency from a code list. The MerchandiseTypeCode 39166 attribute is a MaterialMerchandiseTypeCode 39168 data type. A MaterialMerchandiseTypeCode is a coded representation of a merchandise type. Merchandise is materials which are bought and sold to customers or end consumers at a retail or wholesale level. Merchandising is the buying, presenting, and selling of merchandise.

The ShelfOptimizationIndexValue 39170 attribute is a MaterialShelfOptimizationIndexValue 39172 data type. A MaterialShelfOptimizationIndexValue is a value-based representation of a material index used by a shelf optimization solution. The StoreFixtureOrdinalNumberValue 39174 attribute is an OrdinalNumberValue 39176 data type. An OrdinalNumberValue is a number that indicates a position of an element in a linearly ordered set that is ordered according to particular factors.

The SalesPrice 39178 attribute is a Price 39180 data type. A Price is an exchange value, expressed in a monetary unit, of a product or a service in relation to a basic amount. The PurchasingPrice 39182 attribute is a Price 39184 data type. A Price is the exchange value, expressed in a monetary unit, of a product or a service in relation to a basic amount. The Description 39186 entity includes a Description 39190 attribute. The Description 39190 attribute is a SHORT_Description 39192 data type. SHORT_Description is a restriction on GDT Description to specify a uniform length for short descriptions.

The Measure 39194 package is an <MT>Msr 39198 data type. The Measure 39194 package includes a Measure 39196 entity. The Measure 39196 entity includes various attributes, namely a MeasureUnitCode 39200, a Quantity 39204 and a QuantityTypeCode 39208.

The MeasureUnitCode 39200 attribute is a MeasureUnitCode 39202 data type. MeasureUnitCode is a coded representation of a non-monetary unit of measurement. The Quantity 39204 attribute is a Quantity 39206 data type. A Quantity is a non-monetary numerical specification of an amount in a unit of measurement. The QuantityTypeCode 39208 attribute is a QuantityTypeCode 39210 data type. A QuantityTypeCode is a coded representation of a type of quantity that is based on a measurable characteristic of an object or physical phenomenon.

The ProductCategory 39212 package is an <MT>MatlProdCat 39216 data type. The ProductCategory 39212 package includes a ProductCategory 39214 entity. The ProductCategory 39214 entity includes various attributes, namely an InternalID 39218, a ProductCategoryHierarchyID 39222 and a ProductCategoryHierarchyTypeCode 39226. The InternalID 39218 attribute is a ProductCategoryInternalID 39220 data type. A ProductCategoryInternalID is a proprietary identifier for a product category. The ProductCategoryHierarchyID 39222 attribute is a ProductCategoryHierarchyID 39224 data type. A ProductCategoryHierarchyID is a unique identifier for a product category hierarchy. The ProductCategoryHierarchyTypeCode 39226 attribute is a ProductCategoryHierarchyTypeCode 39228 data type. A ProductCategoryHierarchyUsageCode represents, in the form of a code, the usage of a product category hierarchy.

The Quantity 39230 package is an <MT>MatlQty 39234 data type. The Quantity 39230 package includes a Quantity 39232 entity. The Quantity 39232 entity includes a StoreFixtureFacingQuantity 39236 attribute. The StoreFixtureFacingQuantity 39236 attribute is a Quantity 39238 data type. A Quantity is a non-monetary numerical specification of an amount in a unit of measurement. Facing is a primary qualifier for the GDT Quantity.

In further detail, FIGS. 40-1 through 40-5 illustrate an example configuration of an Element Structure that includes a MerchandiseAndAssortmentPlanningAssortmentERPRequestMessage 40000 package. The MerchandiseAndAssortmentPlanningAssortmentERPRequestMessage 40000 package includes a MerchandiseAndAssortmentPlanningAssortmentERPRequestMessage 40002 entity. The MerchandiseAndAssortmentPlanningAssortmentERPRequestMessage 40000 package includes various packages, namely a MessageHeader 40004 and a MerchandiseAndAssortmentPlanningAssortment 40020.

The MessageHeader 40004 package includes a MessageHeader 40006 entity. The MessageHeader 40006 entity has a cardinality of 1 40008 meaning that for each instance of the MessageHeader 40004 package there is one MessageHeader 40006 entity. The MessageHeader 40006 entity includes various attributes, namely an ID 40010 and a CreationDateTime 40014. The ID 40010 attribute has a cardinality of 1 40012 meaning that for each instance of the MessageHeader 40006 entity there is one ID 40010 attribute. The CreationDateTime 40014 attribute has a cardinality of 1 40016 meaning that for each instance of the MessageHeader 40006 entity there is one CreationDateTime 40014 attribute. In some implementations, the MessageHeader 40006 entity can include other attributes having a cardinality of 0 . . . 1 40018.

The MerchandiseAndAssortmentPlanningAssortment 40020 package includes a MerchandiseAndAssortmentPlanningAssortment 40022 entity. The MerchandiseAndAssortmentPlanningAssortment 40020 package includes various packages, namely a Dimension 40050, a ProductCategory 40072, a ReceivingStore 40090 and a ReceivingParty 40108.

The MerchandiseAndAssortmentPlanningAssortment 40022 entity has a cardinality of 1 40024 meaning that for each instance of the MerchandiseAndAssortmentPlanningAssortment 40020 package there is one MerchandiseAndAssortmentPlanningAssortment 40022 entity. The MerchandiseAndAssortmentPlanningAssortment 40022 entity includes various attributes, namely an @actionCode 40026, an ID 40030, a TypeCode 40034 and a UsedSpaceQuantity 40038. The MerchandiseAndAssortmentPlanningAssortment 40022 entity includes a Description 40042 subordinate entity. The @actionCode 40026 attribute has a cardinality of 1 40028 meaning that for each instance of the MerchandiseAndAssortmentPlanningAssortment 40022 entity there is one @actionCode 40026 attribute. The ID 40030 attribute has a cardinality of 1 40032 meaning that for each instance of the MerchandiseAndAssortmentPlanningAssortment 40022 entity there is one ID 40030 attribute. The TypeCode 40034 attribute has a cardinality of 0 . . . 1 40036 meaning that for each instance of the MerchandiseAndAssortmentPlanningAssortment 40022 entity there may be one TypeCode 40034 attribute. The UsedSpaceQuantity 40038 attribute has a cardinality of 0 . . . 1 40040 meaning that for each instance of the MerchandiseAndAssortmentPlanningAssortment 40022 entity there may be one UsedSpaceQuantity 40038 attribute.

The Description 40042 entity has a cardinality of 0 . . . n 40044 meaning that for each instance of the MerchandiseAndAssortmentPlanningAssortment 40022 entity there may be one or more Description 40042 entities. The Description 40042 entity includes a Description 40046 attribute. The Description 40046 attribute has a cardinality of 1 40048 meaning that for each instance of the Description 40042 entity there is one Description 40046 attribute.

The Dimension 40050 package includes a Dimension 40052 entity. The Dimension 40052 entity has a cardinality of 0 . . . n 40054 meaning that for each instance of the Dimension 40050 package there may be one or more Dimension 40052 entities. The Dimension 40052 entity includes various attributes, namely an OrdinalNumberValue 40056 and a Description 40068. The Dimension 40052 entity includes a MerchandiseAndAssortmentPlanningAssortmentPropertyValue 40060 subordinate entity. The OrdinalNumberValue 40056 attribute has a cardinality of 1 40058 meaning that for each instance of the Dimension 40052 entity there is one OrdinalNumberValue 40056 attribute. The Description 40068 attribute has a cardinality of 1 40070 meaning that for each instance of the Dimension 40052 entity there is one Description 40068 attribute.

The MerchandiseAndAssortmentPlanningAssortmentPropertyValue 40060 entity has a cardinality of 1 40062 meaning that for each instance of the Dimension 40052 entity there is one MerchandiseAndAssortmentPlanningAssortmentPropertyValue 40060 entity. The MerchandiseAndAssortmentPlanningAssortmentPropertyValue 40060 entity includes a CodeSpecification 40064 attribute. The CodeSpecification 40064 attribute has a cardinality of 0 . . . 1 40066 meaning that for each instance of the MerchandiseAndAssortmentPlanningAssortmentPropertyValue 40060 entity there may be one CodeSpecification 40064 attribute.

The ProductCategory 40072 package includes a ProductCategory 40074 entity. The ProductCategory 40074 entity has a cardinality of 0 . . . 1 40076 meaning that for each instance of the ProductCategory 40072 package there may be one ProductCategory 40074 entity. The ProductCategory 40074 entity includes various attributes, namely an InternalID 40078, a ProductCategoryHierarchyID 40082 and a ProductCategoryHierarchyTypeCode 40086. The InternalID 40078 attribute has a cardinality of 1 40080 meaning that for each instance of the ProductCategory 40074 entity there is one InternalID 40078 attribute. The ProductCategoryHierarchyID 40082 attribute has a cardinality of 1 40084 meaning that for each instance of the ProductCategory 40074 entity there is one ProductCategoryHierarchyID 40082 attribute. The ProductCategoryHierarchyTypeCode 40086 attribute has a cardinality of 1 40088 meaning that for each instance of the ProductCategory 40074 entity there is one ProductCategoryHierarchyTypeCode 40086 attribute.

The ReceivingStore 40090 package includes a ReceivingStore 40092 entity. The ReceivingStore 40092 entity has a cardinality of 0 . . . n 40094 meaning that for each instance of the ReceivingStore 40090 package there may be one or more ReceivingStore 40092 entities. The ReceivingStore 40092 entity includes various attributes, namely an @actionCode 40096, a StoreInternalID 40100 and a ValidityPeriod 40104. The @actionCode 40096 attribute has a cardinality of 1 40098 meaning that for each instance of the ReceivingStore 40092 entity there is one @actionCode 40096 attribute. The StoreInternalID 40100 attribute has a cardinality of 0 . . . 1 40102 meaning that for each instance of the ReceivingStore 40092 entity there may be one StoreInternalID 40100 attribute. The ValidityPeriod 40104 attribute has a cardinality of 1 40106 meaning that for each instance of the Receiving-Store 40092 entity there is one ValidityPeriod 40104 attribute.

The ReceivingParty 40108 package includes a Receiving-Party 40110 entity. The ReceivingParty 40110 entity has a cardinality of 0 . . . n 40112 meaning that for each instance of the ReceivingParty 40108 package there may be one or more ReceivingParty 40110 entities. The ReceivingParty 40110 entity includes various attributes, namely an @actionCode 40114, a CustomerID 40118 and a ValidityPeriod 40122. The @actionCode 40114 attribute has a cardinality of 1 40116 meaning that for each instance of the ReceivingParty 40110 entity there is one @(actionCode 40114 attribute. The CustomerID 40118 attribute has a cardinality of 0 . . . 1 40120 meaning that for each instance of the ReceivingParty 40110 entity there may be one CustomerID 40118 attribute. The ValidityPeriod 40122 attribute has a cardinality of 1 40124 meaning that for each instance of the ReceivingParty 40110 entity there is one ValidityPeriod 40122 attribute. The data types of the various packages, entities, and attributes are described with respect to FIG. 39.

In further detail, FIGS. 41-1 through 41-8 illustrate an example configuration of an Element Structure that includes a MerchandiseAndAssortmentPlanningAssortmentERPStoreLayoutElementRequestMessage 41000 package. The MerchandiseAndAssortmentPlanningAssortmentERPStoreLayoutElementRequestMessage 41000 package includes a MerchandiseAndAssortmentPlanningAssortmentERPStoreLayoutElementRequestMessage 41002 entity. The MerchandiseAndAssortmentPlanningAssortmentERPStoreLayoutElementRequestMessage 41000 package includes various packages, namely a MessageHeader 41004 and a MerchandiseAndAssortmentPlanningAssortment 41020.

The MessageHeader 41004 package includes a MessageHeader 41006 entity. The MessageHeader 41006 entity has a cardinality of 1 41008 meaning that for each instance of the MessageHeader 41004 package there is one MessageHeader 41006 entity. The MessageHeader 41006 entity includes various attributes, namely an ID 41010 and a CreationDateTime 41014. The ID 41010 attribute has a cardinality of 1 41012 meaning that for each instance of the MessageHeader 41006 entity there is one ID 41010 attribute. The CreationDateTime 41014 attribute has a cardinality of 1 41016 meaning that for each instance of the MessageHeader 41006 entity there is one CreationDateTime 41014 attribute. In some implementations, the MessageHeader 41006 entity can include other attributes having a cardinality of 0 . . . 1 41018.

The MerchandiseAndAssortmentPlanningAssortment 41020 package includes a MerchandiseAndAssortmentPlanningAssortment 41022 entity. The MerchandiseAndAssortmentPlanningAssortment 41020 package includes various packages, namely a Dimension 41038 and a StoreLayoutElement 41060. The MerchandiseAndAssortmentPlanningAssortment 41022 entity has a cardinality of 1 41024 meaning that for each instance of the MerchandiseAndAssortmentPlanningAssortment 41020 package there is one MerchandiseAndAssortmentPlanningAssortment 41022 entity. The MerchandiseAndAssortmentPlanningAssortment 41022 entity includes an ID 41026 attribute.

The MerchandiseAndAssortmentPlanningAssortment 41022 entity includes a Description 41030 subordinate entity. The ID 41026 attribute has a cardinality of 1 41028 meaning that for each instance of the MerchandiseAndAssortmentPlanningAssortment 41022 entity there is one ID 41026 attribute. The Description 41030 entity has a cardinality of 0 . . . n 41032 meaning that for each instance of the MerchandiseAndAssortmentPlanningAssortment 41022 entity there may be one or more Description 41030 entities. The Description 41030 entity includes a Description 41034 attribute. The Description 41034 attribute has a cardinality of 1 41036 meaning that for each instance of the Description 41030 entity there is one Description 41034 attribute.

The Dimension 41038 package includes a Dimension 41040 entity. The Dimension 41040 entity has a cardinality of 0 . . . n 41042 meaning that for each instance of the Dimension 41038 package there may be one or more Dimension 41040 entities. The Dimension 41040 entity includes various attributes, namely an OrdinalNumberValue 41044 and a Description 41056. The Dimension 41040 entity includes a MerchandiseAndAssortmentPlanningAssortmentPropertyValue 41048 subordinate entity.

The OrdinalNumberValue 41044 attribute has a cardinality of 1 41046 meaning that for each instance of the Dimension 41040 entity there is one OrdinalNumberValue 41044 attribute. The Description 41056 attribute has a cardinality of 1 41058 meaning that for each instance of the Dimension 41040 entity there is one Description 41056 attribute. The MerchandiseAndAssortmentPlanningAssortmentPropertyValue 41048 entity has a cardinality of 1 41050 meaning that for each instance of the Dimension 41040 entity there is one MerchandiseAndAssortmentPlanningAssortmentPropertyValue 41048 entity. The MerchandiseAndAssortmentPlanningAssortmentPropertyValue 41048 entity includes a CodeSpecification 41052 attribute. The CodeSpecification 41052 attribute has a cardinality of 0 . . . 1 41054 meaning that for each instance of the MerchandiseAndAssortmentPlanningAssortmentPropertyValue 41048 entity there may be one CodeSpecification 41052 attribute.

The StoreLayoutElement 41060 package includes a StoreLayoutElement 41062 entity. The StoreLayoutElement 41060 package includes a Version 41070 package. The StoreLayoutElement 41062 entity has a cardinality of 0 . . . 1 41064 meaning that for each instance of the StoreLayoutElement 41060 package there may be one StoreLayoutElement 41062 entity. The StoreLayoutElement 41062 entity includes an ID 41066 attribute. The ID 41066 attribute has a cardinality of 1 41068 meaning that for each instance of the StoreLayoutElement 41062 entity there is one ID 41066 attribute.

The Version 41070 package includes a Version 41072 entity. The Version 41070 package includes a Material 41084 package. The Version 41072 entity has a cardinality of 1 . . . n 41074 meaning that for each instance of the Version 41070 package there are one or more Version 41072 entities. The Version 41072 entity includes various attributes, namely an ID 41076 and a ValidityPeriod 41080. The ID 41076 attribute has a cardinality of 1 41078 meaning that for each instance of the Version 41072 entity there is one ID 41076 attribute. The ValidityPeriod 41080 attribute has a cardinality of 1 41082 meaning that for each instance of the Version 41072 entity there is one ValidityPeriod 41080 attribute.

The Material 41084 package includes a Material 41086 entity. The Material 41084 package includes various packages, namely a Measure 41130, a ProductCategory 41148 and a Quantity 41166. The Material 41086 entity has a cardinality of 0 . . . n 41088 meaning that for each instance of the Material 41084 package there may be one or more Material 41086 entities. The Material 41086 entity includes various attributes, namely an InternalID 41090, an OrdinalNumberValue 41094, a StandardID 41098, a MerchandiseTypeCode 41102, a ShelfOptimizationIndexValue 41106, a StoreFixtureOrdinalNumberValue 41110, a SalesPrice 41114 and a PurchasingPrice 41118. The Material 41086 entity includes a Description 41122 subordinate entity. The InternalID 41090 attribute has a cardinality of 1 41092 meaning that for each instance of the Material 41086 entity there is one InternalID 41090 attribute. The OrdinalNumberValue 41094 attribute has a cardinality of 1 41096 meaning that for each instance of the Material 41086 entity there is one OrdinalNumberValue 41094 attribute. The StandardID 41098 attribute has a cardinality of 1 41100 meaning that for each instance of the Material 41086 entity there is one StandardID 41098 attribute.

The MerchandiseTypeCode 41102 attribute has a cardinality of 1 41104 meaning that for each instance of the Material 41086 entity there is one MerchandiseTypeCode 41102 attribute. The ShelfOptimizationIndexValue 41106 attribute has a cardinality of 0 . . . 1 41108 meaning that for each instance of the Material 41086 entity there may be one ShelfOptimizationIndexValue 41106 attribute. The StoreFixtureOrdinalNumberValue 41110 attribute has a cardinality of 0 . . . 1 41112 meaning that for each instance of the Material 41086 entity there may be one StoreFixtureOrdinalNumberValue 41110 attribute. The SalesPrice 41114 attribute has a cardinality of 0 . . . 1 41116 meaning that for each instance of the Material 41086 entity there may be one SalesPrice 41114 attribute. The PurchasingPrice 41118 attribute has a cardinality of 0 . . . 1 41120 meaning that for each instance of the Material 41086 entity there may be one PurchasingPrice 41118 attribute.

The Description 41122 entity has a cardinality of 0 . . . n 41124 meaning that for each instance of the Material 41086 entity there may be one or more Description 41122 entities. The Description 41122 entity includes a Description 41126 attribute. The Description 41126 attribute has a cardinality of 1 41128 meaning that for each instance of the Description 41122 entity there is one Description 41126 attribute.

The Measure 41130 package includes a Measure 41132 entity. The Measure 41132 entity has a cardinality of 0 . . . n 41134 meaning that for each instance of the Measure 41130 package there may be one or more Measure 41132 entities. The Measure 41132 entity includes various attributes, namely a MeasureUnitCode 41136, a Quantity 41140 and a QuantityTypeCode 41144. The MeasureUnitCode 41136 attribute has a cardinality of 1 41138 meaning that for each instance of the Measure 41132 entity there is one MeasureUnitCode 41136 attribute. The Quantity 41140 attribute has a cardinality of 1 41142 meaning that for each instance of the Measure 41132 entity there is one Quantity 41140 attribute. The QuantityTypeCode 41144 attribute has a cardinality of 1 41146 meaning that for each instance of the Measure 41132 entity there is one QuantityTypeCode 41144 attribute.

The ProductCategory 41148 package includes a ProductCategory 41150 entity. The ProductCategory 41150 entity has a cardinality of 0 . . . n 41152 meaning that for each instance of the ProductCategory 41148 package there may be one or more ProductCategory 41150 entities. The ProductCategory 41150 entity includes various attributes, namely an InternalID 41154, a ProductCategoryHierarchyID 41158 and a ProductCategoryHierarchyTypeCode 41162. The InternalID 41154 attribute has a cardinality of 1 41156 meaning that for each instance of the ProductCategory 41150 entity there is one InternalID 41154 attribute. The ProductCategoryHierarchyID 41158 attribute has a cardinality of 1 41160 meaning that for each instance of the ProductCategory 41150 entity there is one ProductCategoryHierarchyID 41158 attribute. The ProductCategoryHierarchyTypeCode 41162 attribute has a cardinality of 1 41164 meaning that for each instance of the ProductCategory 41150 entity there is one ProductCategoryHierarchyTypeCode 41162 attribute.

The Quantity 41166 package includes a Quantity 41168 entity. The Quantity 41168 entity has a cardinality of 0 . . . n 41170 meaning that for each instance of the Quantity 41166 package there may be one or more Quantity 41168 entities. The Quantity 41168 entity includes a StoreFixtureFacingQuantity 41172 attribute. The StoreFixtureFacingQuantity 41172 attribute has a cardinality of 1 41174 meaning that for each instance of the Quantity 41168 entity there is one StoreFixtureFacingQuantity 41172 attribute. The data types of the various packages, entities, and attributes shown in FIG. 41 are described above with respect to FIG. 39.

In further detail, FIGS. 42-1 through 42-2 illustrate an example configuration of an Element Structure that includes a MerchandiseAndAssortmentPlanningAssortmentERPStoreLayoutElementByIDQueryMessage_sync 42000 package. The MerchandiseAndAssortmentPlanningAssortmentERPStoreLayoutElementByIDQueryMessage_sync 42000 package includes a MerchandiseAndAssortmentPlanningAssortmentERPStoreLayoutElementByIDQueryMessage_sync 42002 entity. The MerchandiseAndAssortmentPlanningAssortmentERPStoreLayoutElementByIDQueryMessage_sync 42000 package includes various packages, namely a MessageHeader 42004 and a Selection 42020.

The MessageHeader 42004 package includes a MessageHeader 42006 entity. The MessageHeader 42006 entity has a cardinality of 0 . . . 1 42008 meaning that for each instance of the MessageHeader 42004 package there may be one MessageHeader 42006 entity. The MessageHeader 42006 entity includes various attributes, namely an ID 42010 and a CreationDateTime 42014. The ID 42010 attribute has a cardinality of 1 42012 meaning that for each instance of the MessageHeader 42006 entity there is one ID 42010 attribute. The CreationDateTime 42014 attribute has a cardinality of 1 42016 meaning that for each instance of the MessageHeader 42006 entity there is one CreationDateTime 42014 attribute. In some implementations, the MessageHeader 42006 entity can include other attributes having a cardinality of 0 . . . 1 42018.

The Selection 42020 package includes a MerchandiseAndAssortmentPlanningAssortmentStoreLayoutElementSelectionByID 42022 entity. The MerchandiseAndAssortmentPlanningAssortmentStoreLayoutElementSelectionByID 42022 entity has a cardinality of 1 42024 meaning that for each instance of the Selection 42020 package there is one MerchandiseAndAssortmentPlanningAssortmentStoreLayoutElementSelectionByID 42022 entity. The MerchandiseAndAssortmentPlanningAssortmentStoreLayoutElementSelectionByID 42022 entity includes various attributes, namely a MerchandiseAndAssortmentPlanningAssortmentID 42026, a VersionID 42030 and a ValidityPeriod 42034. The MerchandiseAndAssortmentPlanningAssortmentID 42026 attribute has a cardinality of 1 42028 meaning that for each instance of the MerchandiseAndAssortmentPlanningAssortmentStoreLayoutElementSelectionByID 42022 entity there is one MerchandiseAndAssortmentPlanningAssortmentID 42026 attribute. The VersionID 42030 attribute has a cardinality of 0 . . . 1 42032 meaning that for each instance of the MerchandiseAndAssortmentPlanningAssortmentStoreLayoutElementSelectionByID 42022 entity there may be one VersionID 42030 attribute. The ValidityPeriod 42034 attribute has a cardinality of 0 . . . 1 42036 meaning that for each instance of the MerchandiseAndAssortmentPlanningAssortmentStoreLayoutElementSelectionByID 42022 entity there may be one ValidityPeriod 42034 attribute. The data types of the various packages, entities, and attributes shown in FIG. 42 are described above with respect to FIG. 39.

In further detail, FIGS. 43-1 through 43-8 illustrate an example configuration of an Element Structure that includes a MerchandiseAndAssortmentPlanningAssortmentERPStoreLayoutElementByIDResponseMessage_sync 43000 package. The MerchandiseAndAssortmentPlanningAssortmentERPStoreLayoutElementByIDResponseMessage_sync 43000 package includes a MerchandiseAndAssortmentPlanningAssortmentERPStoreLayoutElementByIDResponseMessage_sync 43002 entity. The MerchandiseAndAssortmentPlanningAssortmentERPStoreLayoutElementByIDResponseMessage_sync 43000 package includes various packages, namely a MessageHeader 43004, a MerchandiseAndAssortmentPlanningAssortment 43020 and a Log 43176.

The MessageHeader 43004 package includes a MessageHeader 43006 entity. The MessageHeader 43006 entity has a cardinality of 0 . . . 1 43008 meaning that for each instance of the MessageHeader 43004 package there may be one MessageHeader 43006 entity. The MessageHeader 43006 entity includes various attributes, namely an ID 43010 and a CreationDateTime 43014. The ID 43010 attribute has a cardinality of 1 43012 meaning that for each instance of the MessageHeader 43006 entity there is one ID 43010 attribute. The CreationDateTime 43014 attribute has a cardinality of 1 43016 meaning that for each instance of the MessageHeader 43006 entity there is one CreationDateTime 43014 attribute. In some implementations, the MessageHeader 43006 entity can include other attributes having a cardinality of 0 . . . 1 43018.

The MerchandiseAndAssortmentPlanningAssortment 43020 package includes a MerchandiseAndAssortmentPlanningAssortment 43022 entity. The MerchandiseAndAssortmentPlanningAssortment 43020 package includes various packages, namely a Dimension 43038 and a StoreLayoutElement 43060.

The MerchandiseAndAssortmentPlanningAssortment 43022 entity has a cardinality of 0 . . . 1 43024 meaning that for each instance of the MerchandiseAndAssortmentPlanningAssortment 43020 package there may be one MerchandiseAndAssortmentPlanningAssortment 43022 entity. The MerchandiseAndAssortmentPlanningAssortment 43022 entity includes an ID 43026 attribute. The MerchandiseAndAssortmentPlanningAssortment 43022 entity includes a Description 43030 subordinate entity. The ID 43026 attribute has a cardinality of 1 43028 meaning that for each instance of the MerchandiseAndAssortmentPlanningAssortment 43022 entity there is one ID 43026 attribute.

The Description 43030 entity has a cardinality of 0 . . . n 43032 meaning that for each instance of the MerchandiseAndAssortmentPlanningAssortment 43022 entity there may be one or more Description 43030 entities. The Description 43030 entity includes a Description 43034 attribute. The Description 43034 attribute has a cardinality of 1 43036 meaning that for each instance of the Description 43030 entity there is one Description 43034 attribute.

The Dimension 43038 package includes a Dimension 43040 entity. The Dimension 43040 entity has a cardinality of 0 . . . n 43042 meaning that for each instance of the Dimension 43038 package there may be one or more Dimension 43040 entities. The Dimension 43040 entity includes various attributes, namely an OrdinalNumberValue 43044 and a Description 43056. The Dimension 43040 entity includes a MerchandiseAndAssortmentPlanningAssortmentPropertyValue 43048 subordinate entity. The OrdinalNumberValue 43044 attribute has a cardinality of 1 43046 meaning that for each instance of the Dimension 43040 entity there is one OrdinalNumberValue 43044 attribute. The Description 43056 attribute has a cardinality of 1 43058 meaning that for each instance of the Dimension 43040 entity there is one Description 43056 attribute.

The MerchandiseAndAssortmentPlanningAssortmentPropertyValue 43048 entity has a cardinality of 1 43050 meaning that for each instance of the Dimension 43040 entity there is one MerchandiseAndAssortmentPlanningAssortmentPropertyValue 43048 entity. The MerchandiseAndAssortmentPlanningAssortmentPropertyValue 43048 entity includes a CodeSpecification 43052 attribute. The CodeSpecification 43052 attribute has a cardinality of 0 . . . 1 43054 meaning that for each instance of the MerchandiseAndAssortmentPlanningAssortmentPropertyValue 43048 entity there may be one CodeSpecification 43052 attribute.

The StoreLayoutElement 43060 package includes a StoreLayoutElement 43062 entity. The StoreLayoutElement 43060 package includes a Version 43070 package. The StoreLayoutElement 43062 entity has a cardinality of 0 . . . 1 43064 meaning that for each instance of the StoreLayoutElement 43060 package there may be one StoreLayoutElement 43062 entity. The StoreLayoutElement 43062 entity includes an ID 43066 attribute. The ID 43066 attribute has a cardinality of 1 43068 meaning that for each instance of the StoreLayoutElement 43062 entity there is one ID 43066 attribute.

The Version 43070 package includes a Version 43072 entity. The Version 43070 package includes a Material 43084 package. The Version 43072 entity has a cardinality of 1 . . . n 43074 meaning that for each instance of the Version 43070 package there are one or more Version 43072 entities. The Version 43072 entity includes various attributes, namely an ID 43076 and a ValidityPeriod 43080. The ID 43076 attribute has a cardinality of 1 43078 meaning that for each instance of the Version 43072 entity there is one ID 43076 attribute. The ValidityPeriod 43080 attribute has a cardinality of 1 43082 meaning that for each instance of the Version 43072 entity there is one ValidityPeriod 43080 attribute.

The Material 43084 package includes a Material 43086 entity. The Material 43084 package includes various packages, namely a Measure 43130, a ProductCategory 43148 and a Quantity 43166. The Material 43086 entity has a cardinality of 0 . . . n 43088 meaning that for each instance of the Material 43084 package there may be one or more Material 43086 entities. The Material 43086 entity includes various attributes, namely an InternalID 43090, an OrdinalNumberValue 43094, a StandardID 43098, a MerchandiseTypeCode 43102, a ShelfOptimizationIndexValue 43106, a StoreFixtureOrdinalNumberValue 43110, a SalesPrice 43114 and a PurchasingPrice 43118.

The Material 43086 entity includes a Description 43122 subordinate entity. The InternalID 43090 attribute has a cardinality of 1 43092 meaning that for each instance of the Material 43086 entity there is one InternalID 43090 attribute. The OrdinalNumberValue 43094 attribute has a cardinality of 1 43096 meaning that for each instance of the Material 43086 entity there is one OrdinalNumberValue 43094 attribute. The StandardID 43098 attribute has a cardinality of 1 43100 meaning that for each instance of the Material 43086 entity there is one StandardID 43098 attribute. The MerchandiseTypeCode 43102 attribute has a cardinality of 1 43104 meaning that for each instance of the Material 43086 entity there is one MerchandiseTypeCode 43102 attribute. The ShelfOptimizationIndexValue 43106 attribute has a cardinality of 0 . . . 1 43108 meaning that for each instance of the Material 43086 entity there may be one ShelfOptimizationIndexValue 43106 attribute.

The StoreFixtureOrdinalNumberValue 43110 attribute has a cardinality of 0 . . . 1 43112 meaning that for each instance of the Material 43086 entity there may be one StoreFixtureOrdinalNumberValue 43110 attribute. The SalesPrice 43114 attribute has a cardinality of 0 . . . 1 43116 meaning that for each instance of the Material 43086 entity there may be one SalesPrice 43114 attribute. The PurchasingPrice 43118 attribute has a cardinality of 0 . . . 1 43120 meaning that for each instance of the Material 43086 entity there may be one PurchasingPrice 43118 attribute. The Description 43122 entity has a cardinality of 0 . . . n 43124 meaning that for each instance of the Material 43086 entity there may be one or more Description 43122 entities. The Description 43122 entity includes a Description 43126 attribute. The Description 43126 attribute has a cardinality of 1 43128 meaning that for each instance of the Description 43122 entity there is one Description 43126 attribute.

The Measure 43130 package includes a Measure 43132 entity. The Measure 43132 entity has a cardinality of 0 . . . n 43134 meaning that for each instance of the Measure 43130 package there may be one or more Measure 43132 entities. The Measure 43132 entity includes various attributes, namely a MeasureUnitCode 43136, a Quantity 43140 and a QuantityTypeCode 43144. The MeasureUnitCode 43136 attribute has a cardinality of 1 43138 meaning that for each instance of the Measure 43132 entity there is one MeasureUnitCode 43136 attribute. The Quantity 43140 attribute has a cardinality of 1 43142 meaning that for each instance of the Measure 43132 entity there is one Quantity 43140 attribute. The QuantityTypeCode 43144 attribute has a cardinality of 1 43146 meaning that for each instance of the Measure 43132 entity there is one QuantityTypeCode 43144 attribute.

The ProductCategory 43148 package includes a ProductCategory 43150 entity. The ProductCategory 43150 entity has a cardinality of 0 . . . n 43152 meaning that for each instance of the ProductCategory 43148 package there may be one or more ProductCategory 43150 entities. The ProductCategory 43150 entity includes various attributes, namely an InternalID 43154, a ProductCategoryHierarchyID 43158 and a ProductCategoryHierarchyTypeCode 43162. The InternalID 43154 attribute has a cardinality of 1 43156 meaning that for each instance of the ProductCategory 43150 entity there is one InternalID 43154 attribute. The ProductCategoryHierarchyID 43158 attribute has a cardinality of 1 43160 meaning that for each instance of the ProductCategory 43150 entity there is one ProductCategoryHierarchyID 43158 attribute. The ProductCategoryHierarchyTypeCode 43162 attribute has a cardinality of 1 43164 meaning that for each instance of the ProductCategory 43150 entity there is one ProductCategoryHierarchyTypeCode 43162 attribute.

The Quantity 43166 package includes a Quantity 43168 entity. The Quantity 43168 entity has a cardinality of 0 . . . n 43170 meaning that for each instance of the Quantity 43166 package there may be one or more Quantity 43168 entities. The Quantity 43168 entity includes a StoreFixtureFacingQuantity 43172 attribute. The StoreFixtureFacingQuantity 43172 attribute has a cardinality of 1 43174 meaning that for each instance of the Quantity 43168 entity there is one StoreFixtureFacingQuantity 43172 attribute.

The Log 43176 package includes a Log 43178 entity. The Log 43178 entity has a cardinality of 1 43180 meaning that for each instance of the Log 43176 package there is one Log 43178 entity. The data types of the various packages, entities, and attributes shown in FIG. 43 are described with respect to FIG. 39.

MerchandiseAndAssortmentPlanningMaterial Interfaces

A Merchandise And Assortment Planning Material is a tangible product, such as a sellable article. A product is a commodity that is the object of the business of a company and serves to create value for the company. A product can have relationships to other products or objects. A Merchandise and Assortment Planning Material can be either a regular product, which has been created in the material master system of records, or it can be created during an assortment planning process (e.g., a "planned product"). In the latter case, after releasing a finalized assortment plan, the contained planned materials may be transferred to the material master system of records. When a planner creates a new material in MAP (Merchandise and Assortment Planning), the corresponding material may get created in ERP (Enterprise Resource Planning).

The MerchandiseAndAssortmentPlanningMaterial interface performs a MaterialERPBasicDataCreateRequest_Out operation. The MaterialERPBasicDataCreateRequest_Out operation is a request from Merchandise and Assortment Planning Product Data Maintenance to Product Data Maintenance to create material basic data. When a planner creates a new material in Merchandise and Assortment Planning, the corresponding material gets created in ERP. The MaterialERPBasicDataCreateRequest_Out operation includes a MaterialERPBasicDataCreateRequest message type. The structure of the MaterialERPBasicDataCreateRequest message type is specified by a MaterialERPBasicDataCreateRequestMessage message data type.

Figure 44:
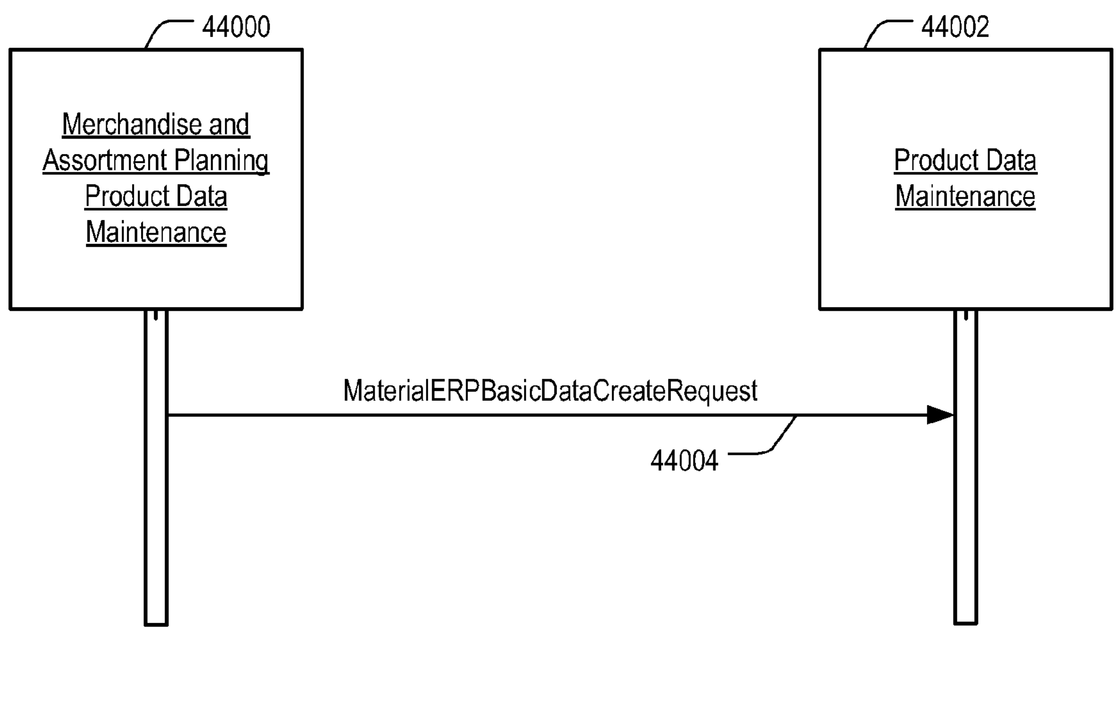
FIG. 44 illustrates an exemplary MerchandiseAndAssortmentPlanningMaterial Message Choreography.

The message choreography of FIG. 44 describes a possible logical sequence of messages that can be used to realize a Merchandise and Assortment Planning Material business scenario. A "Merchandise and Assortment Planning Product Data Maintenance" system 44000 can request the creation of material ERP basic data from a "Product Data Maintenance" system 44002, using a MaterialERPBasicDataCreateRequest message 44004 as shown, for example, in FIG. 44.

FIGS. 45-1 through 45-5 illustrate one example logical configuration of MerchandiseAndAssortmentPlanningMaterialMessage element structure 45000. Specifically, these figures depict the arrangement and hierarchy of various components such as one or more levels of packages, entities, and datatypes, shown here as 45000 through 45134. As described above, packages may be used to represent hierarchy levels. Entities are discrete business elements that are used during a business transaction. Data types are used to type object entities and interfaces with a structure. For example, MerchandiseAndAssortmentPlanningMaterialMessage element structure 45000 includes, among other things, MessageHeader 45006. Accordingly, heterogeneous applications may communicate using this consistent message configured as such.

In further detail, FIGS. 45-1 through 45-5 illustrate an example configuration of an Element Structure that includes a MerchandiseAndAssortmentPlanningMaterialMessage 45000 package. The MerchandiseAndAssortmentPlanningMaterialMessage 45000 package includes a MerchandiseAndAssortmentPlanningMaterialMessage 45002 entity. The MerchandiseAndAssortmentPlanningMaterialMessage 45000 package includes various packages, namely a MessageHeader 45004 and a MerchandiseAndAssortmentPlanningMaterial 45010.

The MessageHeader 45004 package is a BusinessDocumentMessageHeader 45008 data type. The MessageHeader

45004 package includes a MessageHeader 45006 entity. A BusinessDocumentMessageHeader includes business information from a perspective of the sender application for identifying processing of a business document instance within a technical message (if applicable, with a reference to a previous instance of a business document within a previous technical message). BusinessDocumentMessageHeader also includes information about the sender, and information about the receiver.

The MerchandiseAndAssortmentPlanningMaterial 45010 package is an <MT>MrchdsAndAsstmtPlngMatl 45014 data type. The MerchandiseAndAssortmentPlanningMaterial 45010 package includes a MerchandiseAndAssortmentPlanningMaterial 45012 entity. The MerchandiseAndAssortmentPlanningMaterial 45010 package includes various packages, namely a Description 45048, a ProductCategory 45058, a GlobalTradeItemNumber 45076, a QuantityUnit 45090, a QuantityConversion 45104 and a Measure 45118.

The MerchandiseAndAssortmentPlanningMaterial 45012 entity includes various attributes, namely an InternalID 45016, a TypeCode 45020, an IndustrialSectorCode 45024, a PreviousName 45028, a DeletedIndicator 45032, a DivisionCode 45036, a ReferenceMaterialInternalID 45040 and a MerchandiseTypeCode 45044. The InternalID 45016 attribute is a ProductInternalID 45018 data type. A ProductInternalID is a proprietary identifier for a product. A product is either a tangible or intangible good, and is a part of the business activities of a company. ProductInternalID can be traded and contributes directly or indirectly to value added.

The TypeCode 45020 attribute is a MaterialTypeCode 45022 data type. A MaterialTypeCode is a coded representation of a material type. A MaterialType groups together materials with similar attributes. The IndustrialSectorCode 45024 attribute is an IndustrialSectorCode 45026 data type. A Material IndustrialSector Code is a coded representation of the industry sector to which a material belongs. The industrial sector specifies a branch of industry to which a material is assigned.

The PreviousName 45028 attribute is a LANGUAGEINDEPENDENT_MEDIUM_Name 45030 data type. LANGUAGEINDEPENDENT_MEDIUM_Name is language independent, so the attribute languageCode of the CDT Text is omitted. The DeletedIndicator 45032 attribute is an Indicator 45034 data type. Indicator is a representation of a situation that has two mutually exclusive Boolean values. The DivisionCode 45036 attribute is a DivisionCode 45038 data type. A DivisionCode is a coded representation of a division. A division defines the responsibility for sales or profits for salable materials or services. An organizational unit can have a division; however, a division is not an organizational unit.

The ReferenceMaterialInternalID 45040 attribute is a ProductInternalID 45042 data type. A ProductInternalID is a proprietary identifier for a product. The MerchandiseTypeCode 45044 attribute is a MaterialMerchandiseTypeCode 45046 data type. A MaterialMerchandiseTypeCode is a coded representation of a merchandise type of a material. The Description 45048 package is an <MT>Desc 45052 data type. The Description 45048 package includes a Description 45050 entity. The Description 45050 entity includes a Description 45054 attribute. The Description 45054 attribute is a SHORT_Description 45056 data type. Description is a natural-language representation of the properties of a product.

The ProductCategory 45058 package is an <MT>ProdCat 45062 data type. The ProductCategory 45058 package includes a ProductCategory 45060 entity. The ProductCategory 45060 entity includes various attributes, namely an InternalID 45064, a HierarchyID 45068 and a HierarchyTypeCode 45072.

The InternalID 45064 attribute is a ProductCategoryID 45066 data type. A ProductCategoryID is a unique identifier for a product category. A product category is a division of products according to objective business-specific criteria. The HierarchyID 45068 attribute is a ProductCategoryHierarchyID 45070 data type. A ProductCategoryHierarchyID is a unique identifier for a product category hierarchy. A product category hierarchy is a classification system for products. A product category describes a hierarchical order of product categories that exist on both higher and lower levels in relation to one another, and whose structure can be represented as a tree.

The HierarchyTypeCode 45072 attribute is a ProductCategoryHierarchyTypeCode 45074 data type. A ProductCategoryHierarchyUsageCode represents, in the form of a code, the usage of a product category hierarchy. A ProductCategoryHierarchyTypeCode differentiates between standard product hierarchy, article hierarchy, and merchandise category hierarchy.

The GlobalTradeItemNumber 45076 package is an <MT>GlobalTrdltmNo 45080 data type. The GlobalTradeItemNumber 45076 package includes a GlobalTradeItemNumber 45078 entity. The GlobalTradeItemNumber 45078 entity includes various attributes, namely a ProductStandardID 45082 and a MeasureUnitCode 45086.

The ProductStandardID 45082 attribute is a ProductStandardID 45084 data type. A ProductStandardID is a standardized identifier for a product, and the identification scheme is managed by an agency from a code list. The MeasureUnitCode 45086 attribute is a MeasureUnitCode 45088 data type. A MeasureUnitCode is a coded representation of a non-monetary unit of measurement. The QuantityUnit 45090 package is an <MT>QtyUnit 45094 data type. The QuantityUnit 45090 package includes a QuantityUnit 45092 entity. The QuantityUnit 45092 entity includes various attributes, namely a MeasureUnitCode 45096 and a BaseQuantityUnitIndicator 45100.

The MeasureUnitCode 45096 attribute is a MeasureUnitCode 45098 data type. MeasureUnitCode is a coded representation of a non-monetary unit of measurement. The BaseQuantityUnitIndicator 45100 attribute is an Indicator 45102 data type. Indicator is a representation of a situation that has two mutually exclusive Boolean values. In some implementations, an integrity condition may exist such that one and only one entry has this indicator set.

The QuantityConversion 45104 package is an <MT>QtyCnvrsn 45108 data type. The QuantityConversion 45104 package includes a QuantityConversion 45106 entity. The QuantityConversion 45106 entity includes various attributes, namely a Quantity 45110 and a CorrespondingQuantity 45114. The Quantity 45110 attribute is a Quantity 45112 data type. A Quantity is a non-monetary numerical specification of an amount in a unit of measurement. In some implementations, an integrity condition may exist such that the unitCode for the Quantity is defined under QuantityUnit node as MeasureUnitCode.

The CorrespondingQuantity 45114 attribute is a Quantity 45116 data type. A Quantity is a non-monetary numerical specification of an amount in a unit of measurement. The Measure 45118 package is an <MT>Measure 45122 data type. The Measure 45118 package includes a Measure 45120 entity. The Measure 45120 entity includes various attributes, namely a MeasureUnitCode 45124, a Quantity 45128 and a QuantityTypeCode 45132.

The MeasureUnitCode 45124 attribute is a MeasureUnitCode 45126 data type. The MeasureUnitCode is a coded representation of a non-monetary unit of measurement. In some implementations, an integrity condition may exist such that MeasureUnitCode is defined under QuantityUnit node. The Quantity 45128 attribute is a Quantity 45130 data type. A Quantity is a non-monetary numerical specification of an amount in a unit of measurement. In some implementations, an integrity condition may exist such that MeasureUnitCode is defined under QuantityUnit node. The QuantityTypeCode 45132 attribute is a QuantityTypeCode 45134 data type. A QuantityTypeCode is a coded representation of a type of quantity that is based on a measurable characteristic of an object or physical phenomenon. In some implementations, an integrity condition may exist such that allowed values include Length, Width, Height, Gross_Weight, Net_Weight, and Volume.

MerchandiseAndAssortmentPlanningProductProcurementArrangement Interfaces

A MerchandiseAndAssortmentPlanningProductProcurementArrangement is a source of information, such as purchasing price, for the procurement of a certain material or service from a certain vendor. The MerchandiseAndAssortmentPlanningProductProcurementArrangement interface performs various operations, namely a ProductProcurementArrangementERPCreateRequest_Out and a ProductProcurementArrangementERPBulkCreateRequest_Out. The ProductProcurementArrangementERPCreateRequest_Out operation is a request from Merchandise and Assortment Planning Product Data Maintenance to Product Data Maintenance to create a purchasing price of a material, such as per vendor. A Merchandise and Assortment Planning Product Procurement Arrangement includes purchasing price information for a material. The ProductProcurementArrangementERPCreateRequest_Out operation includes a ProductProcurementArrangementERPCreateRequest message type. The structure of the ProductProcurementArrangementERPCreateRequest message type is specified by a ProductProcurementArrangementERPCreateRequestMessage message data type.

The ProductProcurementArrangementERPBulkCreateRequest_Out operation is a request from Merchandise and Assortment Planning Product Data Maintenance to Product Data Maintenance to create many purchasing prices of a material, such as per vendor. A Merchandise and Assortment Planning Product Procurement Arrangement includes information of a purchasing price from a specific vendor for a material. This operation is used to create many purchasing prices. The ProductProcurementArrangementERPBulkCreateRequest_Out operation includes a ProductProcurementArrangementERPBulkCreateRequest message type. The structure of the ProductProcurementArrangementERPBulkCreateRequest message type is specified by a ProductProcurementArrangementERPBulkCreateRequestMessage message data type.

Figure 46:
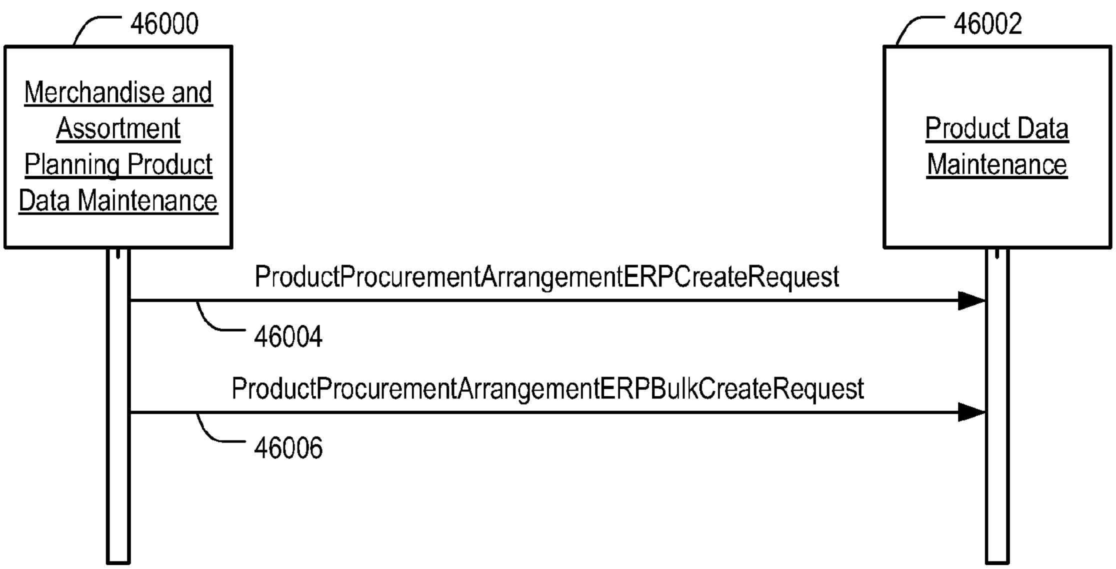
FIG. 46 illustrates an exemplary MerchandiseAndAssortmentPlanningProductProcurementArrangement Message Choreography.

The message choreography of FIG. 46 describes a possible logical sequence of messages that can be used to realize a Merchandise and Assortment Planning Product Procurement Arrangement business scenario. A "Merchandise and Assortment Planning Product Data Maintenance" system 46000 can request the creation of product procurement arrangement ERP information in a "Product Data Maintenance" system 46002, using a ProductProcurementArrangementERPCreateRequest message 46004 as shown, for example, in FIG. 46. The "Merchandise and Assortment Planning Product Data Maintenance" system 46000 can request the creation of product procurement arrangement ERP bulk information in the "Product Data Maintenance" system 46002, using a ProductProcurementArrangementERPBulkCreateRequest message 46006 as shown, for example, in FIG. 46.

FIGS. 47-1 through 47-3 illustrate one example logical configuration of MerchandiseAndAssortmentPlanningProductProcurementArrangementMessage element structure 47000. Specifically, these figures depict the arrangement and hierarchy of various components such as one or more levels of packages, entities, and datatypes, shown here as 47000 through 47050. As described above, packages may be used to represent hierarchy levels. Entities are discrete business elements that are used during a business transaction. Data types are used to type object entities and interfaces with a structure. For example, MerchandiseAndAssortmentPlanningProductProcurementArrangementMessage element structure 47000 includes, among other things, MessageHeader 47006. Accordingly, heterogeneous applications may communicate using this consistent message configured as such.

In further detail, FIGS. 47-1 through 47-3 illustrate an example configuration of an Element Structure that includes a MerchandiseAndAssortmentPlanningProductProcurementArrangementMessage 47000 package. The MerchandiseAndAssortmentPlanningProductProcurementArrangementMessage 47000 package includes a MerchandiseAndAssortmentPlanningProductProcurementArrangementMessage 47002 entity. The MerchandiseAndAssortmentPlanningProductProcurementArrangementMessage 47000 package includes various packages, namely a MessageHeader 47004 and a MerchandiseAndAssortmentPlanningProductProcurementArrangement 47010.

The MessageHeader 47004 package is a BusinessDocumentMessageHeader 47008 data type. The MessageHeader 47004 package includes a MessageHeader 47006 entity. A BusinessDocumentMessageHeader includes business information from a perspective of the sender application for identifying and processing of a business document instance within a technical message (if applicable, with a reference to a previous instance).

The MerchandiseAndAssortmentPlanningProductProcurementArrangement 47010 package is an <MT>MrchdsAndAsstmtPlngPrdProcmtArrgmt 47014 data type. The MerchandiseAndAssortmentPlanningProductProcurementArrangement 47010 package includes a MerchandiseAndAssortmentPlanningProductProcurementArrangement 47012 entity.

The MerchandiseAndAssortmentPlanningProductProcurementArrangement 47012 entity includes various attributes, namely an ID 47016, a ProductInternalID 47020, a SupplierID 47024, a PurchasingOrganisationParty 47028, a PlantID 47032, a SupplierProductCategoryID 47036, a Price 47040, an OrderUnitConversionRate 47044 and an OrderPriceUnitConversionRate 47048.

The ID 47016 attribute is a ProductProcurementArrangementID 47018 data type. A ProductProcurementArrangementID is an identifier for a product procurement arrangement. The ProductInternalID 47020 attribute is a ProductInternalID 47022 data type. A ProductInternalID is a proprietary identifier for a product. The SupplierID 47024 attribute is a PartyID 47026 data type. A PartyID is a unique identifier for a party. A party is a natural person, organization, or group in which a company has a business or intra-enterprise interest. A party can be, for example, a person, organization, or group within or outside of the company. The PurchasingOrganisationParty 47028 attribute is a PartyInternalID 47030 data type. A PartyInternalID is a proprietary identifier for a party. A party is a natural person, organization, or group in which a company has a business or intra-enterprise interest. A party may be a person, organization, or group within or outside of the company. The PlantID 47032 attribute is a PlantID 47034 data type. A PlantID is an identifier of a plant. A Plant is a structured organisational unit of a company with unique fiscal assignment. The SupplierProductCategoryID 47036 attribute is a ProductCategoryID 47038 data type. A ProductCategoryID is a unique identifier for a product category. A product category is a division of products according to objective business-specific criteria.

The Price 47040 attribute is a Price 47042 data type. A Price is an exchange value, expressed in a monetary unit, of a product or a service in relation to a basic amount. The OrderUnitConversionRate 47044 attribute is a Rate 47046 data type. Rate is a fraction whose numerator and denominator are quantities, values, or dimensionless factors, independently from each other. The OrderPriceUnitConversionRate 47048 attribute is also a Rate 47050 data type. MerchandiseAndAssortmentPlanningSalesPriceSpecificationCalculation Interfaces The MerchandiseAndAssortmentPlanningSalesPriceSpecificationCalculation includes a calculated sales prices based on price influencing factors for specific data retention levels. The MerchandiseAndAssortmentPlanningSalesPriceSpecificationCalculation interface performs a SalesPriceSpecificationCalculationCreateRequest_Out operation. The SalesPriceSpecificationCalculationCreateRequest_Out operation is a request from Merchandise and Assortment Planning Price Data Management to a Price Master Data Management to transmit sales price information. A Merchandise and Assortment Planning Sales Price Specification Calculation includes sales price information for a material. The SalesPriceSpecificationCalculationCreateRequest_Out operation includes a SalesPriceSpecificationCalculationCreateRequest message type. The structure of the SalesPriceSpecificationCalculationCreateRequest message type is specified by a SalesPriceSpecificationCalculationCreateRequestMessage message data type.

Figure 48:
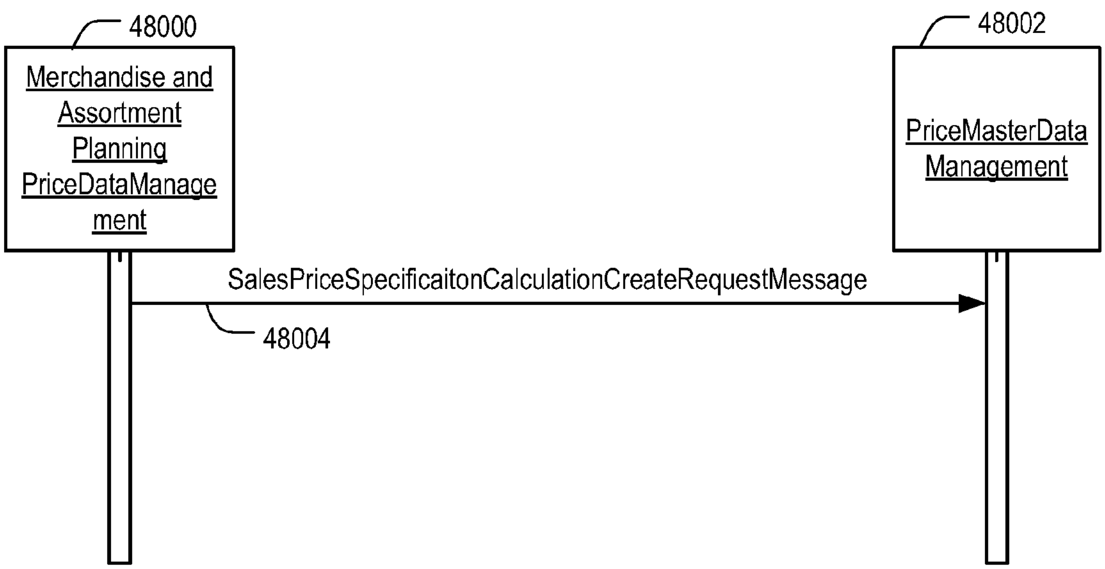
FIG. 48 illustrates an exemplary MerchandiseAndAssortmentPlanningSalesPriceSpecificationCalculation Message Choreography.

The message choreography of FIG. 48 describes a possible logical sequence of messages that can be used to realize a Merchandise and Assortment Planning Sales Price Specification Calculation business scenario. A "Merchandise and Assortment Planning Price Data Management" system 48000 can request the creation of sales price specification calculation information in a "Price Master Data Management" system 48002, using a SalesPriceSpecificationCalculationCreateRequestMessage message 48004 as shown, for example, in FIG. 48.

FIGS. 49-1 through 49-4 illustrate one example logical configuration of MerchandiseAndAssortmentPlanningSalesPriceSpecificationCalculationMessage element structure 49000. Specifically, these figures depict the arrangement and hierarchy of various components such as one or more levels of packages, entities, and datatypes, shown here as 49000 through 49078. As described above, packages may be used to represent hierarchy levels. Entities are discrete business elements that are used during a business transaction. Data types are used to type object entities and interfaces with a structure. For example, MerchandiseAndAssortmentPlanningSalesPriceSpecificationCalculationMessage element structure 49000 includes, among other things, MessageHeader 49006. Accordingly, heterogeneous applications may communicate using this consistent message configured as such.

In further detail, FIGS. 49-1 through 49-4 illustrate an example configuration of an Element Structure that includes a MerchandiseAndAssortmentPlanningSalesPriceSpecificationCalculationMessage 49000 package. The MerchandiseAndAssortmentPlanningSalesPriceSpecificationCalculationMessage 49000 package includes a MerchandiseAndAssortmentPlanningSalesPriceSpecificationCalculationMessage 49002 entity. The MerchandiseAndAssortmentPlanningSalesPriceSpecificationCalculationMessage 49000 package includes various packages, namely a MessageHeader 49004 and a MerchandiseAndAssortmentPlanningSalesPriceSpecificationCalculation 49018.

The MessageHeader 49004 package is a BusinessDocumentMessageHeader 49008 data type. The MessageHeader 49004 package includes a MessageHeader 49006 entity. A BusinessDocumentMessageHeader includes business information from a perspective of the sender application for identifying processing of a business document instance within a technical message (if applicable, with a reference to a previous instance of a business document within a previous technical message). BusinessDocumentMessageHeader also includes information about the sender and information about the receiver. The MessageHeader 49006 entity includes various attributes, namely an ID 49010 and a CreationDateTime 49014.

The ID 49010 attribute is a BusinessDocumentMessageID 49012 data type. A BusinessDocumentMessageID is a unique identifier of a business document in a technical message that is issued by the sender business application. The CreationDateTime 49014 attribute is a DateTime 49016 data type. DateTime is a time stamp, accurate to the second, of a calendar day.

The MerchandiseAndAssortmentPlanningSalesPriceSpecificationCalculation 49018 package is an <MT>MrchdsAndAsstmtPlngSlsPrSpecCalc 49022 data type. The MerchandiseAndAssortmentPlanningSalesPriceSpecificationCalculation 49018 package includes a MerchandiseAndAssortmentPlanningSalesPriceSpecificationCalculation 49020 entity. The MerchandiseAndAssortmentPlanningSalesPriceSpecificationCalculation 49018 package includes an Item 49032 package.

The MerchandiseAndAssortmentPlanningSalesPriceSpecificationCalculation 49020 entity includes various attributes, namely a BusinessTransactionDocumentTypeCode 49024 and a BusinessTransactionDocumentID 49028. The BusinessTransactionDocumentTypeCode 49024 attribute is a BusinessTransactionDocumentTypeCode 49026 data type. The BusinessTransactionDocumentTypeCode is a coded representation of a document type that occurs in business transactions. The document type describes the business nature of similar documents and defines the basic features of this type of documents. The BusinessTransactionDocumentID 49028 attribute is a BusinessTransactionDocumentID 49030 data type. A BusinessTransactionDocumentID is a unique identifier for a business transaction document.

The Item 49032 package is an <MT>Itm 49036 data type. The Item 49032 package includes an Item 49034 entity. The Item 49032 package includes a Price 49066 package. The Item 49034 entity includes various attributes, namely a ProductInternalID 49038, a MeasureUnitCode 49042, a SalesOrganisationID 49046, a DistributionChannelCode 49050, a PriceZoneID 49054, a StoreInternalID 49058 and a ValidityPeriod 49062. The ProductInternalID 49038 attribute is a ProductInternalID 49040 data type. A ProductInternalID is a proprietary identifier for a product. The MeasureUnitCode 49042 attribute is a MeasureUnitCode 49044 data type. The MeasureUnitCode is a coded representation of a non-monetary unit of measurement. A unit of measurement is a quantity that is either defined by a standard or established by conventions as a particular type of unit. This unit quantity is the standard of comparison for determining and specifying other quantities of the same type.

The SalesOrganisationID 49046 attribute is an OrganisationalCentreID 49048 data type. An OrganisationalCentreID is a unique identifier of an organizational unit. The DistributionChannelCode 49050 attribute is a DistributionChannelCode 49052 data type. A DistributionChannelCode is a coded representation of a distribution channel. A distribution channel is a channel via which goods or services reach the customer. The PriceZoneID 49054 attribute is a PriceZoneID 49056 data type. The StoreInternalID 49058 attribute is a StoreInternalID 49060 data type. The ValidityPeriod 49062 attribute is a TimePointPeriod 49064 data type. TimePointPeriod is a period that is defined by two points in time of the same type. The time period is determined by a start time-point and an end time-point, duration and a start time point, or duration with an end time point The Price 49066 package is an <MT>Pr 49070 data type. The Price 49066 package includes a Price 49068 entity. The Price 49068 entity includes various attributes, namely a SpecificationElementPropertyDefinitionClassCode 49072 and a Price 49076.

The SpecificationElementPropertyDefinitionClassCode 49072 attribute is a PriceSpecificationElementPropertyDefinitionClassCode 49074 data type. PriceSpecificationElementPropertyDefinitionClassCode is a coded representation of a property definition class of a PriceSpecificationElement. The GDT PriceSpecificationElementPropertyDefinitionClass classifies a class for defining properties for which a PriceSpecificationElement is possible. PriceSpecificationElementPropertyDefinitionClass defines a business environment according to a functional unit in an organization in which the PriceSpecificationElement is used, and which (regardless of the underlying organizational structure) is responsible for the respective activities. The properties defined in the GDT PriceSpecificationElementPropertyDefinitionClass represent the characteristics of this business environment. The Price 49076 attribute is a Price 49078 data type. A Price is an exchange value, expressed in a monetary unit, of a product or a service in relation to a basic amount.

Merchandise and Assortment Planning Store Layout Element Interfaces

A Merchandise And Assortment Planning Store Layout Element is an element of a layout presentation for a group of materials in a store. A Merchandise And Assortment Planning Store Layout Element can correspond to one or more store fixtures, including the offered materials, and a placement sequence can be established within it. The grouping of materials in a Merchandise And Assortment Planning Store Layout Element may be time dependent. A Merchandise And Assortment Planning Store Layout Element may have at least one version, which is valid for a certain time period. In some implementations, at any given time, only one version may be valid. A Merchandise And Assortment Planning Store Layout Element may be assigned to a store layout or to an assortment. A Merchandise And Assortment Planning Store Layout Element may be used as a basis for visualization, shelf optimization, and for listing. The Merchandise and Assortment Planning Store Layout Element interface performs various operations, namely a MerchandiseAndAssortmentPlanningStoreLayoutElementERPStoreFixtureByIDQueryResponse_In and a MerchandiseAndAssortmentPlanningStoreLayoutElementERPRequest_In. The MerchandiseAndAssortmentPlanningStoreLayoutElementERPStoreFixtureByIDQueryResponse_In operation can query the Merchandise And Assortment Planning Store Layout Element based on store layout element ID, version sequence number, or validity period from a third party shelf optimization solution. Merchandise And Assortment Planning can return Merchandise And Assortment Planning Store Layout Element and Store Fixture information to Shelf Optimization Solution.

The MerchandiseAndAssortmentPlanningStoreLayoutElementERPStoreFixtureByIDQueryResponse_In operation includes various message types, namely a MerchandiseAndAssortmentPlanningStoreLayoutElementERPStoreFixtureByIDQuery_sync and a Merchandise AndAssortmentPlanningStoreLayoutElementERPStoreFixtureByIDResponse_sync. The structure of the MerchandiseAndAssortmentPlanningStoreLayoutElementERPStoreFixtureByIDQuery_sync message type is specified by a MerchandiseAndAssortmentPlanningStoreLayoutElementERPStoreFixtureByIDQueryMessage_sync message data type. The structure of the MerchandiseAndAssortmentPlanningStoreLayoutElementERPStoreFixtureByIDResponse_sync message type is specified by a MerchandiseAndAssortmentPlanningStoreLayoutElementERPStoreFixtureByIDResponseMessage_sync message data type.

The MerchandiseAndAssortmentPlanningStoreLayoutElementERPRequest_In operation is a request from Shelf Optimization Solution (3rd party) to Assortment Planning to maintain a Merchandise and Assortment Planning Store Layout Element. This inbound operation is used to create or change a Merchandise And Assortment Planning Store Layout Element from a Third party Shelf Optimization Solution in Assortment Planning. The MerchandiseAndAssortmentPlanningStoreLayoutElementERPRequest_In operation includes a MerchandiseAndAssortmentPlanningStoreLayoutElementERPRequest message type. The structure of the MerchandiseAndAssortmentPlanningStoreLayoutElementERPRequest message type is specified by a MerchandiseAndAssortmentPlanningStoreLayoutElementERPRequestMessage message data type.

Figure 50:
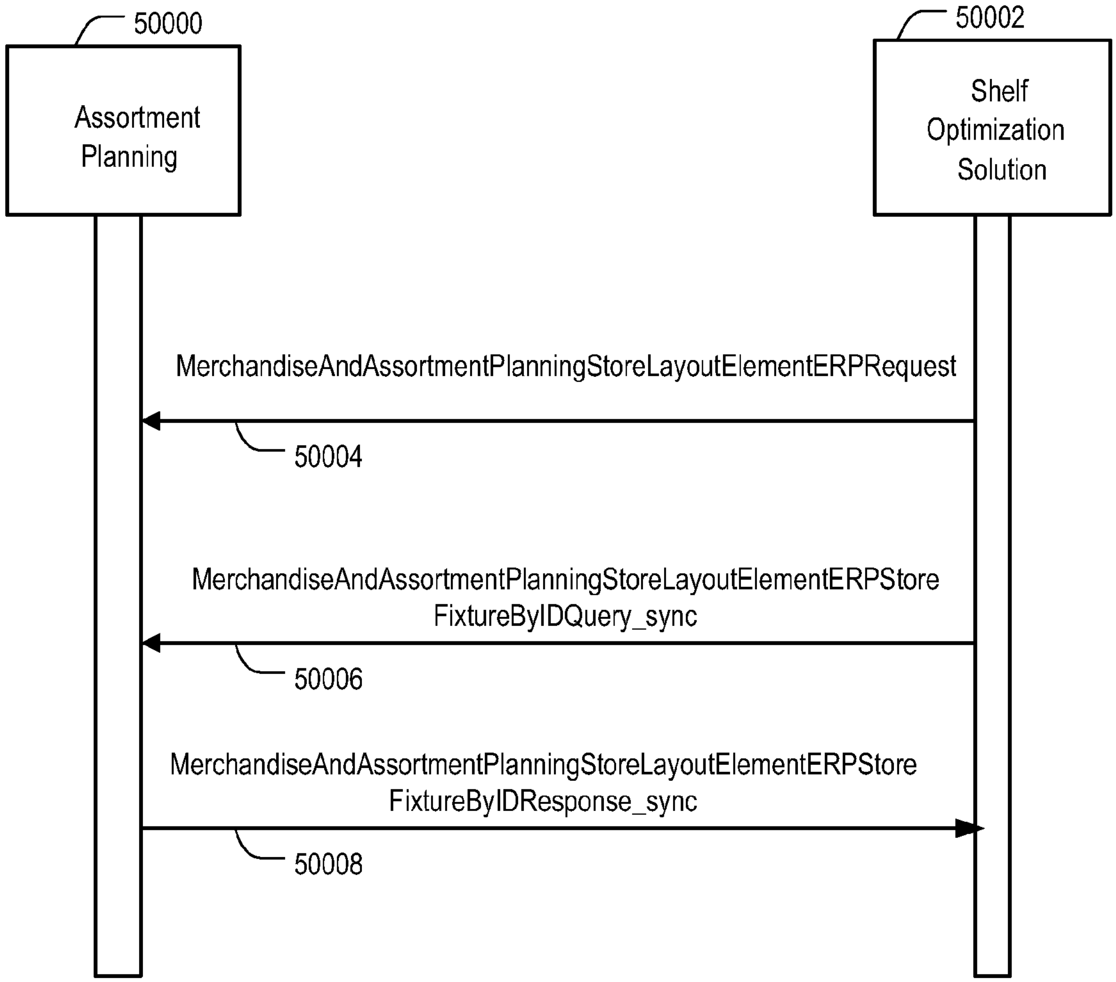
FIG. 50 illustrates an exemplary MerchandiseAndAssortmentPlanningStoreLayoutElement Message Choreography.

The message choreography of FIG. 50 describes a possible logical sequence of messages that can be used to realize a Merchandise and Assortment Planning Store Layout Element business scenario. A “Shelf Optimization Solution” 50002 can request merchandise and assortment planning store layout element information from an “Assortment Planning” system 50000 using a MerchandiseAndAssortmentPlanningStoreLayoutElementERPRequest message 50004 as shown, for example, in FIG. 50.

The “Shelf Optimization Solution” system 50002 can query merchandise and assortment planning store layout element ERP information from the “Assortment Planning” system 50000 using a MerchandiseAndAssortmentPlanningStoreLayoutElementERPStoreFixtureByIDQuery_sync message 50006 as shown, for example, in FIG. 50. The “Assortment Planning” system 50000 can respond to the query using a MerchandiseAndAssortmentPlanningStoreLayoutElementERPStoreFixtureByIDResponse_sync 50008 as shown, for example, in FIG. 50.

Figure 51:
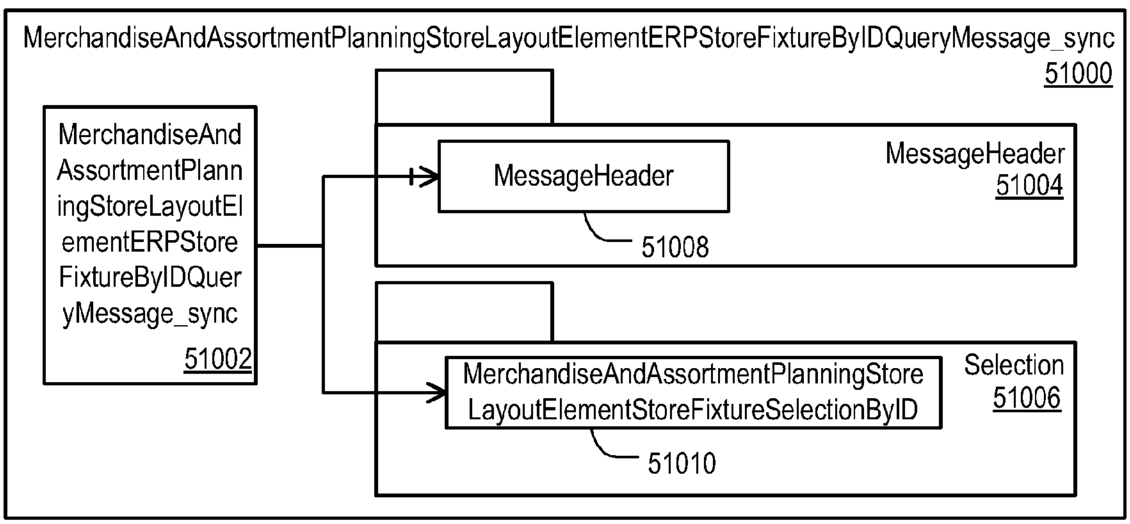
FIG. 51 illustrates an exemplary MerchandiseAndAssortmentPlanningStoreLayoutElementERPStoreFixtureByIDQueryMessage_sync Message Data Type.

FIG. 51 illustrates one example logical configuration of MerchandiseAndAssortmentPlanningStoreLayoutElementERPStoreFixtureByIDQueryMessage_sync message 51000. Specifically, this figure depicts the arrangement and hierarchy of various components such as one or more levels of packages, entities, and datatypes, shown here as 51000 through 51010. As described above, packages may be used to represent hierarchy levels. Entities are discrete business elements that are used during a business transaction. Data types are used to type object entities and interfaces with a structure. For example, MerchandiseAndAssortmentPlanningStoreLayoutElementERPStoreFixtureByIDQueryMessage_sync message 51000 includes, among other things, Selection package 51006. Accordingly, heterogeneous applications may communicate using this consistent message configured as such.

Figures 1, 52:
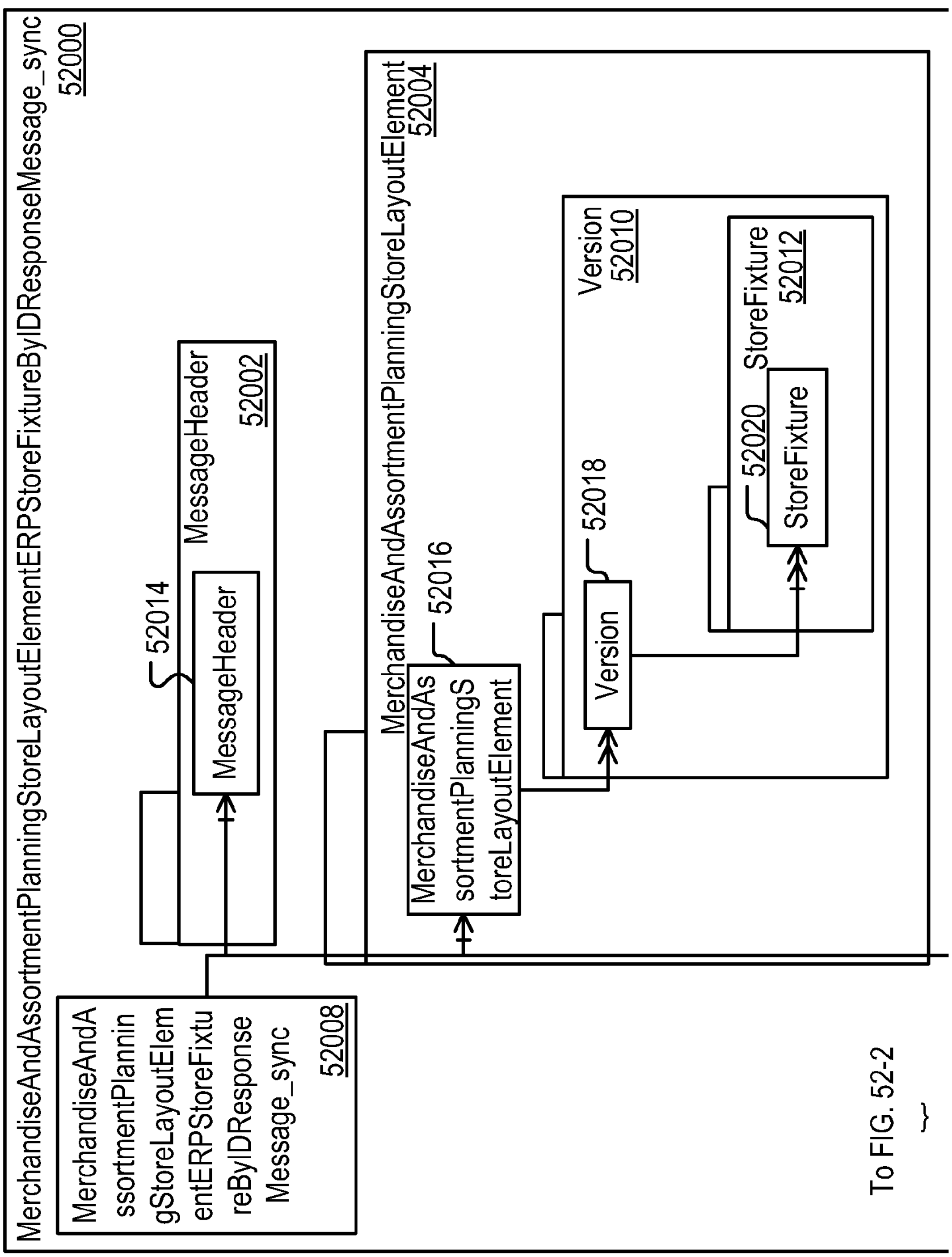
Figures 2, 52:
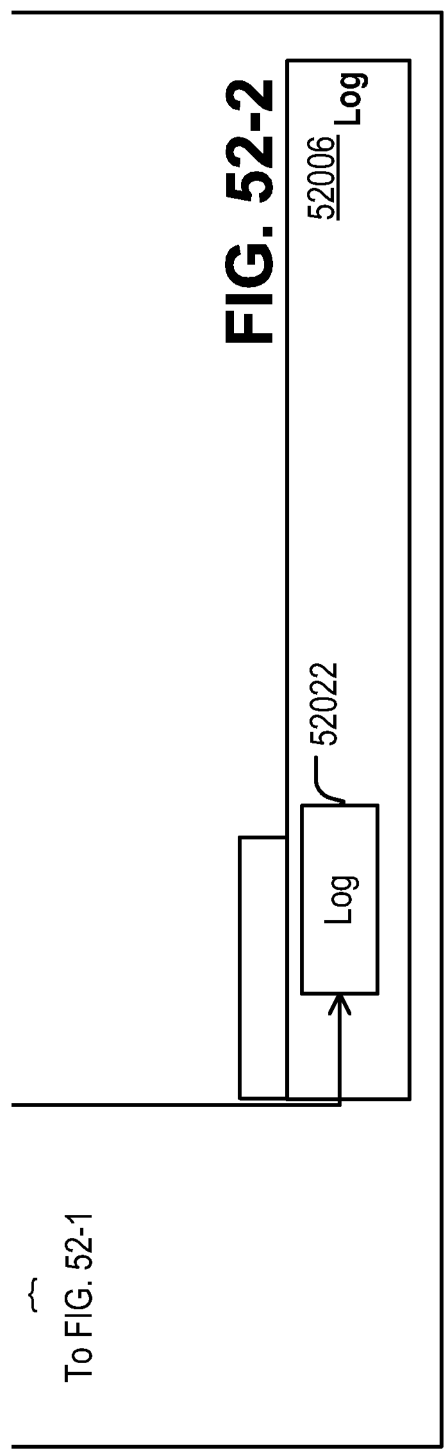

Additionally, FIGS. 52-1 through 52-2 illustrate one example logical configuration of MerchandiseAndAssortmentPlanningStoreLayoutElementERPStoreFixtureByIDResponseMessage_sync message 52000. Specifically, these figures depict the arrangement and hierarchy of various components such as one or more levels of packages, entities, and datatypes, shown here as 52000 through 52022. As described above, packages may be used to represent hierarchy levels. Entities are discrete business elements that are used during a business transaction. Data types are used to type object entities and interfaces with a structure. For example, MerchandiseAndAssortmentPlanningStoreLayoutElementERPStoreFixtureByIDResponseMessage_sync message 52000 includes, among other things, MerchandiseAndAssortmentPlanningStoreLayoutElement package 52004. Accordingly, heterogeneous applications may communicate using this consistent message configured as such.

Figure 53:
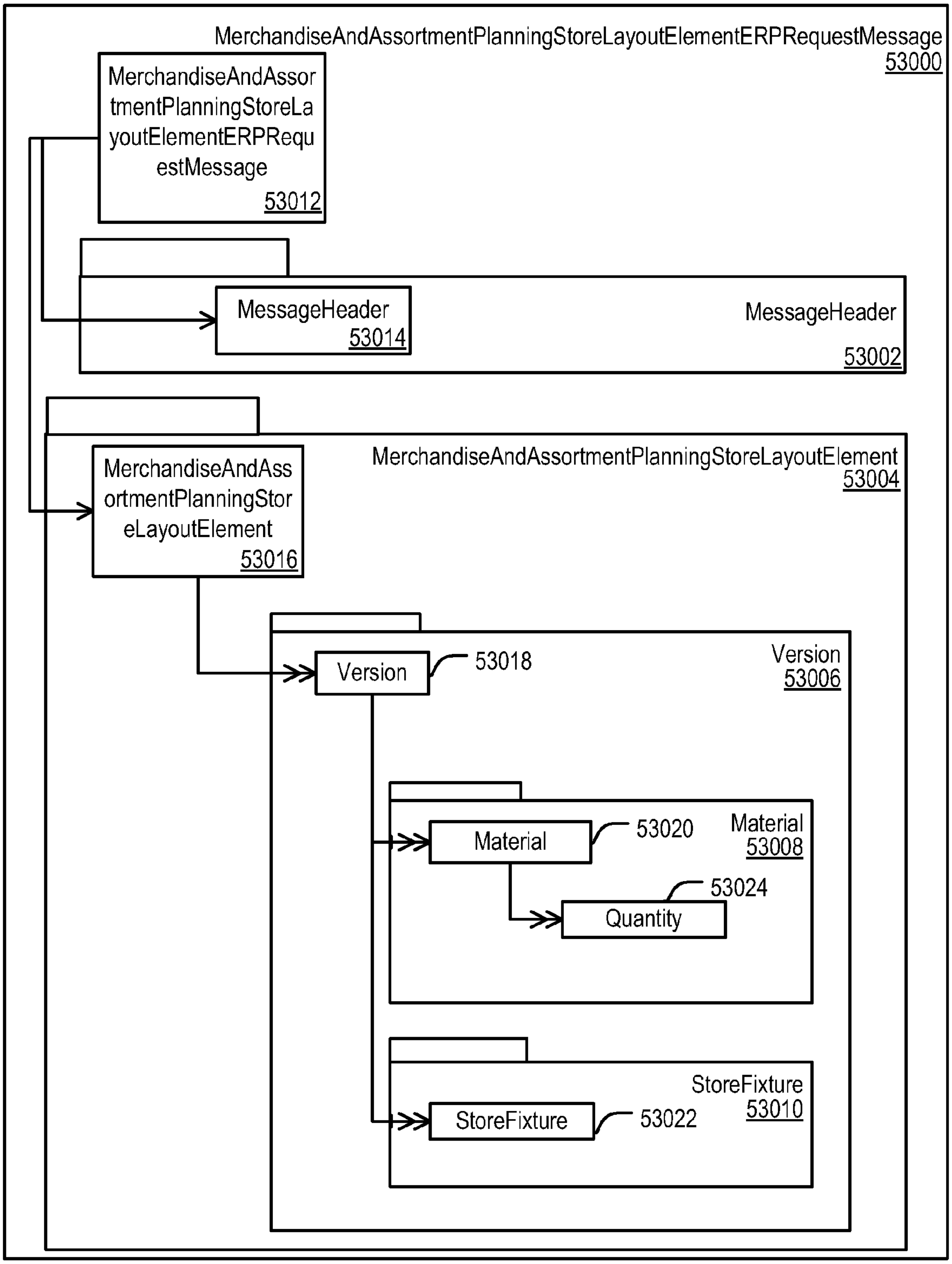
FIG. 53 illustrates an exemplary MerchandiseAndAssortmentPlanningStoreLayoutElementERPRequestMessage Message Data Type.

Additionally, FIG. 53 illustrates one example logical configuration of MerchandiseAndAssortmentPlanningStoreLayoutElementERPRequestMessage message 53000. Specifically, this figure depicts the arrangement and hierarchy of various components such as one or more levels of packages, entities, and datatypes, shown here as 53000 through 53024. As described above, packages may be used to represent hierarchy levels. Entities are discrete business elements that are used during a business transaction. Data types are used to type object entities and interfaces with a structure. For example, MerchandiseAndAssortmentPlanningStoreLayoutElementERPRequestMessage message 53000 includes, among other things, MerchandiseAndAssortmentPlanningStoreLayoutElement package 53004. Accordingly, heterogeneous applications may communicate using this consistent message configured as such.

FIGS. 54-1 through 54-7 illustrate one example logical configuration of MerchandiseAndAssortmentPlanningStoreLayoutElementMessage element structure 54000. Specifically, these figures depict the arrangement and hierarchy of various components such as one or more levels of packages, entities, and datatypes, shown here as 54000 through 54140. As described above, packages may be used to represent hierarchy levels. Entities are discrete business elements that are used during a business transaction. Data types are used to type object entities and interfaces with a structure. For example, MerchandiseAndAssortmentPlanningStoreLayoutElementMessage element structure 54000 includes, among other things, MessageHeader 54006. Accordingly, heterogeneous applications may communicate using this consistent message configured as such.

Additionally, FIGS. 55-1 through 55-2 illustrate one example logical configuration of MerchandiseAndAssortmentPlanningStoreLayoutElementERPStoreFixtureByIDQueryMessage_sync element structure 55000. Specifically, these figures depict the arrangement and hierarchy of various components such as one or more levels of packages, entities, and datatypes, shown here as 55000 through 55036. As described above, packages may be used to represent hierarchy levels. Entities are discrete business elements that are used during a business transaction. Data types are used to type object entities and interfaces with a structure. For example, MerchandiseAndAssortmentPlanningStoreLayoutElementERPStoreFixtureByIDQueryMessage_sync element structure 55000 includes, among other things, MessageHeader 55006. Accordingly, heterogeneous applications may communicate using this consistent message configured as such.

Additionally, FIGS. 56-1 through 56-3 illustrate one example logical configuration of MerchandiseAndAssortmentPlanningStoreLayoutElementERPStoreFixtureByIDResponseMessa ge_sync element structure 56000. Specifically, these figures depict the arrangement and hierarchy of various components such as one or more levels of packages, entities, and datatypes, shown here as 56000 through 56074. As described above, packages may be used to represent hierarchy levels. Entities are discrete business elements that are used during a business transaction. Data types are used to type object entities and interfaces with a structure. For example, MerchandiseAndAssortmentPlanningStoreLayoutElementERPStoreFixtureByIDResponseMessage_sync element structure 56000 includes, among other things, MessageHeader 56006. Accordingly, heterogeneous applications may communicate using this consistent message configured as such.

Additionally, FIGS. 57-1 through 57-6 illustrate one example logical configuration of MerchandiseAndAssortmentPlanningStoreLayoutElementERPRequestMessage element structure 57000. Specifically, these figures depict the arrangement and hierarchy of various components such as one or more levels of packages, entities, and datatypes, shown here as 57000 through 57136. As described above, packages may be used to represent hierarchy levels. Entities are discrete business elements that are used during a business transaction. Data types are used to type object entities and interfaces with a structure. For example, MerchandiseAndAssortmentPlanningStoreLayoutElementERPRequestMessage element structure 57000 includes, among other things, MessageHeader 57006. Accordingly, heterogeneous applications may communicate using this consistent message configured as such.

In further detail, FIGS. 54-1 through 54-7 illustrate an example configuration of an Element Structure that includes a MerchandiseAndAssortmentPlanningStoreLayoutElementMessage 54000 package. The MerchandiseAndAssortmentPlanningStoreLayoutElementMessage 54000 package includes a MerchandiseAndAssortmentPlanningStoreLayoutElementMessage 54002 entity. The MerchandiseAndAssortmentPlanningStoreLayoutElementMessage 54000 package includes various packages, namely a MessageHeader 54004 and a MerchandiseAndAssortmentPlanningStoreLayoutElement 54018.

The MessageHeader 54004 package is a BusinessDocumentMessageHeader 54008 data type. The MessageHeader 54004 package includes a MessageHeader 54006 entity. A BusinessDocumentMessageHeader includes business information from the perspective of the sender application for identifying processing of a business document instance within a technical message (if applicable, with a reference to a previous instance of a business document within a previous technical message). BusinessDocumentMessageHeader also includes information about the sender and information about the receiver.

The MessageHeader 54006 entity includes various attributes, namely an ID 54010 and a CreationDateTime 54014. The ID 54010 attribute is a BusinessDocumentMessageID 54012 data type. A BusinessDocumentMessageID is a unique identifier of a business document in a technical message that is issued by the sender business application. The CreationDateTime 54014 attribute is a DateTime 54016 data type.

The MerchandiseAndAssortmentPlanningStoreLayoutElement 54018 package is an <MT>MrchdsAndAsstmtPlngStoreLaytElmnt 54022 data type. The MerchandiseAndAssortmentPlanningStoreLayoutElement 54018 package includes a MerchandiseAndAssortmentPlanningStoreLayoutElement 54020 entity. The MerchandiseAndAssortmentPlanningStoreLayoutElement 54018 package includes a Version 54032 package.

The MerchandiseAndAssortmentPlanningStoreLayoutElement 54020 entity includes various attributes, namely an @actionCode 54024 and an ID 54028. The @actionCode 54024 attribute is an ActionCode 54026 data type. The ActionCode is a coded representation of an instruction to a recipient of a message describing how to process a transmitted element. The ID 54028 attribute is a StoreLayoutElementID 54030 data type. A StoreLayoutElementID is an identifier of a store layout element.

The Version 54032 package is an <MT>Vers 54036 data type. The Version 54032 package includes a Version 54034 entity. The Version 54032 package includes various packages, namely a Material 54054 and a StoreFixture 54116. The Version 54034 entity includes various attributes, namely an @actionCode 54038, an ID 54042, a ReleaseStatusCode 54046 and a ValidityPeriod 54050.

The @actionCode 54038 attribute is an ActionCode 54040 data type. The ActionCode is a coded representation of an instruction to the recipient of a message describing how to process a transmitted element. The ID 54042 attribute is a VersionID 54044 data type. A VersionID is a unique identifier for a version. A version is a differentiation of objects of an object type in accordance with the sequence in which they were created. In some implementations, only integer numbers are allowed. The ReleaseStatusCode 54046 attribute is a StoreLayoutElementVersionReleaseStatusCode 54048 data type.

The ValidityPeriod 54050 attribute is a DatePeriod 54052 data type. A DatePeriod is a period that is defined by two points in time. These points in time may be expressed in calendar days. The date period is determined by a start time point and an end time, duration and a start time point, or duration with an end time point.

The Material 54054 package is an <MT>Matl 54058 data type. The Material 54054 package includes a Material 54056 entity. The Material 54056 entity includes various attributes, namely an @actionCode 54060, an InternalID 54064, an OrdinalNumberValue 54068, a StoreFixtureOrdinalNumberValue 54072, a CalculatedOrdinalNumberValue 54076, a LabelTypeCode 54080, a LabelNumberValue 54084 and an UsedSpaceProportionDecimalValue 54088. The Material 54056 entity includes a Quantity 54092 subordinate entity.

The @actionCode 54060 attribute is an ActionCode 54062 data type. The ActionCode is a coded representation of an instruction to the recipient of a message describing how to process a transmitted element. The InternalID 54064 attribute is a ProductInternalID 54066 data type. A ProductInternalID is a proprietary identifier for a product. A product is either a tangible or intangible good, and is a part of the business activities of a company. A product can be traded and contributes directly or indirectly to value added. The OrdinalNumberValue 54068 attribute is an OrdinalNumberValue 54070 data type. An OrdinalNumberValue is a number that indicates a position of an element in a linearly ordered set that is ordered according to particular factors.

The StoreFixtureOrdinalNumberValue 54072 attribute is an OrdinalNumberValue 54074 data type. An OrdinalNumberValue is a number that indicates a position of an element in a linearly ordered set that is ordered according to particular factors. The CalculatedOrdinalNumberValue 54076 attribute is an OrdinalNumberValue 54078 data type. An OrdinalNumberValue is a number that indicates a position of an element in a linearly ordered set that is ordered according to particular factors. The LabelTypeCode 54080 attribute is a MaterialLabelTypeCode 54082 data type. MaterialLabelTypeCode is a coded representation of the type of a label for a Material. The LabelNumberValue 54084 attribute is a NumberValue 54086 data type. NumberValue is a number. Label is the primary qualifier for GDT Quantity.

The UsedSpaceProportionDecimalValue 54088 attribute is a DecimalValue 54090 data type. A DecimalValue is a numeric value represented as a decimal. Proportion is the primary qualifier for GDT DecimalValue and UsedSpace is the secondary qualifier. The Quantity 54092 entity includes various attributes, namely a StoreFixtureFacingQuantity 54096, a StoreFixtureFrontQuantity 54100, a PresentationQuantity 54104, an OptimumShelfCapacityQuantity 54108 and a MaximumShelfCapacityQuantity 54112. The StoreFixtureFacingQuantity 54096 attribute is a Quantity 54098 data type. A Quantity is a non-monetary numerical specification of an amount in a unit of measurement. The StoreFixtureFrontQuantity 54100 attribute is a Quantity 54102 data type. A Quantity is a non-monetary numerical specification of an amount in a unit of measurement. The PresentationQuantity 54104 attribute is a Quantity 54106 data type. A Quantity is a non-monetary numerical specification of an amount in a unit of measurement.

The OptimumShelfCapacityQuantity 54108 attribute is a Quantity 54110 data type. A Quantity is a non-monetary numerical specification of an amount in a unit of measurement. The MaximumShelfCapacityQuantity 54112 attribute is a Quantity 54114 data type. A Quantity is a non-monetary numerical specification of an amount in a unit of measurement.

The StoreFixture 54116 package is an <MT>StoreFxtr 54120 data type. The StoreFixture 54116 package includes a StoreFixture 54118 entity. The StoreFixture 54118 entity includes various attributes, namely an @actionCode 54122, an ID 54126, an OrdinalNumberValue 54130, a TypeCode 54134 and a CapacityQuantity 54138. The @actionCode 54122 attribute is an ActionCode 54124 data type. The ActionCode is a coded representation of an instruction to a recipient of a message describing how to process a transmitted element. The ID 54126 attribute is a StoreFixtureID 54128 data type. FixtureID is a unique identifier of a fixture. The OrdinalNumberValue 54130 attribute is an OrdinalNumberValue 54132 data type. An OrdinalNumberValue is a number that indicates a position of an element in a linearly ordered set that is ordered according to particular factors. StoreFixture is the qualifier for GDT OrdinalNumberValue. The TypeCode 54134 attribute is a StoreFixtureTypeCode 54136 data type. FixtureTypeCode is a coded representation of the type of a fixture. The CapacityQuantity 54138 attribute is a Quantity 54140 data type. A Quantity is a non-monetary numerical specification of an amount in a unit of measurement. Capacity is the primary qualifier for GDT Quantity.

In further detail, FIGS. 55-1 through 55-2 illustrate an example configuration of an Element Structure that includes a MerchandiseAndAssortmentPlanningStoreLayoutElementERPStoreFixtureByIDQueryMessage_sync 55000 package. The MerchandiseAndAssortmentPlanningStoreLayoutElementERPStoreFixtureByIDQueryMessage_sync 55000 package includes a MerchandiseAndAssortmentPlanningStoreLayoutElementERPStoreFixtureByIDQueryMessage_sync 55002 entity. The MerchandiseAndAssortmentPlanningStoreLayoutElementERPStoreFixtureByIDQueryMessage_sync 55000 package includes various packages, namely a MessageHeader 55004 and a Selection 55020.

The MessageHeader 55004 package includes a MessageHeader 55006 entity. The MessageHeader 55006 entity has a cardinality of 0 . . . 1 55008 meaning that for each instance of the MessageHeader 55004 package there may be one MessageHeader 55006 entity. The MessageHeader 55006 entity includes various attributes, namely an ID 55010 and a CreationDateTime 55014. The ID 55010 attribute has a cardinality of 1 55012 meaning that for each instance of the MessageHeader 55006 entity there is one ID 55010 attribute. The CreationDateTime 55014 attribute has a cardinality of 1 55016 meaning that for each instance of the MessageHeader 55006 entity there is one CreationDateTime 55014 attribute. In some implementations, the MessageHeader 55006 entity can include other attributes having a cardinality of 0 . . . 1 55018.

The Selection 55020 package includes a MerchandiseAndAssortmentPlanningStoreLayoutElementStoreFixtureSelectionByID 55022 entity. The MerchandiseAndAssortmentPlanningStoreLayoutElementStoreFixtureSelectionByID 55022 entity has a cardinality of 1 55024 meaning that for each instance of the Selection 55020 package there is one MerchandiseAndAssortmentPlanningStoreLayoutElementStoreFixtureSelectionByID 55022 entity. The MerchandiseAndAssortmentPlanningStoreLayoutElementStoreFixtureSelectionByID 55022 entity includes various attributes, namely a MerchandiseAndAssortmentPlanningStoreLayoutElementID 55026, a VersionID 55030 and a ValidityPeriod 55034. The MerchandiseAndAssortmentPlanningStoreLayoutElementID 55026 attribute has a cardinality of 1 55028 meaning that for each instance of the MerchandiseAndAssortmentPlanningStoreLayoutElementStoreFixtureSelectionByID 55022 entity there is one MerchandiseAndAssortmentPlanningStoreLayoutElementID 55026 attribute. The VersionID 55030 attribute has a cardinality of 0 . . . 1 55032 meaning that for each instance of the MerchandiseAndAssortmentPlanningStoreLayoutElementStoreFixtureSelectionByID 55022 entity there may be one VersionID 55030 attribute. The ValidityPeriod 55034 attribute has a cardinality of 0 . . . 1 55036 meaning that for each instance of the MerchandiseAndAssortmentPlanningStoreLayoutElementStoreFixtureSelectionByID 55022 entity there may be one ValidityPeriod 55034 attribute. The data types of the various packages, entities, and attributes shown in FIG. 55 are described above with respect to FIG. 54.

In further detail, FIGS. 56-1 through 56-3 illustrate an example configuration of an Element Structure that includes a MerchandiseAndAssortmentPlanningStoreLayoutElementERPStoreFixtureByIDResponseMessage_sync 56000 package. The MerchandiseAndAssortmentPlanningStoreLayoutElementERPStoreFixtureByIDResponseMessage_sync 56000 package includes a MerchandiseAndAssortmentPlanningStoreLayoutElementERPStoreFixtureByIDResponseMessa ge_sync 56002 entity. The MerchandiseAndAssortmentPlanningStoreLayoutElementERPStoreFixtureByIDResponseMessage_sync 56000 package includes various packages, namely a MessageHeader 56004, a MerchandiseAndAssortmentPlanningStoreLayoutElement 56020, and a Log 56070.

The MessageHeader 56004 package includes a MessageHeader 56006 entity. The MessageHeader 56006 entity has a cardinality of 0 . . . 1 56008 meaning that for each instance of the MessageHeader 56004 package there may be one MessageHeader 56006 entity. The MessageHeader 56006 entity includes various attributes, namely an ID 56010 and a CreationDateTime 56014. The ID 56010 attribute has a cardinality of 1 56012 meaning that for each instance of the MessageHeader 56006 entity there is one ID 56010 attribute. The CreationDateTime 56014 attribute has a cardinality of 1 56016 meaning that for each instance of the MessageHeader 56006 entity there is one CreationDateTime 56014 attribute. In some implementations, the MessageHeader 56006 entity can include other attributes having a cardinality of 0 . . . 1 56018.

The MerchandiseAndAssortmentPlanningStoreLayoutElement 56020 package includes a MerchandiseAndAssortmentPlanningStoreLayoutElement 56022 entity. The MerchandiseAndAssortmentPlanningStoreLayoutElement 56020 package includes a Version 56030 package.

The MerchandiseAndAssortmentPlanningStoreLayoutElement 56022 entity has a cardinality of 0 . . . 1 56024 meaning that for each instance of the MerchandiseAndAssortmentPlanningStoreLayoutElement 56020 package there may be one MerchandiseAndAssortmentPlanningStoreLayoutElement 56022 entity. The MerchandiseAndAssortmentPlanningStoreLayoutElement 56022 entity includes an ID 56026 attribute. The ID 56026 attribute has a cardinality of 1 56028 meaning that for each instance of the MerchandiseAndAssortmentPlanningStoreLayoutElement 56022 entity there is one ID 56026 attribute. The Version 56030 package includes a Version 56032 entity. The Version 56030 package includes a StoreFixture 56048 package. The Version 56032 entity has a cardinality of 1 56034 meaning that for each instance of the Version 56030 package there is one Version 56032 entity. The Version 56032 entity includes various attributes, namely an ID 56036, a ReleaseStatusCode 56040 and a ValidityPeriod 56044. The ID 56036 attribute has a cardinality of 1 56038 meaning that for each instance of the Version 56032 entity there is one ID 56036 attribute. The ReleaseStatusCode 56040 attribute has a cardinality of 1 56042 meaning that for each instance of the Version 56032 entity there is one ReleaseStatusCode 56040 attribute. The ValidityPeriod 56044 attribute has a cardinality of 1 56046 meaning that for each instance of the Version 56032 entity there is one ValidityPeriod 56044 attribute.

The StoreFixture 56048 package includes a StoreFixture 56050 entity. The StoreFixture 56050 entity has a cardinality of 0 . . . n 56052 meaning that for each instance of the StoreFixture 56048 package there may be one or more StoreFixture 56050 entities. The StoreFixture 56050 entity includes various attributes, namely an ID 56054, an Ordinal- NumberValue 56058, a TypeCode 56062 and a CapacityQuantity 56066. The ID 56054 attribute has a cardinality of 1 56056 meaning that for each instance of the StoreFixture 56050 entity there is one ID 56054 attribute. The OrdinalNumberValue 56058 attribute has a cardinality of 1 56060 meaning that for each instance of the StoreFixture 56050 entity there is one OrdinalNumberValue 56058 attribute. The TypeCode 56062 attribute has a cardinality of 1 56064 meaning that for each instance of the StoreFixture 56050 entity there is one TypeCode 56062 attribute. The CapacityQuantity 56066 attribute has a cardinality of 1 56068 meaning that for each instance of the StoreFixture 56050 entity there is one CapacityQuantity 56066 attribute.

The Log 56070 package includes a Log 56072 entity. The Log 56072 entity has a cardinality of 1 56074 meaning that for each instance of the Log 56070 package there is one Log 56072 entity. The data types of the various packages, entities, and attributes shown in FIG. 56 are described above with respect to FIG. 54.

In further detail, FIGS. 57-1 through 57-6 illustrate an example configuration of an Element Structure that includes a MerchandiseAndAssortmentPlanningStoreLayoutElementERPRequestMessage 57000 package. The MerchandiseAndAssortmentPlanningStoreLayoutElementERPRequestMessage 57000 package includes a MerchandiseAndAssortmentPlanningStoreLayoutElementERPRequestMessage 57002 entity. The MerchandiseAndAssortmentPlanningStoreLayoutElementERPRequestMessage 57000 package includes various packages, such as a MessageHeader 57004, and a MerchandiseAndAssortmentPlanningStoreLayoutElement 57020.

The MessageHeader 57004 package includes a MessageHeader 57006 entity. The MessageHeader 57006 entity has a cardinality of 1 57008 meaning that for each instance of the MessageHeader 57004 package there is one MessageHeader 57006 entity. The MessageHeader 57006 entity includes various attributes, namely an ID 57010 and a CreationDateTime 57014. The ID 57010 attribute has a cardinality of 1 57012 meaning that for each instance of the MessageHeader 57006 entity there is one ID 57010 attribute. The CreationDateTime 57014 attribute has a cardinality of 1 57016 meaning that for each instance of the MessageHeader 57006 entity there is one CreationDateTime 57014 attribute. In some implementations, the MessageHeader 57006 entity can include other attributes having a cardinality of 0 . . . 1 57018.

The MerchandiseAndAssortmentPlanningStoreLayoutElement 57020 package includes a MerchandiseAndAssortmentPlanningStoreLayoutElement 57022 entity. The MerchandiseAndAssortmentPlanningStoreLayoutElement 57020 package includes a Version 57034 package. The MerchandiseAndAssortmentPlanningStoreLayoutElement 57022 entity has a cardinality of 1 57024 meaning that for each instance of the MerchandiseAndAssortmentPlanningStoreLayoutElement 57020 package there is one MerchandiseAndAssortmentPlanningStoreLayoutElement 57022 entity. The MerchandiseAndAssortmentPlanningStoreLayoutElement 57022 entity includes various attributes, namely an @actionCode 57026 and an ID 57030. The @actionCode 57026 attribute has a cardinality of 1 57028 meaning that for each instance of the MerchandiseAndAssortmentPlanningStoreLayoutElement 57022 entity there is one @actionCode 57026 attribute. The ID 57030 attribute has a cardinality of 1 57032 meaning that for each instance of the MerchandiseAndAssortmentPlanningStoreLayoutElement 57022 entity there is one ID 57030 attribute.

The Version 57034 package includes a Version 57036 entity. The Version 57034 package includes various packages, namely a Material 57052 and a StoreFixture 57116. The Version 57036 entity has a cardinality of 1 57038 meaning that for each instance of the Version 57034 package there is one Version 57036 entity. The Version 57036 entity includes various attributes, namely an @actionCode 57040, an ID 57044 and a ValidityPeriod 57048. The @actionCode 57040 attribute has a cardinality of 1 57042 meaning that for each instance of the Version 57036 entity there is one @actionCode 57040 attribute. The ID 57044 attribute has a cardinality of 0 . . . 1 57046 meaning that for each instance of the Version 57036 entity there may be one ID 57044 attribute. The ValidityPeriod 57048 attribute has a cardinality of 0 . . . 1 57050 meaning that for each instance of the Version 57036 entity there may be one ValidityPeriod 57048 attribute.

The Material 57052 package includes a Material 57054 entity. The Material 57052 package includes a MaterialQuantity 57090 package. The Material 57054 entity has a cardinality of 0 . . . n 57056 meaning that for each instance of the Material 57052 package there may be one or more Material 57054 entities. The Material 57054 entity includes various attributes, namely an @actionCode 57058, an InternalID 57062, an OrdinalNumberValue 57066, a StoreFixtureOrdinalNumberValue 57070, a CalculatedOrdinalNumberValue 57074, a LabelTypeCode 57078, a LabelNumberValue 57082 and an UsedSpaceProportionDecimalValue 57086. The @actionCode 57058 attribute has a cardinality of 1 57060 meaning that for each instance of the Material 57054 entity there is one @actionCode 57058 attribute. The InternalID 57062 attribute has a cardinality of 1 57064 meaning that for each instance of the Material 57054 entity there is one InternalID 57062 attribute. The OrdinalNumberValue 57066 attribute has a cardinality of 0 . . . 1 57068 meaning that for each instance of the Material 57054 entity there may be one OrdinalNumberValue 57066 attribute. The StoreFixtureOrdinalNumberValue 57070 attribute has a cardinality of 0 . . . 1 57072 meaning that for each instance of the Material 57054 entity there may be one StoreFixtureOrdinalNumberValue 57070 attribute. The CalculatedOrdinalNumberValue 57074 attribute has a cardinality of 0 . . . 1 57076 meaning that for each instance of the Material 57054 entity there may be one CalculatedOrdinalNumberValue 57074 attribute. The LabelTypeCode 57078 attribute has a cardinality of 0 . . . 1 57080 meaning that for each instance of the Material 57054 entity there may be one LabelTypeCode 57078 attribute. The LabelNumberValue 57082 attribute has a cardinality of 0 . . . 1 57084 meaning that for each instance of the Material 57054 entity there may be one LabelNumberValue 57082 attribute. The UsedSpaceProportionDecimalValue 57086 attribute has a cardinality of 0 . . . 1 57088 meaning that for each instance of the Material 57054 entity there may be one UsedSpaceProportionDecimalValue 57086 attribute.

The MaterialQuantity 57090 package includes a Quantity 57092 entity. The Quantity 57092 entity has a cardinality of 0 . . . 1 57094 meaning that for each instance of the MaterialQuantity 57090 package there may be one Quantity 57092 entity. The Quantity 57092 entity includes various attributes, namely a StoreFixtureFacingQuantity 57096, a StoreFixtureFrontQuantity 57100, a PresentationQuantity 57104, an OptimumShelfCapacityQuantity 57108 and a MaximumShelfCapacityQuantity 57112. The StoreFixtureFacingQuantity 57096 attribute has a cardinality of 1 57098 meaning that for each instance of the Quantity 57092 entity there is one StoreFixtureFacingQuantity 57096 attribute. The StoreFixtureFrontQuantity 57100 attribute has a cardinality of 1 57102 meaning that for each instance of the Quantity

57092 entity there is one StoreFixtureFrontQuantity 57100 attribute. The PresentationQuantity 57104 attribute has a cardinality of 0 . . . 1 57106 meaning that for each instance of the Quantity 57092 entity there may be one PresentationQuantity 57104 attribute. The OptimumShelfCapacityQuantity 57108 attribute has a cardinality of 0 . . . 1 57110 meaning that for each instance of the Quantity 57092 entity there may be one OptimumShelfCapacityQuantity 57108 attribute. The MaximumShelfCapacityQuantity 57112 attribute has a cardinality of 1 57114 meaning that for each instance of the Quantity 57092 entity there is one MaximumShelfCapacityQuantity 57112 attribute.

The StoreFixture 57116 package includes a StoreFixture 57118 entity. The StoreFixture 57118 entity has a cardinality of 0 . . . n 57120 meaning that for each instance of the StoreFixture 57116 package there may be one or more StoreFixture 57118 entities. The StoreFixture 57118 entity includes various attributes, namely an @actionCode 57122, an ID 57126, an OrdinalNumberValue 57130 and a CapacityQuantity 57134. The @actionCode 57122 attribute has a cardinality of 1 57124 meaning that for each instance of the StoreFixture 57118 entity there is one @actionCode 57122 attribute. The ID 57126 attribute has a cardinality of 1 57128 meaning that for each instance of the StoreFixture 57118 entity there is one ID 57126 attribute. The OrdinalNumberValue 57130 attribute has a cardinality of 1 57132 meaning that for each instance of the StoreFixture 57118 entity there is one OrdinalNumberValue 57130 attribute. The CapacityQuantity 57134 attribute has a cardinality of 0 . . . 1 57136 meaning that for each instance of the StoreFixture 57118 entity there may be one CapacityQuantity 57134 attribute. The data types of the various packages, entities, and attributes shown in FIG. 57 are described above with respect to FIG. 54.

A number of implementations have been described. Nevertheless, it will be understood that various modifications may be made without departing from the spirit and scope of the disclosure. Accordingly, other implementations are within the scope of the following claims.

What is claimed is:

1. A tangible computer readable medium including program code for providing a message-based interface for performing an assortment plan service, the service exposing at least one service as defined in a service registry, wherein upon execution the program code executes in an environment of computer systems providing message-based services and comprises:

program code for receiving, from a service consumer, a first message for processing a plan for purchasing articles by a company;

program code for invoking an assortment plan business object, wherein the business object is a logically centralized, semantically disjointed object representing a plan for purchasing articles by a company, and comprises data logically organized as:

an assortment plan root node;

a description subordinate node;

a product category subordinate node;

a season subordinate node;

an item subordinate node and wherein the item node contains:

a description subordinate node;

a sales price specification calculation subordinate node;

a product procurement arrangement subordinate node;

a product category subordinate node;

a prepack subordinate node and wherein the prepack node contains:

a property valuation subordinate node and wherein the property valuation node contains:

a property reference subordinate node; and a value group subordinate node and wherein the value group node contains a property value subordinate node; and a ratio subordinate node and wherein the ratio node contains:

a property valuation subordinate node and wherein the property valuation node contains:

a property reference subordinate node; and a value group subordinate node and wherein the value group node contains:

a property value subordinate node; and a quantity subordinate node and wherein the quantity node contains:

a property valuation subordinate node and wherein the property valuation node contains:

a property reference subordinate node; and a value group subordinate node and wherein the value group node contains a property value subordinate node; and a target sales subordinate node; and program code for initiating transmission of a message to a heterogeneous second application, executing in the environment of computer systems providing message-based services, based on the data in the assortment plan business object, the message comprising an assortment plan message entity, a message header package, and an assortment plan package.

2. A tangible computer readable medium including program code for providing a message-based interface for performing an assortment plan service, the service exposing at least one service as defined in a service registry, wherein upon execution the program code executes in an environment of computer systems providing message-based services and comprises:

program code for initiating transmission of a message to a heterogeneous second application, executing in the environment of computer systems providing message-based services, based on data in an assortment plan business object invoked by the second application, wherein the business object represents a plan for purchasing articles by a company, and comprises data logically organized as:

an assortment plan root node;

a description subordinate node;

a product category subordinate node;

a season subordinate node;

an item subordinate node and wherein the item node contains:

a description subordinate node;

a sales price specification calculation subordinate node;

a product procurement arrangement subordinate node;

a product category subordinate node;

a prepack subordinate node and wherein the prepack node contains:

a property valuation subordinate node and wherein the property valuation node contains:

a property reference subordinate node; and a value group subordinate node and wherein the value group node contains a property value subordinate node; and a ratio subordinate node and wherein the ratio node contains:
a property valuation subordinate node and wherein the property valuation node contains:
a property reference subordinate node; and
a value group subordinate node and wherein the value group node contains a property value subordinate node; and
a quantity subordinate node and wherein the quantity node contains:
a property valuation subordinate node and wherein the property valuation node contains:
a property reference subordinate node; and
a value group subordinate node and wherein the value group node contains a property value subordinate node; and
a target sales subordinate node;
and the message comprising an assortment plan message entity, a message header package, and an assortment plan package; and
program code for receiving a second message from the second application, the second message associated with the invoked assortment plan business object and in response to the first message.

3. A distributed system operating in a landscape of computer systems providing message-based services, the system processing business objects involving processing a plan for purchasing articles by a company, and comprising:
memory storing a business object repository storing a plurality of business objects, wherein each business object is a logically centralized, semantically disjointed object of a particular business object type and at least one of the business objects represents a plan for purchasing articles by a company, and comprises data logically organized as:
an assortment plan root node;
a description subordinate node;
a product category subordinate node;
a season subordinate node;
an item subordinate node and wherein the item node contains:
a description subordinate node;
a sales price specification calculation subordinate node;
a product procurement arrangement subordinate node;
a product category subordinate node;
a prepack subordinate node and wherein the prepack node contains:
a property valuation subordinate node and wherein the property valuation node contains:
a property reference subordinate node; and
a value group subordinate node and wherein the value group node contains a property value subordinate node; and
a ratio subordinate node and wherein the ratio node contains:
a property valuation subordinate node and wherein the property valuation node contains:
a property reference subordinate node; and
a value group subordinate node and wherein the value group node contains a property value subordinate node; and
a quantity subordinate node and wherein the quantity node contains:
a property valuation subordinate node and wherein the property valuation node contains:
a property reference subordinate node; and
a value group subordinate node and wherein the value group node contains:
a property value subordinate node; and
a target sales subordinate node; and
a graphical user interface remote from the memory for presenting data associated with an invoked instance of the assortment plan business object, the user interface comprising tangible computer readable instructions embodied on tangible media.

* * * * *